(12) United States Patent
Stromotich

(10) Patent No.: US 9,217,232 B2
(45) Date of Patent: Dec. 22, 2015

(54) FISH LEVITATION SYSTEM

(71) Applicant: Frank L Stromotich, West Vancouver (CA)

(72) Inventor: Frank L Stromotich, West Vancouver (CA)

( * ) Notice: Subject to any disclaimer, the term of this patent is extended or adjusted under 35 U.S.C. 154(b) by 13 days.

(21) Appl. No.: 13/904,986

(22) Filed: May 29, 2013

(65) Prior Publication Data

US 2014/0356070 A1 Dec. 4, 2014

(51) Int. Cl.
*E02B 8/08* (2006.01)

(52) U.S. Cl.
CPC ...................... *E02B 8/085* (2013.01)

(58) Field of Classification Search
USPC .................. 405/80, 81, 82, 83, 52, 75, 78
See application file for complete search history.

(56) References Cited

U.S. PATENT DOCUMENTS

| | | | |
|---|---|---|---|
| 3,038,760 A * | 6/1962 | Crooke | 119/203 |
| 6,106,729 A * | 8/2000 | Prince et al. | 210/747.5 |
| 6,273,639 B1 * | 8/2001 | Eikrem et al. | 405/83 |
| 6,394,699 B1 * | 5/2002 | Neufeld | 405/81 |
| 8,011,854 B1 * | 9/2011 | Millard | 405/83 |

* cited by examiner

*Primary Examiner* — Sean Andrish

(57) ABSTRACT

A levitation system communicates fish mutually exclusively upstream and downstream, with minimal trauma to fish, in harmony with their homing instinct and natural levitation process, in discrete micro-steps aggregated in macro steps, with optimally adjusted water flows, through capsules of stations differing in elevation by 50 to 100 feet, connected through inclined conduits in series and in parallel. The process starts with electricity from a utility to pump water from the forebay to the dam crest. Water moves slowly in controlled cascades through stations from crest to the afterbay. Surplus electricity is generated as pressure is adjusted at each station. Cooler water drawn from below the surface of the forebay is blended at stations along the passageway and spent water is flushed. Energy losses are attributable mainly to attraction flow at the station a few feet above the afterbay and are mitigated by a moderate negative pressure to control flow.

8 Claims, 44 Drawing Sheets

FISH LEVITATION SYSTEM

CROSS-REFERENCE TO RELATED APPLICATION

This is a continuation-in-part application, that claims priority and benefit thereof of Canadian Patent Application No. 2791180, filed Sep. 28, 2012 and United Kingdom Patent Application GB1217472.8 filed Sep. 29, 2012, and includes two additional drawings with clarification of the same.

FIELD OF THE INVENTION

This invention pertains to fish passage systems where the free movement of fish is otherwise obstructed and more particularly to passageways to bypass dams at hydro-electric power generation plants and water storage reservoirs.

PRIOR ART

The primary method of fish by-pass at hydro-electric power generation plants is fish ladder apparatus comprising a series of pools for upstream migration and chutes and spillways for downstream migration. Fish ladders are limited to heights of about 200 feet at which point the number of steps become excessive. On high dams, fish are trapped and transported to the reservoir above, to a fish habitat, and/or to a fish hatchery. Downstream movement of fish is also done directly through Kaplan and Francis type turbines. The trauma suffered by fish in their movement through spillway and turbine systems are well known. A drawback is the energy of the water passing down a fish ladder is not recovered.

Fish lifts are an alternative to fish ladders on dams of about 75 feet or more and function analogous to a ship lock elevating a group of small boats to the top of a dam. Fish are lured into a chamber in the afterbay and mechanically crowded into a smaller volume before entering the lock. Means to speed fish movement vertically up the lock to reduce cycle time impact negatively on fish. Fish become confused when they are required to swim up a vertical shaft because water is coming up from below and they are migrating upstream to spawn. Increasing water flow rates increases turbulence. Pulling fish up with a basket from below is also confusing to them.

Electrically operated fish lifts have reduced cycle time to about 7 minutes, are an improvement to fish locks particularly where dam heights are 150 feet or more. Fish are crowded into a open topped hopper which is raised by a winch on a trolley on the top of the dam, carried across the dam and lowered into the forebay then released by opening the hopper bottom. The hopper is then lifted and returned to the foot of the dam, completing the cycle. Increasing the size of the hopper increases the rate at which fish numbers are transferred over the dam.

Siphoning fish through a conduit over a dam results in an absolute pressure less than atmospheric at the top of the conduit loop, proportional to the difference in elevation between the inlet and the top of water rise in the siphon. Generally, one atmosphere equals 14.7 psi or [14.7/(62.4/144)] 33.9 feet of water—water sucked to this height vaporizes at the surface as if boiling. It has been found a difference of 25 feet or more pulls a vacuum that impacts adversely on the bladders of fish. (Air travelers experience something similar in their inner ear when the cabin is not adequately pressurized.) It is known a small vacuum of only a few feet can control water flow from the forebay enabling small fish to successfully migrate through a siphon through an elevation of about 25 feet. A fish ladder (with 4×40 in. steps) within a surrounding conduit about 6 foot in diameter with a slope of less than 6 degrees, operated as a siphon, known as a siphon-fish-ladder has been installed at several locations in the EU. It appears the siphon-fish-ladder would be overly bulky if used in stages of about 25 feet in a series of switchbacks, because of conduit diameter (6') and length (250') because of the high number of steps.

It is generally known gas bubble trauma ("GBT") or gas bubble disease ("GBD") can occur when total dissolved gas supersaturation levels ("TDGS"), aka ("DGS") are high from water spilled at dams " . . . which creates TDGS when entrained air is dissolved in water under the pressure of deep plunge pools . . . " . . . "analogous to "the bends" in human divers . . . " and that "the increased hydrostatic pressure associated with swimming deeper in the water column inhibits formation of interstitial gas bubbles. Significant bubble formation is believed to require periods of tens of minutes to hours of uncompensated exposure to supersaturated conditions. Intermittent periods of greater hydrostatic compensation caused by swimming at greater depth can reduce signs of the disease". "The severity of the effect depends on the level of TDG and exposure time." It is suggested in the literature that a mitigating level of hydrostatic compensation for TDGS of 120% could be less than 7 feet. A pressure compensation of up to ten feet is within range of this invention.

U.S. Pat. Nos. 4,770,610 and 5,002,463 to Breckner disclose a slurry pump to evacuate fish from a fish boat, by sucking fish into a containment vessel and then increasing air pressure to eject the fish and water to a higher elevation. This method of moving fish through conduit is not acceptable for migrating adult fish because fish are rubbed together.

U.S. Pat. No. 6,273,639 to Eikrem, et al, discloses a fish passage through conduit for upstream migration with a multiplicity of gate-valves in series along a substantially horizontal fish passage conduit that pierces the dam, with flow restricted by a range of perforations in the disk of closed gate-valves on the forebay end of the conduit. The invention is shown applied in a dam of about 45 feet head.

U.S. Pat. No. 6,394,699 to Neufeld also discloses a reduced flow rate fish passage apparatus, similar in several respects to Eikrem. The flow control methods disclosed by Eikrem and Neufeld are not suited to application in modules for additional steps for fish passage of increased height.

U.S. Pat. No. 6,652,189 to Burns discloses construction of a bypass channel with natural features to bypass obstructions in a river channel. This is essentially a synthetic meandering fish channel that loops off to the side of the main water passage to go through gradual changes in elevation. It is similar in some respects to where water is diverted through a series of run-of-the-river hydro-electric plants offset from the main channel and sufficient water flow remains for fish to move freely upstream and downstream.

U.S. Pat. No. 6,739,802 to Boylan discloses a test circuit for evaluation of fish passage in conduit bypass systems.

U.S. Pat. No. 7,887,258 to Rubbert discloses an apparatus for mixing warmer water near the surface with cooler water from below at the forebay of dams for optimum temperature control of downstream water for migration of fish. This is invention has a high capital cost.

U.S. Pat. No. 8,011,854 to Millard discloses an apparatus comprising a series of water pools open to atmosphere connected by conduit for fish passage and hydroelectric generators between pools for water flow energy recovery. Control of water flow for fish migration relies on means for modulating a form of resonant circuit—the natural frequency of oscillation of water in the conduit with a water column midway between pools. Resonant circuits are known to be difficult to control and have limited application.

U.S. Pat. No. 8,262,317 to Jensen discloses a bypass for fish passage downstream from the forebay through conduit. The drawback is that the conduit pierces through the dam in a route to the afterbay and water flow is not controlled and reaches a high velocity which may be confusing to juveniles.

The environmental effects of GBT and fishes' avoidance responses at the world's largest dam is discussed in the Journal of Zhejiang University Science B publishes "Effects of gas supersaturation on lethality and avoidance responses in juvenile rock carp (*Procypris rabaudi* Tchang)".

BACKGROUND

Known rules to reduce stress of fish moving in passageways are as follows:

1) Fish should not be confined in densities greater than 3 lbs of fish per cubic foot of water—to minimize their rubbing together;

2) Air should be available at the surface where fish are held;

3) Fish should enter a vessel from below water level;

4) Fish should not experience abrupt changes in direction—radius of turns should be at least 5 times conduit diameter;

5) Fish should not be vacuumed nor pumped; and

6) Rest time should be adjustable for fish species and changing conditions.

Known desirable features less commonly found, possibly because of associated high cost with prior art passageways, include:

1) Water temperature control at the fish outlet to acclimatize fish to their journey downstream;

2) Fish control with variable control of light, sound, and pulsed direct electric current at the boundaries of a passageway channel;

3) Shielding from solar heating; and

4) Fish counters.

Fish passage planning software is available on the United States federal fisheries website for culverts in series, at gradients of about 1 percent, along with data on a fish length and swim speeds for a wide range of fish species.

SUMMARY OF THE INVENTION

This invention considers fish as sentient creatures that respond to stimulus, the science of ergonomics, and known rules to reduce fatigue. The method inherent in the invention, of incremental levitation by discrete control, is compatible with, and an extension of, the prior art of fish passage simulation. Users can simulate a prospective fish passageway according to this invention and, through "what-if" experimentation, optimize a design prior to undertaking a capital investment.

The object of the present invention is to provide a modular fish passage system, with a method of operation inclusive of the aforementioned rules, that is conducive to fish migration, mutually exclusively upstream and downstream, past high obstructions with the least possible trauma to the fish, and includes the following objects:

1) Economically effective for passage over or around obstructions ranging from 50 to 750 feet.

2) Economically effective for further passage according to the above including down to a forebay when migrating upstream and up from a forebay when migrating downstream in instances where the forebay is substantially lower than the crest of the dam.

3) Means for stimulating the homing instinct of fish by injecting fresh water from their spawning grounds at stations along the passageway.

4) Computer control of levitation operations to minimize trauma while maximizing fish transfer rate according to fish species.

5) Economically flushing spent water from the passageway and recovering the potential energy.

6) Recovering almost all the energy of water flowing through the passageway.

7) Swim depth control for adjusting hydrostatic compensation to mitigate against gas bubble disease ("GBD") where total dissolved gas ("TDG") is higher than preferred.

8) Means for de-gasification of fish passage water where preferable in regions of high TDG.

The aforementioned objects, and other objects which will become apparent on perusing the drawings and specifications herein, are achieved by computer control of the fish passage system in which fish in migration upstream or downstream are hydraulically levitated between substantially different elevations, through a multiplicity of capsules with inlet and outlet conduits, connected functionally in series and in parallel, operable in discretely controlled steps, where fish are not subjected to unnecessary delays, nor abrupt changes in pressure, water flow, or swim direction, always facing into the stream under flow control while swimming in upstream migration and always swimming with the stream under flow control in downstream migration.

This invention is explained by viewing schools of fish as sentient underwater travelers, moving upstream or downstream, analogous to air-travelers moving in charter flights, traveling globally via air filled capsules (airplanes), through a network of air terminals, freshening up while resting between arrival and departures, adjusting their buoyancy after moving through changes in elevation. Humans similarly to better enjoy their travel experience: In air travel, adjust pressure within their inner ear when ascending and descending; and when swimming underwater, conserve strength by adjusting their buoyancy for varying depth by computerized scuba equipment, and ascending slowly with rest periods to avoid the bends.

The invention includes adjustable means for injecting fresh water into the passageway system and flushing spent water out, a feature that is increasingly preferable for levitation systems comprising a multitude of fish transfer stations over considerable change of elevation.

Capsules include adjustable rest periods for calming fish, fresh air, nutrients for energy replenishment, portholes with shades to adjust natural light, and an adjustable pressure cap to mitigate impacts of bubble disease in regions of high total dissolved gas.

Adjustable water flow control includes a variety of short pulses for varying stimulus according to fish species.

Discrete control inherent in the invention is possible because the invention apparatus system variables are observable and controllable. Optimal adaptive control enables adjusting the discrete steps of levitation, for different fish species, and for changing conditions.

General

The process of levitation is explained using the following terminology to describe the hydraulics of the invention.

GLOSSARY

"capsule" means a vessel for fish migration distinguished as an arrival(s) capsule and a departure(s) capsule, with a controlled air and water environment analogous to a capsule for human travel in space except connected by conduits for aquatic travel by fish swimming through water to effect changes of elevation, and connected to a tertiary conduit system with means for adjusting water level and maintaining air pressure within the capsules, maintaining an air space of about 10% of capsule volume at the top of the capsule for fish to adjust their buoyancy and stabilize their oxygen requirements.

"station" means a transfer point at a particular elevation with a multiplicity of stationary capsules, each with inlet and outlet openings, for transferring fish along a passageway, aka 'a fish transfer station', including capsules capable of pressure variation from less than atmospheric to a pressure head of about 100 feet or more, (43.3 psi or more) and includes at least one capsule designated as "A" or "B" for fish passage and water flow, and optionally a capsule designated as "C" mainly for ancillary water flow to enhance efficiency of fish transfer through capsule "A" or "B" or both and for standby contingent on an interruption of "A" or "B".

"fish passage conduits" means elements of a fish passageway along an incline, comprising conduits of significant diameter, which on upstream migration connect the respective outlets of capsules "A", "B" and "C" to the inlets of the next higher elevation fish transfer station and the respective inlets of the capsules to the outlets of the next lower elevation transfer station. (Read "inlets" and "outlets" transposed on downstream migration and as fish pass over the crest of a dam.)

"phase A" means comprised of capsules designated as "A" and associated fish passage conduits, "phase B" means comprised of capsules designated as "B" and associated fish passage conduits, "phase C" means comprised of capsules designated as "C" and associated passage conduits.

"tertiary conduit system" means a system of substantially smaller diameter conduits compared to the fish passage conduits, fitted with valves, turbines, and pumps, electrically coupled to a external electrical power system, which facilitates adjustment of pressure and water flow within the capsules and the fish passage conduits at each station, for controlling water flow in the fish passage conduits between stations, and includes screens at connection points to block fish from entering the tertiary conduit system.

"levitation" means a process for moving fish through changes in elevation in discrete steps, in either direction, known herein as micro steps, between an afterbay and a forebay of a dam, and includes means for adjusting hydrostatic pressure and buoyancy for ease and efficiency of fish migration through conduits along an incline. The micro steps for fish movement between stations along a passageway are aggregated into macro steps, and put into operation in synchronism for the purpose of enabling water to flow harmoniously over the passageway and for fish to swim at their own particular sustainable speeds through the resulting slow moving water.

"levitation module" means an assembly of select capsules and conduit along a passageway defined and secured by closed gate-valves at both ends, comprising a capsule at a lower station connected through an operable gate-valve to a fish passage conduit to an upper station, from thence through an operable gate-valve to a capsule at the upper station. A levitation module comprises a single capsule where the levitation step is a communication through a conduit into the bay of departure or bay of destination.

"levitation step" on the afterbay side of an obstruction, means a step of movement of fish along an incline within a levitation module: an "upstream levitation step" means a step to the upper capsule, distinguished as the arrivals capsule, from the lower capsule, distinguished as the departures capsule, for fish migrating upstream; and a "downstream levitation step" means a step from the upper capsule, distinguished as the departures capsule, to the lower capsule, distinguished as the arrivals capsule, for fish migrating downstream. Whereas a "levitation step" on the forebay side of an obstruction means a transposition of the above terms "upper capsule" and "lower capsule".

"swim depth minimum" means the setting of a residual pressure in feet of head for fish to mitigate against gas bubble trauma (GBT), said setting at the capsule of the higher elevation of a levitation module that would otherwise be at atmospheric pressure, that serves and gives fish the environmental effect of always swimming (migrating) at a depth below the water surface of at least equal to the swim depth minimum, and with the result thereof of rising from a greater depth, hydraulically pressurized such that the entire levitation module is depressed in feet by the swim depth minimum, which is adjustable in the range of 0 to 15 feet. The lower capsule is pressurized by the head of water from the upper capsule plus the swim depth minimum pressure imposed at the higher capsule.

"levitation head" is the pressure head in the lower capsule measured in feet of vertical elevation below the upper capsule of a levitation module plus the residual pressure, if any, of the swim depth minimum setting in the upper capsule to mitigate against GBT.

"dwell time" is a time, under control of the computer that begins when the arrivals gate is closed, generally of about 30 to 60 seconds duration, to switch over a capsule from an arrival state to a departure state and includes extra time for fish to adjust to a station transfer. Fish biologists may preferably adjust the dwell time according to fish species—for feeding, resting, mitigating GBT, particularly on first micro step into a fish passageway, etc.

"departures-gate" means a gate-valve (or equivalent shut-off valve) for control of fish departures from a departures capsule, and includes a departures-gate-bypass-valve.

"arrivals-gate" means a gate-valve (or equivalent shut-off valve) for control of fish arrivals to an arrivals capsule, and includes an arrivals-gate-bypass-valve.

"departures-gate-bypass-valve" means a relatively small valve integral with the departures-gate valve that opens to allow water to bypass a departures gate and equalize pressure across the gate, and thereby ease opening of the larger valve.

"arrivals-gate-bypass-valve" means a relatively small valve integral with the arrivals-gate valve that opens to allow water to bypass an arrivals gate and equalize pressure across the gate, and thereby ease opening of the larger valve.

"levitation step initialization" means adjusting water pressure, air pressure, and water level in the capsules within a levitation module to a steady-state condition in preparation for a levitation step, specifically, within the capsules to set and maintain an air space of about 10%, by means including opening the gate-bypass valves and making small adjustments in water flow and air pressure, while the pressure within the lower capsule equals the head of the difference in elevation with the upper capsule, plus any residual pressure in the upper capsule, which is preferably at atmospheric, except when it is preferable that the passageway be further pressurized to swim depth minimum to aid fish to mitigate against gas bubble disease as fish migrate through the passageway, after having passed through supersaturated water of the afterbay or forebay of dams generally and hydro-electric dams in particular.

"school of fish" means an aggregation of fish within a levitation module.

"de-gasification" means neutralizing otherwise gas saturated passage water, by injecting a neutralizing gas into a capsule or conduit or both.

"fish transfer efficiency" means measurements at a point of time of the weight of fish transferred over a period of time through some difference in elevation along a passageway, per volume of water transmitted with the fish, used for comparison with prior art fish passage systems, such as for example fish ladders, i.e. 1,000 lbs of fish per 300 cubic feet of water at a point in time, over 24 hours, through an elevation difference of 100 feet, or alternatively, numbers of fish per day of a particular size with flow in cfs.

"hydraulic efficiency" of the invention means the percentage of energy recovered of the total energy of all water transmitted through the passageway system, water that would otherwise have passed through the turbine of the main generating station, for comparison with the hydraulic efficiency of the turbine(s) of the hydro-electric station.

"energy efficiency" means efficiency of conversion of energy of passageway water to electrical energy.

"what-if" means a process of experimental substitution by varying parameters to provide an alternative outcome, for example 'what-if' the fish were to swim at twice the previously assumed speed, or 'what-if' the conduit was varied over a range of diameters, etc.

"quadrant" means segregation of fluid flow in a first direction Q1 and a second and opposite direction Q2, and impeller rotation of forward rotation (cw) and of reverse rotation (ccw), into four quadrants, Q1 to Q4, of a motor/pump device in motoring mode and a turbine/generator device in regenerating mode, with reversible rotation in each of the quadrants. Energy flows from the utility in motoring mode in quadrants Q1 and Q2, to power the motor/pump device, and to the utility in regeneration mode in quadrants Q3 and Q4, to recover fluid flow energy via the turbine/generator device.

Hydraulics of Levitation

The invention discloses a process of fish migration between a forebay and an afterbay, with discrete steps of levitation that facilitates passage over obstructions that are higher than the forebay and avoids the need for multi-level conduits for water for fish passage to flow from the forebay to the afterbay.

Generally, on the afterbay side of a dam, a levitation module is referenced to adjacent stations on a passageway, interconnected with fish passage conduits, connected so water flows by gravity from a capsule at an upper station to a capsule at next lower station. The lower capsule is designated as the "departure(s) capsule" when employed for fish migrating upstream and as the "arrival(s) capsule" when migrating downstream. (These terms are transposed with upstream/downstream migration and further transposed with upward/downward steps of levitation on the forebay side of the dam crest.)

Water from the forebay is pumped over the dam and flows by gravity from the crest to the afterbay. Fish in upstream migration, to complete their journey to the forebay, descend from the crest through levitation steps of lowering elevation, while fish in downstream migration start their journey from the forebay by ascending to the crest through steps of increasing elevation.

Each levitation step (micro step) requires an initialization to create a steady-state no-flow condition, beginning by closing the gate-valves at the upper and lower boundaries of the levitation module to isolate fish and water flow, and facilitate adjustment of pressure within the module. Generally, when migrating between the crest and the afterbay, the fish will be in the lower capsule when migrating upstream, and in the upper capsule when migrating downstream. (The opposite is true, when migrating between the crest and the forebay.) The levitation module spans adjacent stations and water pressure within the module is adjusted so the upper capsule is at atmospheric pressure while pressure in the lower capsule is at a pressure head equal to the difference in elevation between the capsules. Normally, any residual pressure above atmospheric pressure within the upper capsule is to be avoided because it adds to the pressure within the lower capsule and is incrementally distributed along the interconnecting conduit according to its slope. However, when preferable, residual pressure at the upper capsule can be increased above atmospheric to mitigate against gas pressure disease, such that fish migrate through the passageway under at least 5 to 10 feet of head when they arrive at the upper capsule when swimming upstream or when departing the upper capsule when swimming downstream.

Fish levitate themselves within a levitation module while swimming through the interconnecting conduit as water flows between capsules of differing elevation, adults migrating upstream while swimming into the stream and juveniles migrating downstream while swimming with the stream. Fish adjust their buoyancy much like air-travelers adjust pressure in their inner ear when departing and arriving and for changes in cabin pressure during flight. In a preferred embodiment, the incline of interconnecting conduits is configured in the range of about 30 to 45 degrees above horizontal and flow along the conduit is preferably adjusted to not more than about 1.5 feet per second (fps). Two fps is about the rate of water flow through an open culvert with a grade of about 1 percent. Water flow control is explained under the header Computer Control.

Fish swimming into the arrivals capsule can start to adjust their buoyancy and oxygen requirement on arrival through to when arrivals are deemed complete and the arrivals-gate is closed behind them, which is the starting point of dwell time, and continuing through as the arrivals capsule is changed over to become the departures capsule for the next step of levitation. Fresh water is injected and spent water is removed as required at either or both capsules by way of the tertiary conduit system, through screened openings which block passage of fish. Prior art discloses various means for tracking fish and for ensuring that fish are stopped safely prior to a gate-valve closing before them to block their passage. Preferably fish in schools are counted, and numerical methods used for data logging and sorting for input for optimal control.

A levitation step within a levitation module begins with an initialization procedure. For an upstream migration, it includes gradually increasing air pressure within the departure capsule from atmospheric pressure (which was the arrival pressure of the previous step) to the pressure head from the station above, and by electrically opening the departures-gate-bypass-valve thereby allowing water from the station above to slowly flow around the departures gate to gradually pressurize the departure(s) capsule to the departing pressure. The upper capsule of the levitation module is deemed to be the arrivals capsule, only after checking that the previous levitation step of departure from the station above had completed, all the fish had departed from the upper capsule, that the associated departures-gate is closed, and that the arrivals-gate and associated bypass valve downstream of the capsule is also closed.

Air pressure within capsules of a particular station module are preferably controlled by separate compressors at each station, especially preferable with systems with two or more capsules per station, economical because air pressure alternates between adjacent capsules coincident with their changing arrival and departure roles. The turbine of the station compressor is preferably connectable between capsules of the station and capable of motoring and regeneration modes and coupled to an induction motor connected to the utility for energy exchange. The initialization step includes bleeding down the air pressure within the upper capsule to atmospheric pressure, plus the minimum swim depth pressure if any, and adjusting the water level within the capsules to about the 90% full level, and then the bypass-valves are closed at the lower station and upper station. The levitation module in now in a steady state: the connecting fish passage conduit full with water and no water flowing, ready for a levitation step, upstream or downstream depending on whether the fish are returning home or leaving home. Fish are encouraged to migrate through the fish passage conduit by opening the arrival and departure valves to allow fish passage and by injecting water from the tertiary conduit system into the top capsule and out the bottom capsule of the levitation module.

The levitation system is inherently configured for larger adult fish to migrate upstream by pointing the taper of the capsule upstream, which still allows smaller juvenile fish swimming with the stream to migrate downstream. The butt end of a capsule opposite the tapered end is preferably removable to facilitate maintenance, such as for example, scrubbing out the capsule and interconnecting conduit. (Optionally, the capsules can be tapered at both ends, which may be preferable for passage of large fish.)

When the passageway is selected for migrating downstream, a levitation step for downstream migration also includes a dwell time for resting for fish to adjust their levitation, etc., after arriving at the arrivals capsule, with the time beginning after arrivals are deemed complete and the arrivals gate is closed behind them, and the time continuing as the capsule is changed over to become the departures capsule for the next step of lowering of levitation. Pressure within the arrivals capsule of the station below is gradually increased from atmospheric pressure by air from the station compressor and by electrically opening the arrivals-gate-bypass-valve at the lower station, thereby allowing water to flow from the station above and pressure to stabilize in the inclined conduit while simultaneously releasing air at the station above and opening the departures-bypass-valve to de-pressurize the departures capsule in readiness for departure to the station below. During the dwell period, where preferred at stations along the passageway, fresh water is injected and spent water is ejected by way of the tertiary conduit system.

Computer Control

Water flow along the passageway is controlled by computer. The following elements are included in computer control:

1) System passage water priming;
2) Energy recovery;
3) Attraction water flow—on upstream migration and on downstream migration;
4) Station dwell time;
5) Minimum residual pressure;
6) Flow rate—on upstream migration and on downstream migration;
7) Fresh water injection;
8) Spent water ejection;
9) Fish count; and
10) Other features as will become apparent in the detailed description.

BRIEF DESCRIPTION OF THE DRAWINGS

Further features and advantages of the invention will become apparent from the detailed description taken in conjunction with the accompanying figures showing illustrative embodiments of the invention in three passageways in which.

DETAILED DESCRIPTION OF THE INVENTION

This specification and accompanying drawings disclose preferred embodiments for teaching the invention using terminology set out in the glossary and under the header computer control, and incorporates the explanation of the hydraulics of levitation. Generally schools of fish are in upstream migration except where stated to be in downstream migration. An overview of the levitation process according to the invention is as follows. A levitation module links two adjacent stations in a micro step for fish movement along a passageway. The disclosure includes two station embodiments and three passageways. The process of initializing micro steps of the two embodiments are similar. A first embodiment shows a typical levitation module and a first passageway to the right side of the river stream of a first high gravity dam (FIG. 1, 9, 10, and FIGS. 16 to 21) and a second passageway to the left side of a higher gravity dam (FIGS. 22 to 31). A second embodiment shows a typical levitation module used for a third fish passageway, essentially centered on the face of a high arch dam (FIG. 2, 11, 12, and FIGS. 32 to 39). Two flow diagrams show the levitation process of the invention: levitation macro step synchronization in FIG. 43; and initialization of micro steps of station modules in FIG. 44. Levitation modules are imbedded in station modules, linked together to form a passageway. (Levitation modules describe small steps or micro steps of levitation at station modules. The micro steps are synchronized for schools of fish to move harmoniously through station modules in macro steps as shown at FIGS. 40 to 44.)

Figure 1:
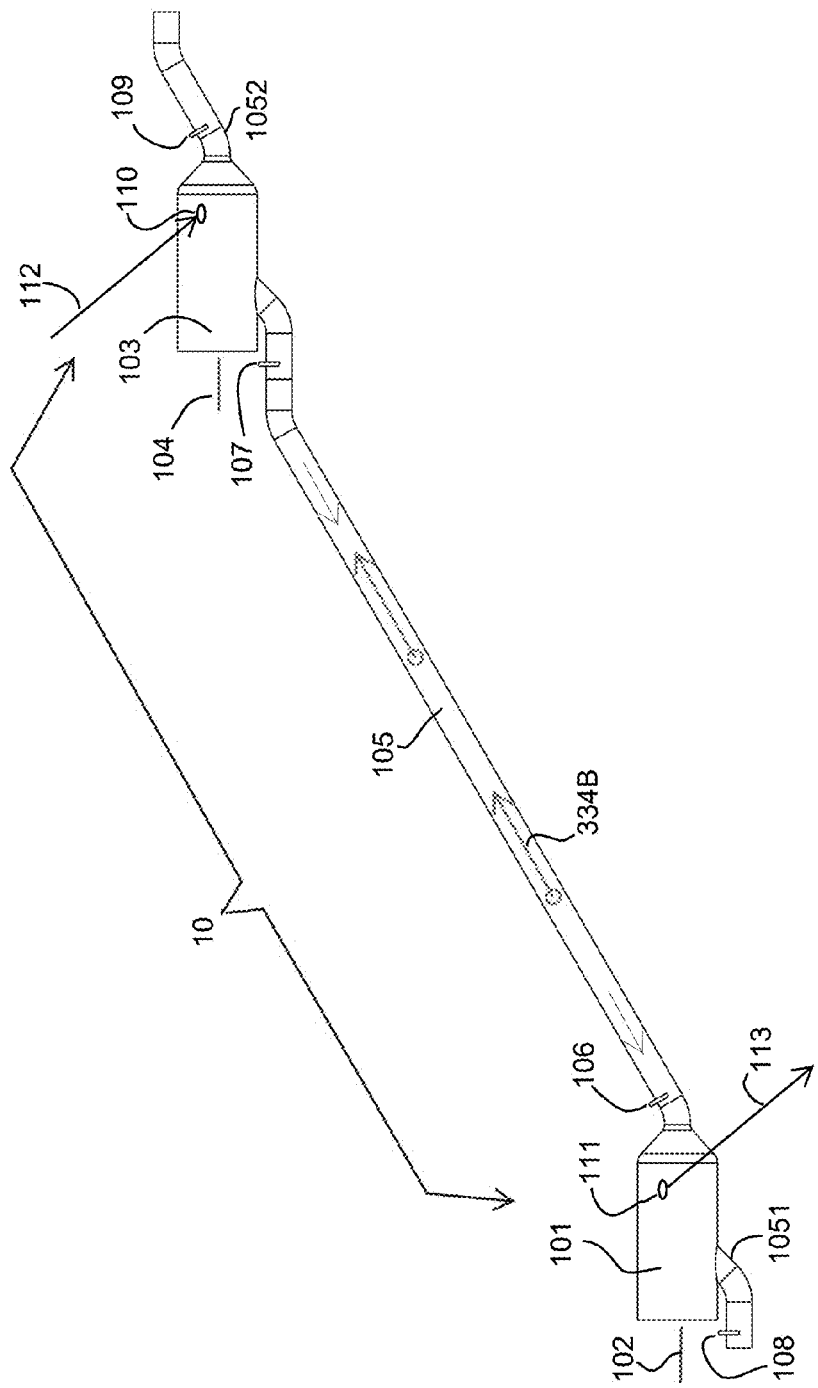
FIG. 1 is a front view of a first embodiment of a typical levitation module.
Figure 9:
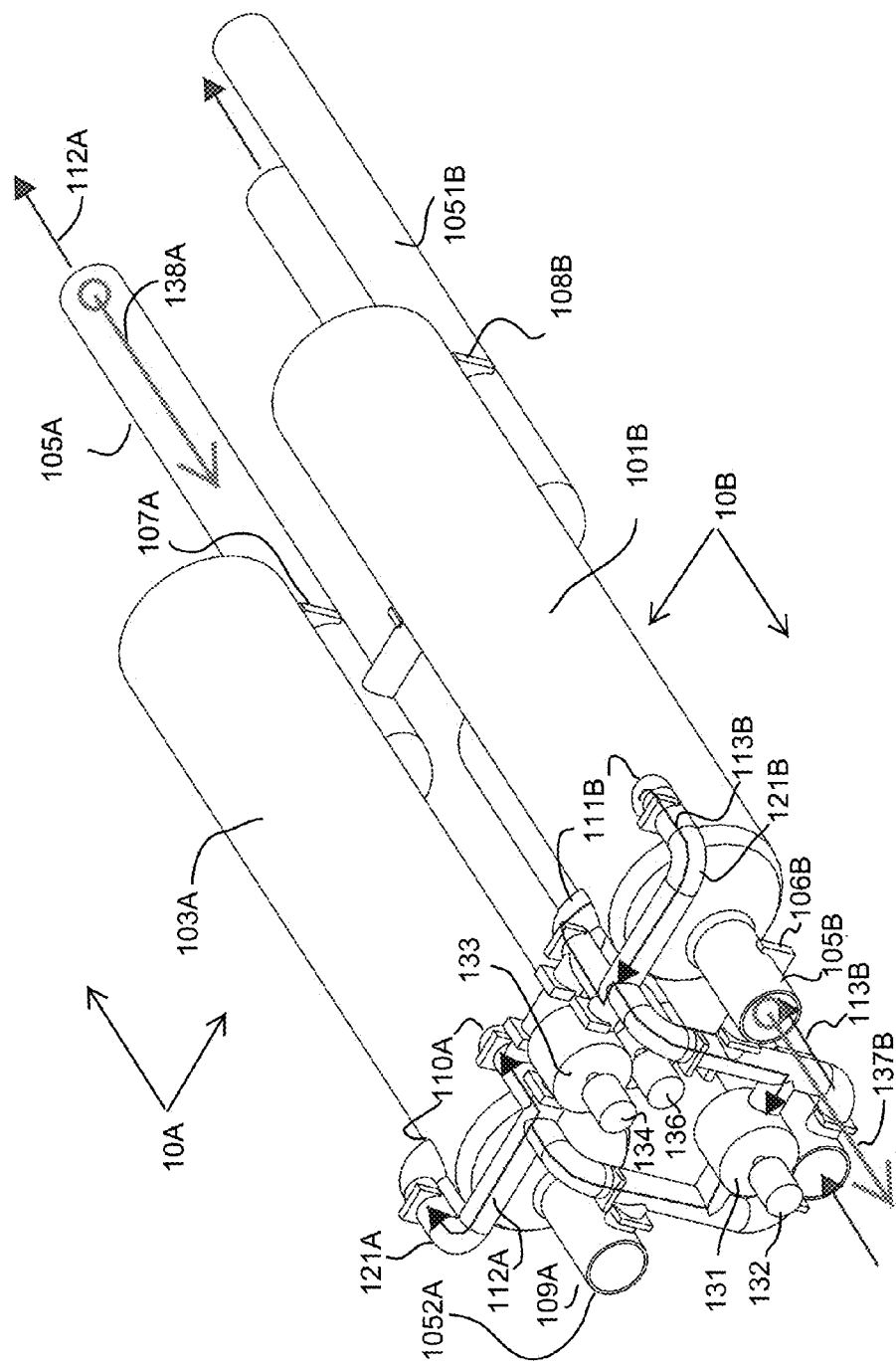
FIG. 9 is an isometric view of a typical three phase station upper module of a first embodiment showing fish arriving on phase A and departing on phase B, with element designations according to FIG. 1.
Figure 10:
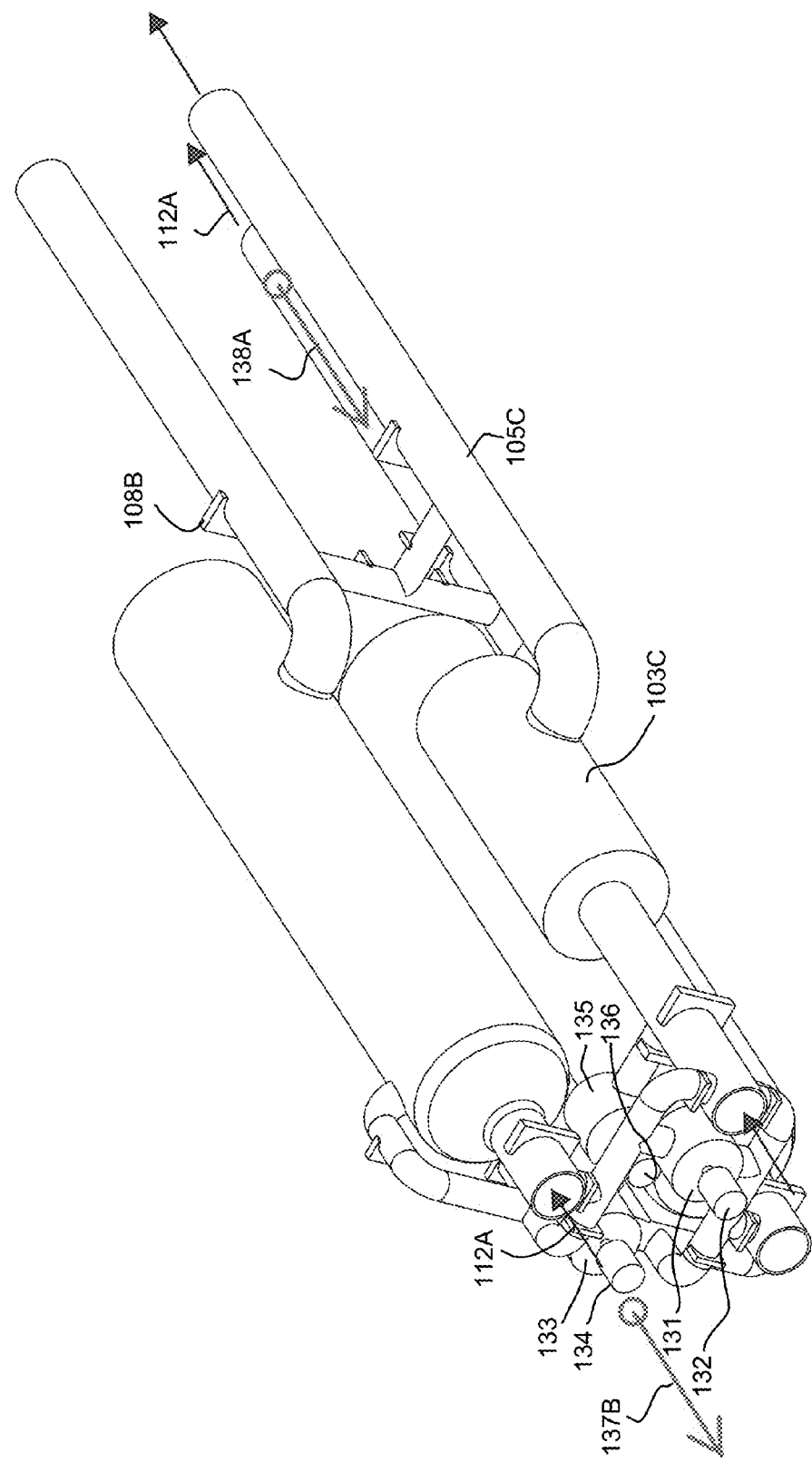
FIG. 10 is a view of station of FIG. 9 rotated 90 degrees about a longitudinal axis.
Figure 11:
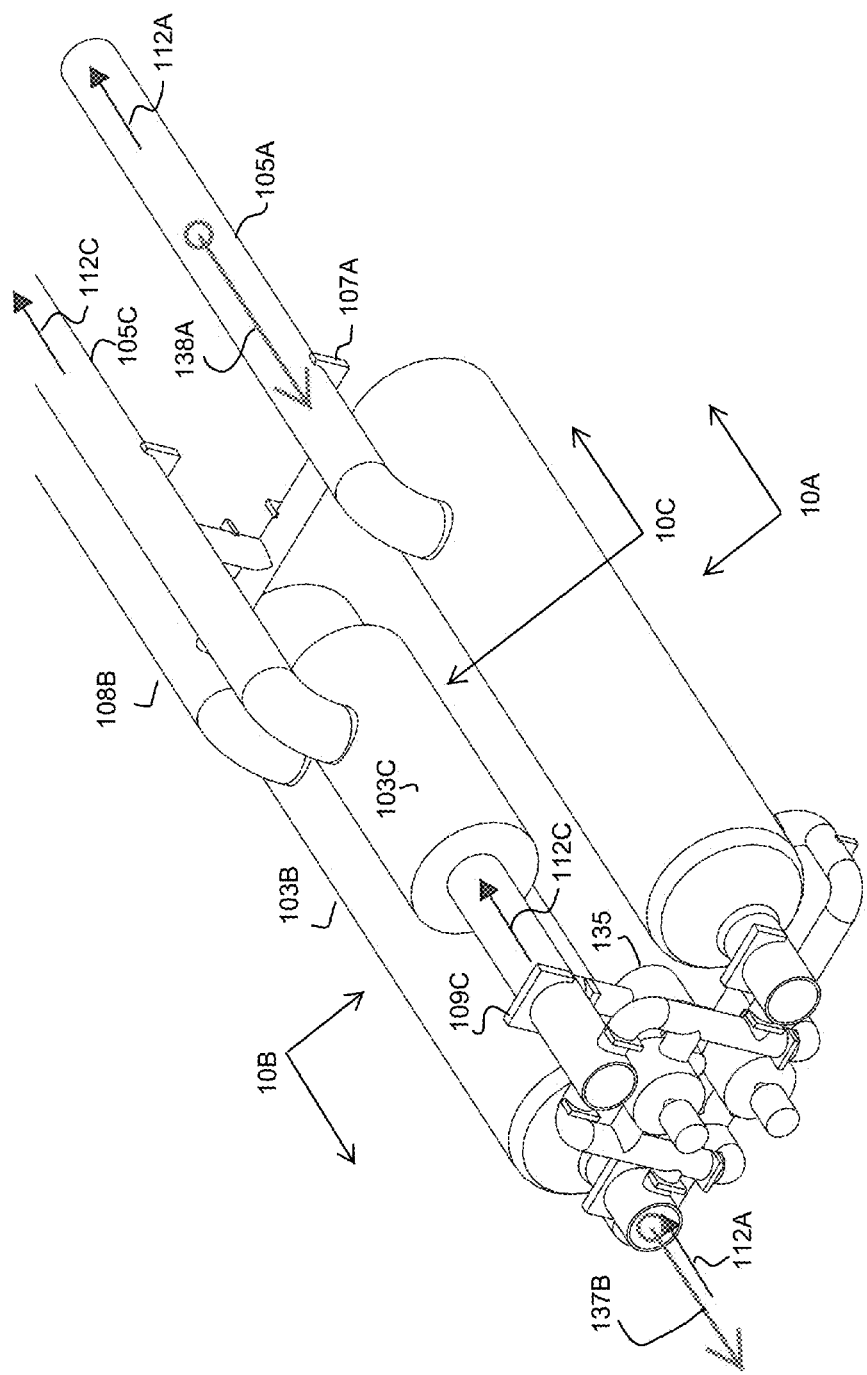
FIG. 11 is a view of the station of FIG. 9 rotated 180 degrees about a longitudinal axis.

The typical fish levitation module of the first embodiment shown in FIG. 1 is explained as it would apply to a school of fish migrating upstream. It includes a departures capsule 101 at a lower elevation 102 and an arrivals capsule 103 at a higher elevation 104 connected by a fish passage conduit 105 with a departures gate-valve 106 at the lower end and an arrivals gate-valve 107 at the upper end. Gate-valves 108 and 109 beyond the lower end and upper end of the conduit 105, opposite gate-valves 106 and 107 at capsules 101 and 103, on conduit stubs 1051 and 1052 respectively, are closed to isolate (to secure) the levitation module within the fish passageway between elevations 102 and 104 respectively. In this invention, fish migrate in a particular direction as they go through steps of departure and arrival to effect changes of elevation, as if they were migrating along the side of a valley from the afterbay to go around a dam. An air space for fish to breathe, of about 10% of volume, is maintained in each capsule by an air compressor and a water level sensor switch (not shown). The module of FIG. 1 goes through a process of levitation initialization as shown on FIG. 44 and which includes setting the swim depth minimum to mitigate gas bubble trauma. The elements of FIG. 1 are aggregated in single phase, two phase and three phase station modules and distinguished with a suffix A, B, or C, for phase A, phase B, or Phase C, respectively, and whether the capsule in the upper capsule or the lower capsule. Furthermore the levitation step 10 of FIG. 1 would be distinguished with 10A for the A side, 10B for the B side, and 100 for the C side, as shown in FIG. 9 to FIG. 11. The levitation step 11 of FIG. 2 would be similarly distinguished.

Figure 2:
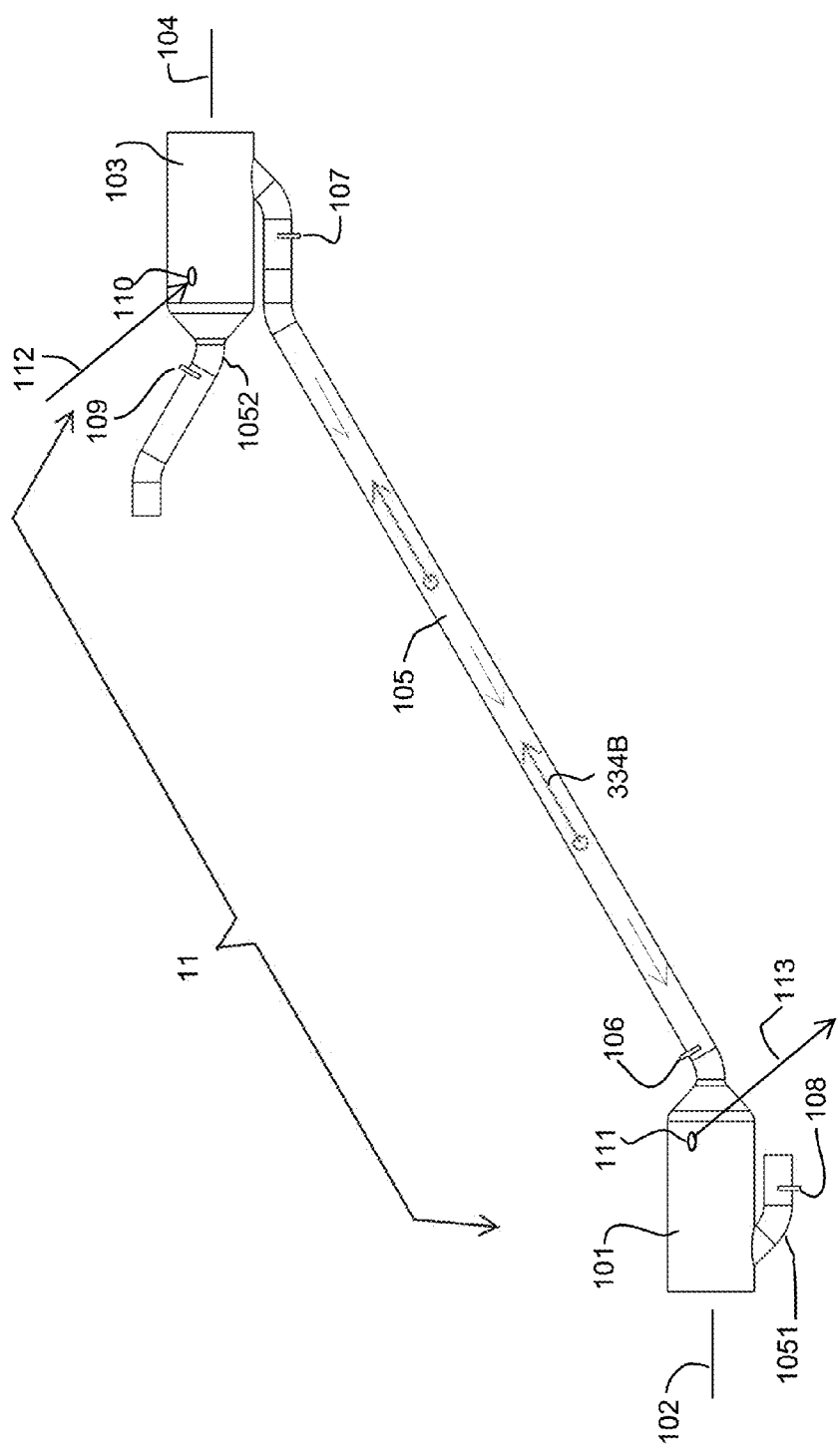
FIG. 2 is a front view of a second embodiment of a typical levitation module.
Figure 6:
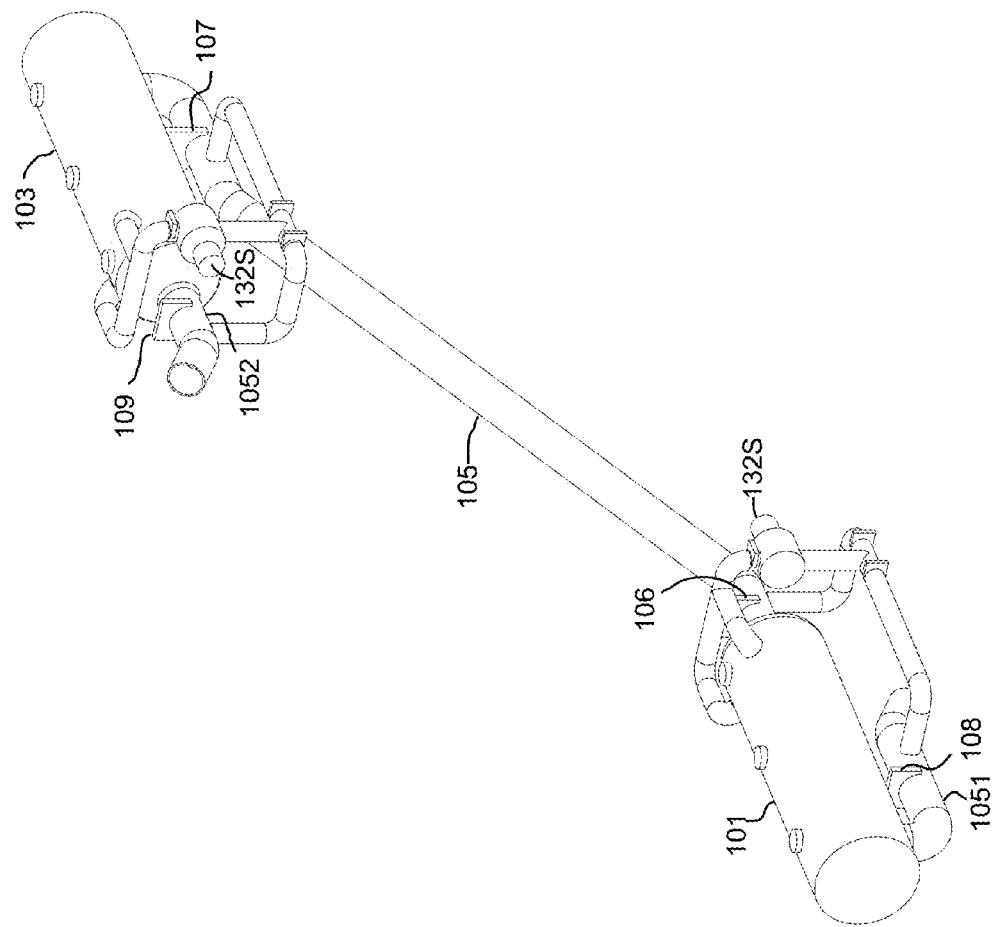
FIG. 6 is an isometric view of a micro step of a second embodiment of a single phase levitation module.
Figure 7:
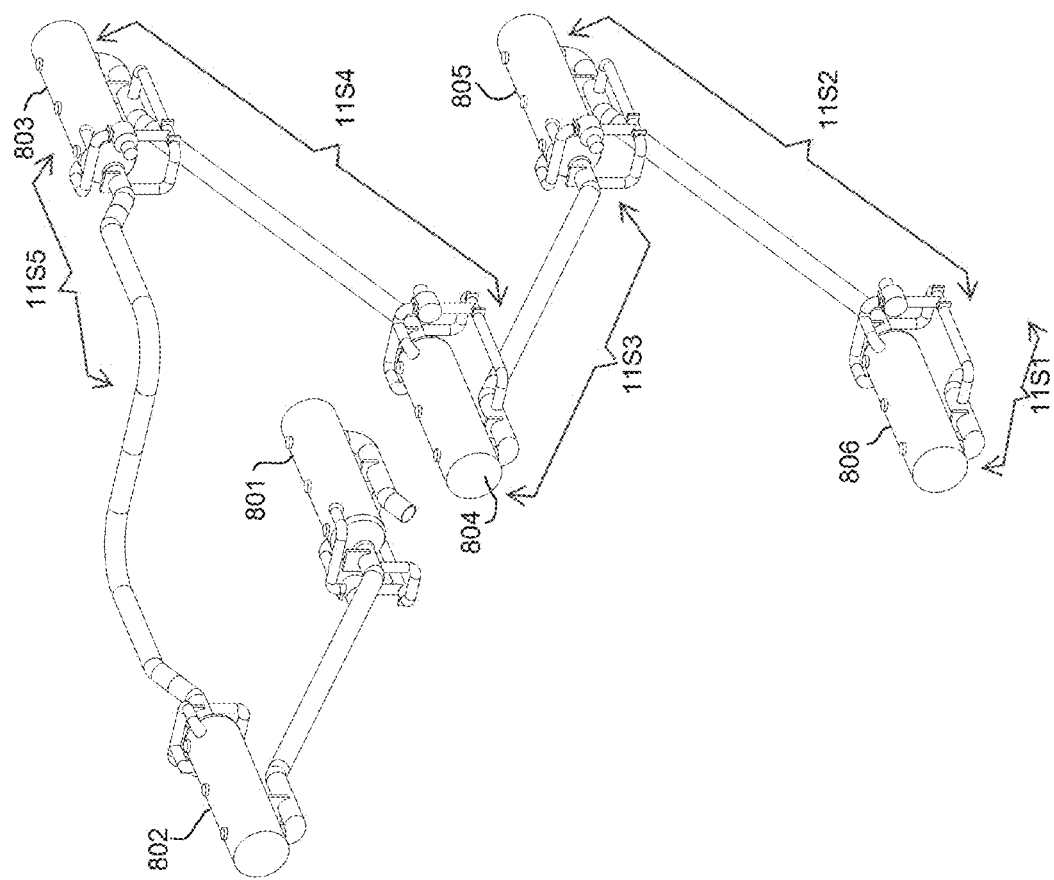
FIG. 7 is an isometric view of a macro step of 6 stations of a second embodiment of a single phase levitation module.

The typical fish levitation module of the second embodiment 11 shown in FIG. 2 is similar to the first embodiment 10 shown in FIG. 1, except the second capsule 103 is swiveled like in a highway switchback, thereby enabling subsequent modules to be stacked vertically, or in a plane at an angle to the vertical, like a sloping face of a high gravity or high arch dam, suitable for schools migrating up the face of a dam or canyon wall. FIG. 6 shows a single micro step in single phase and FIG. 7 shows a passageway over a dam in a macro step comprising six stations, 801, 802, 803, 804, 805, and 806. It can be shown that adults can migrate upstream over the dam and juveniles can migrate downstream over the dam in 8 macro steps.

Water flow through the fish passage conduit 105 in the levitation modules 10, 11, is preferably adjusted to about 1.5 fps for ease of fish passage, equivalent to free flow through a conduit or culvert passageway at a gradient of less than 1 percent, where fish are known to swim with ease at a sustained pace. Water enters as shown by an arrow 112 from an upper tertiary conduit system (not shown) through openings 110 that are symmetric about a vertical axis on both sides of the upper capsule 103 and exits as shown by an arrow 113 through openings 111 on both sides of the lower capsule 101 to a lower tertiary conduit system (not shown). The water level is kept above the openings 110, 111 in their respective capsules 103, 101. The openings 110, 111 are screened to prevent fish from migrating into the tertiary conduit system. The openings 110, 111 are sized to avoid turbulence, by setting the total openings area in each capsule to equal to the cross-sectional area of the fish passage conduit 105.

Data on swim speeds of various fish species used in this disclosure was taken from a United States federal department website. It is shown fish of about 30 inch length are able to swim for prolonged periods of 30 minutes at speeds of 6 fps, and have burst speeds of 12 fps for up to 5 seconds. This is reduced by 50% in the following computations for a conservative comparison of the fish transfer efficiency of the invention with prior art fish passage systems.

Figure 8:
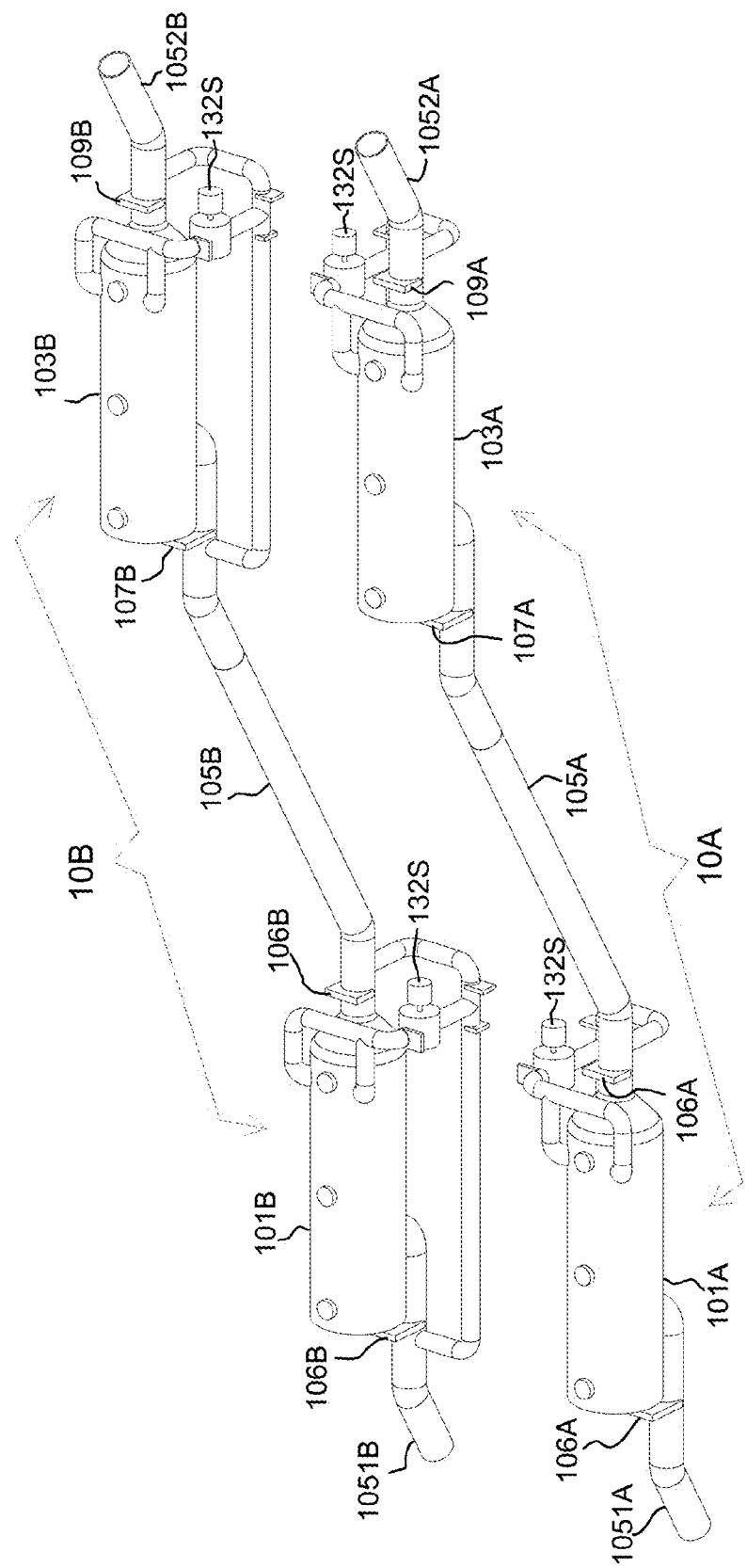
FIG. 8 is an isometric view of a micro step of a first embodiment of a two phase levitation module.
Figure 12:
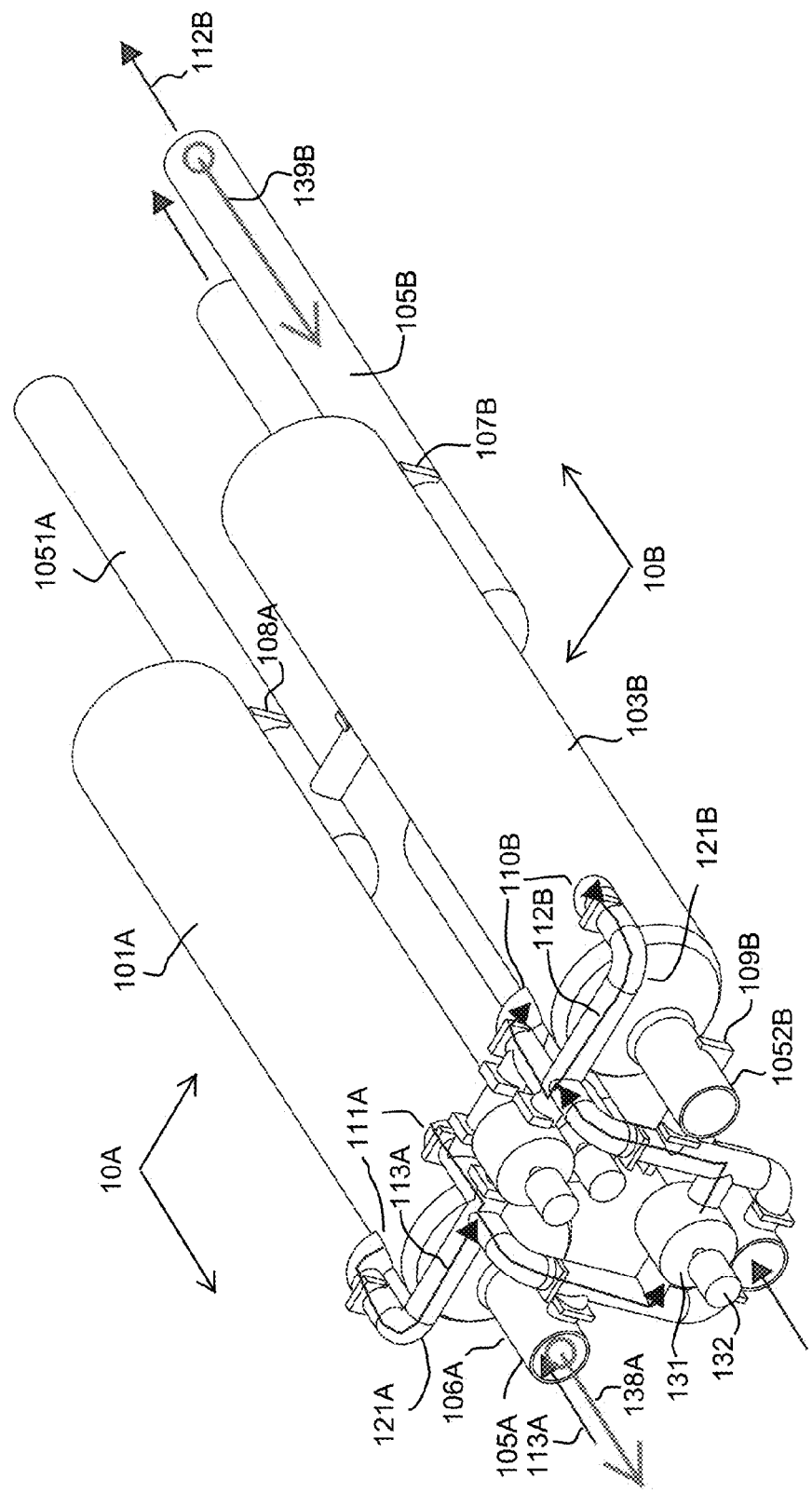
FIG. 12 is a view of the station of FIG. 9 except a lower module with fish migration on the alternate sides of the station, with fish departing from the A side of the station and fish arriving on the B side of the station, with element designations according to FIG. 1.

A typical station module of the first embodiment comprises two halves of a levitation module, phase A and phase B, as shown in two phase in FIG. 8 and in three phase in FIG. 9. The station module comprises the requisite elements of two levitation modules 10 from FIG. 1, further designated with suffix A and B, to read 10A and 10B, the arrival capsule 103A of phase A on the left, and the departure capsule 101B of phase B on the right, when looking downstream. The associated departures capsule in levitation module 10A from which fish school 138A is migrating upstream from a lower elevation station is not shown, and the arrivals capsule in levitation module 10B to which fish school 137B is migrating upstream to a higher elevation station is also not shown. Fish school 137B would have arrived at this station in a previous (synchronous) levitation step. The next school to arrive at this typical station is 139B is shown in FIG. 12 and school 138A is departing.

Figure 3:
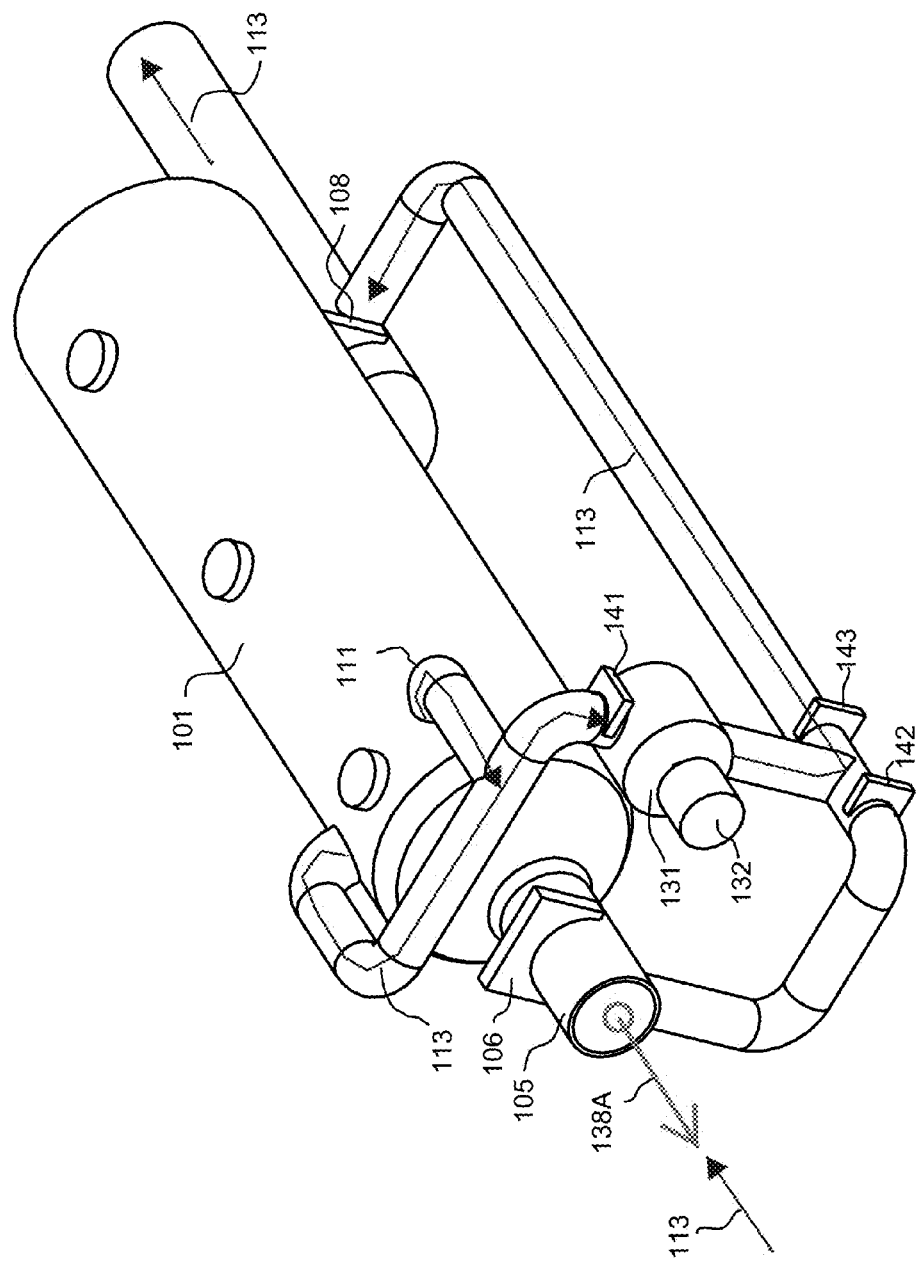
FIG. 3 is an isometric view of a first embodiment of a single phase station module.
Figure 4:
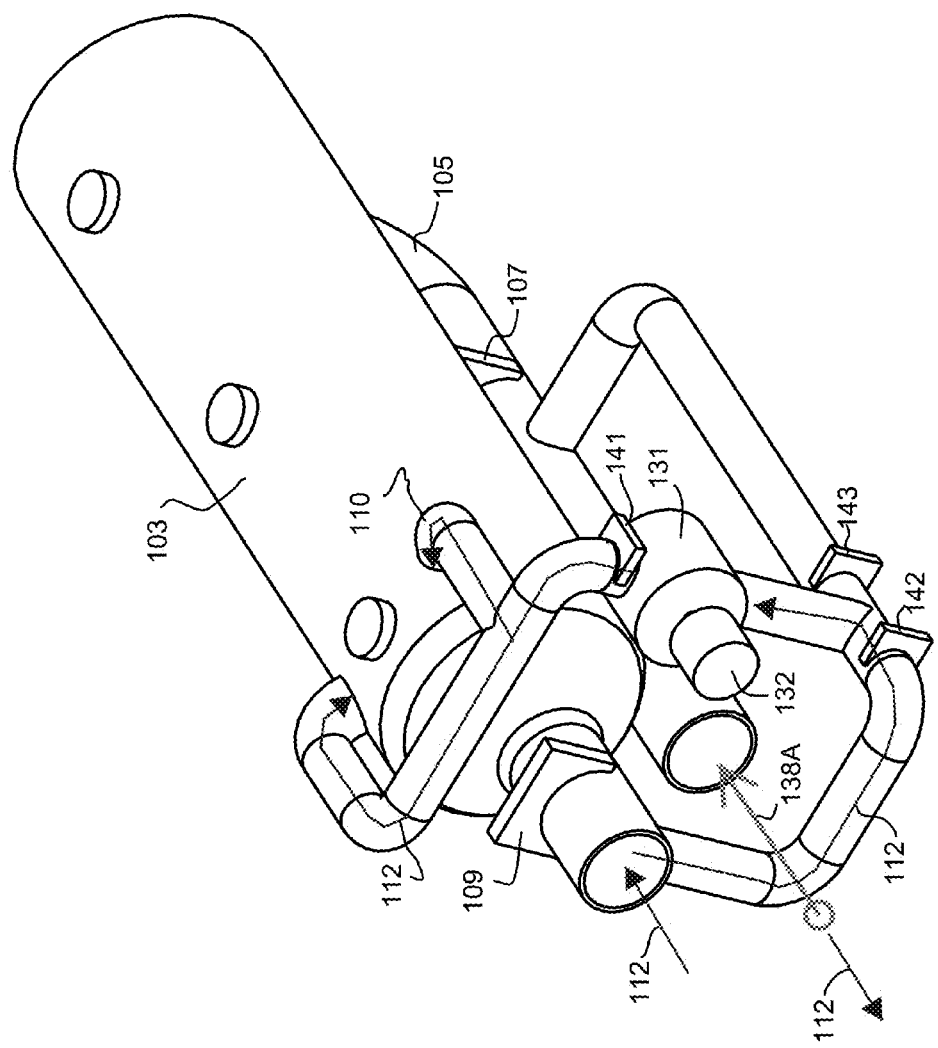
FIG. 4 is an isometric view of a second embodiment of a single phase station module.
Figure 5:
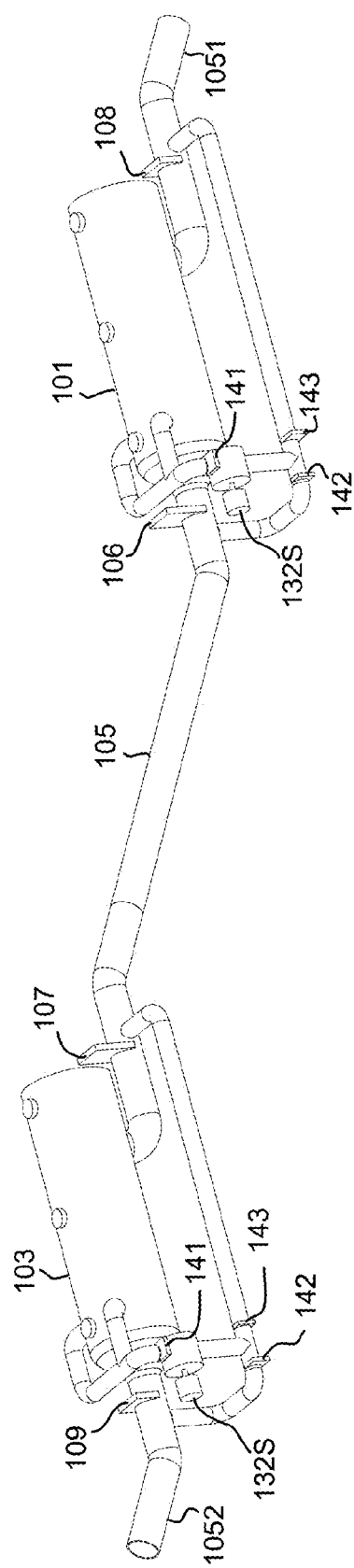
FIG. 5 is an isometric view of a micro step of a first embodiment of a single phase levitation module.

In the first levitation step of the first embodiment shown in FIGS. 9, 10 and 11, two schools of fish 137B, 138A, are shown swimming upstream, 137B is departing and 138A is arriving. In a second levitation step, school 138A is departing and a third school 139B is arriving as shown in FIG. 12. Of the total volume of water in a levitation module only a relatively small volume of water moves down the passageway in a controlled cascade from one system side to the other. In FIGS. 9, 10 and 11 the water flows from phase B as shown by the arrow 113B to phase A as shown by the arrow 112A, coming from the B side of the station above through conduit 105B entering capsule 101B through an open departures-gate valve 106B, from thence through tertiary openings 111B through tertiary conduit network 121B, from thence through a first turbine 131 coupled to an electric generator 132, from thence through tertiary conduit network 121A, from thence through tertiary openings 110A into capsule 103A, and from thence through the open arrivals-gate valve 107A through conduit 105A to the departure capsule 101A on the A side of the station at a lower elevation (not shown). Input pressure to turbine 131 equals the head of the departures capsule 101B, and the outlet pressure of the turbine 131 equals atmospheric pressure, plus the swim depth minimum setting for capsule 103A, which could be in the range of 0 to 15 feet. (The swim depth minimum setting for capsule 103B is included in the pressure of capsule 101B at the station above.) The turbine 131 under pressure head from the station above rotates the electric generator 132 (or motor to operate above synchronous speed) and delivers electric power to the electric utility via a connection (not shown). The turbine 131 is equipped with electrically actuated displacement control, ramped up from zero to allow flow through the conduit 105A to gradually increase to 1.5 fps, and stimulate fish 138A to swim up the conduit 105A and settle in the capsule 103A and for fish 137B to depart from capsule 101B and swim through the conduit 105B to capsule 103B of the B side of the station above (not shown). FIGS. 3 and 4 show the passageway according to the invention in single phase mode according to FIGS. 1 and 2. FIG. 3 is the lower station capsule 101 (first embodiment) and FIG. 4 is the upper station capsule 103 (second embodiment). Fish in upstream migration are shown departing capsule 101 of the lower station FIG. 3 and arriving at the upper station FIG. 4. Gate valves 108 and 109 are closed to block passage of fish and 106 and 107 are open to allow passage of fish. Tertiary valve 142 is closed and tertiary valves 141 and 143 are open in FIG. 3 to allow water flow 113 through the turbine 131 and out the passageway to the next single phase station (not shown). The generator 132 supplies power to the utility system (not shown). Water flow 112 from the station above is blocked from passing directly into capsule 103 by closed valve 109 and passes through open valves 142 and 141 and is blocked by closed valve 143. Water flow 112 under pressure head of the station above passes through turbine 131 and generator 132 provides power to the utility system (not shown). Single phase operation has shortcomings and is not the preferred mode of operation.

Figure 15:
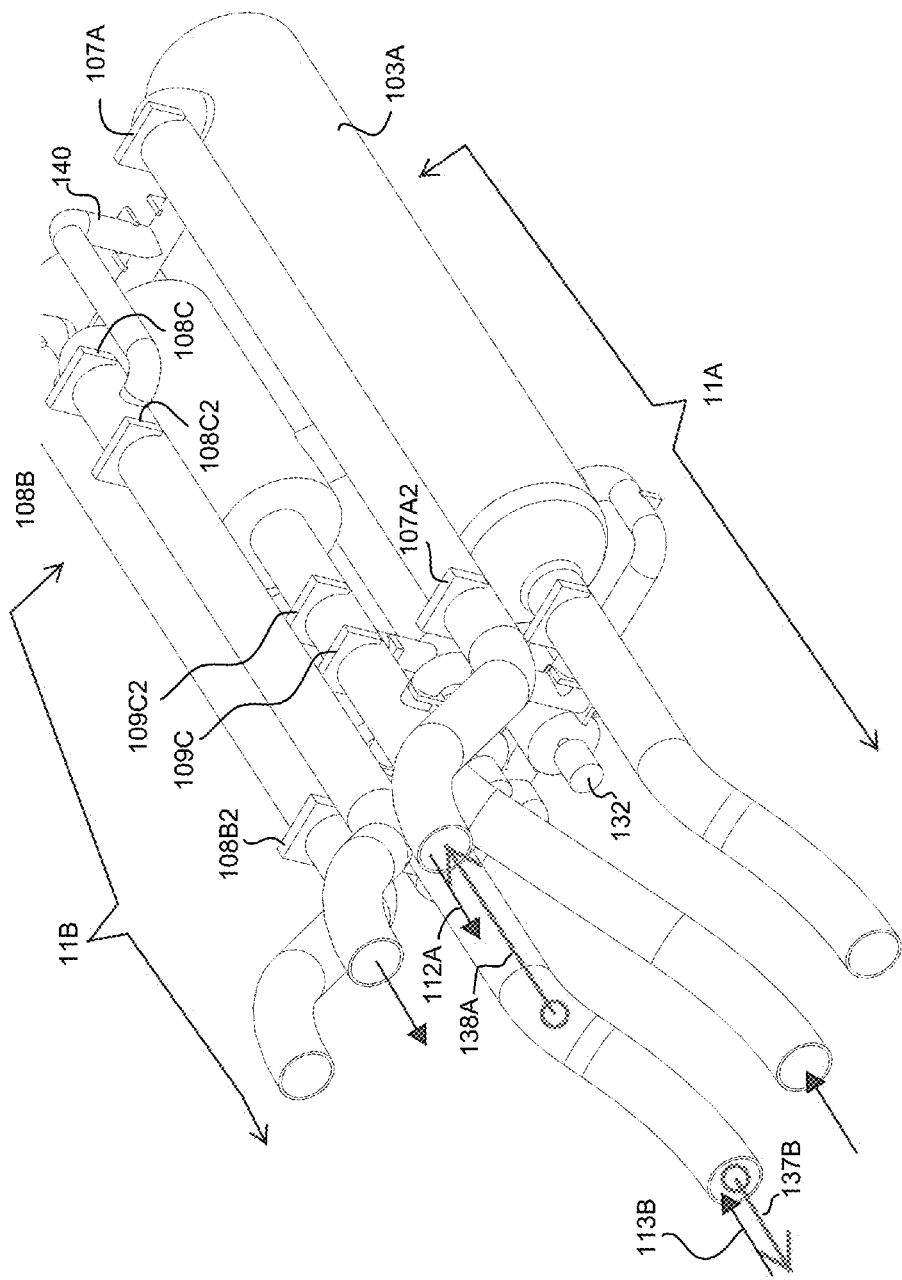
FIG. 15 is a view of the station of FIG. 13 rotated 180 degrees about a longitudinal axis.

Continuing now with three phase mode operation, according to FIGS. 9, 10 and 11. The passageway system includes redundancy for increased reliability and to facilitate maintenance. The first turbine 131 and generator 132 set is hydraulically in parallel with a second turbine 133 and second generator 134 set. Preferably the turbine is operable as a pump and the generator is operable as an induction motor (or synchronous motor). The first set can share load with the second set or operate separately with one as standby for the other. A third set of a similar turbine 135 and a generator 136 links the A and B tertiary conduit systems with the C conduit system as shown in FIG. 10 and FIG. 11. It is apparent from FIG. 11 that with gate-valve 109C closed a portion of water flow 112A could be directed through turbine 135 as shown by water flow 112C through capsule 103B and discharged out conduit 105C to a lower station. With a second gate-valve 109C2 installed downstream of gate-valve 109C, as shown in FIG. 15, it is possible to inject water flow from the station above by opening gate-valve 109C and closing gate-valve 109C2 and designating the flow 113C from above (not shown) and controlling that flow with the third set of turbine 135 motor 136. A further explanation is given with reference to a schematic drawing in FIG. 42.

In the following computations the minimum swim depth setting is set the same for both schools of fish 137A and 138B. Persons skilled in the prior art will appreciate how to include different minimum swim depth settings in the computations. The following computations illustrate the scalability of the invention by a series of four what-if scenarios of increased conduit scale of the invention—18", 24", 36", and 48" diameter—with fish transfer efficiency comparison. A passageway of 48" diameter conduit, is preferable for the world's largest dam. A passageway scaled to 12" conduit would be suitable for study at a fish biology institution for downstream migration of juveniles. The levitation system explanation continues below.

In a first scenario, the power generated by the first turbine 131 at the tertiary conduit system of the station shown in FIG. 9 equals the product of the following, the flow rate of 1.5 fps through the fish passage conduit 105B, times its cross-sectional area which in this instance is 1.77 square feet with a diameter of 18 inches, times the head which in this instance is 100 feet, times (62.4 lbs/cu ft.×746/550) equals 22.4 kW. This computes to a water flow of 2.65 cfs.

In other words, 22.4 kW is generated when levitating fish upstream through 100 feet of elevation through an 18 inch conduit with downstream water flow at 1.5 fps. Fish species of about 20 lbs and 30 inch length, known to swim at 3 fps, each experience a transit time of 48 seconds from departure to arrival while swimming through 141 feet of conduit. If fish naturally assemble to about 3 lbs/cu.ft., then an arrivals capsule of 308 cu ft, less 10% for air space, will fill with fish arriving at 3 fps by an 18" conduit, at the rate 15.93 lbs/sec and reach the 3 lbs/cu.ft. limit of 831.6 lbs within 52.2 seconds of the first fish arriving. Each levitation step of 100 feet therefore has a transit time of 100.2 seconds for the school of 41.6 fish. The levitation steps are operated independently in series, and as 41.6 fish are migrating from the 100 foot elevation to the 200 foot elevation as another school of 41.6 fish are migrating from the 000 elevation to the 100 foot elevation. Therefore, a 20 lb fish exits the 200 foot elevation every 2.40 seconds for a total of 35,870 fish per day. The variable dwell time has not been included in the above calculations. When a dwell time of 30 seconds is included for each levitation step, the transit time for each levitation step increases to 130.2 seconds for each school of 41.6 fish, with the result that a 20 lb fish exits the 200 foot elevation every 3.12 seconds for a total of 27,605 fish per day. In total 44.9 kW is generated when levitating fish upstream through 200 feet of elevation through an 18 inch conduit with downstream water flow at 1.5 fps. This computes to a water flow of 2.65 cfs.

This is now increased in a second scenario, with the fish species and their particulars unchanged, and except the conduit size increased to 24 in. (from 18 in.), the capsule size increased to 510 cu.ft. (from 308 cu.ft.), and the dwell time increased to 60 sec. (from 30 sec.). Fish now arrive at a rate 28.26 lbs/sec and fill the arrivals capsule to the 90% limit of 1,377 lbs. with a school of 68.8 fish (up from 41.6 fish) in 48.7 sec. Total transit time for a levitation step increases to 96.7 sec. plus dwell time of 60 sec. for a total of 156.7 sec. The increase of the school of fish to 68.8 gives a result that a 20 lb fish exits the 200 ft. elevation every 2.28 seconds for a total of 37,934 fish per day. Individual fish experience a total transit time of 5 minutes (312.6 sec.) as they migrate from the afterbay 302 to the forebay 304 of the 200 foot high dam. In total 60 kW is generated when levitating fish upstream through 200 feet of elevation through an 24 inch conduit with downstream water flow at 1.5 fps. This computes to a water flow of 4.71 cfs.

This is now further increased in a third scenario, with the fish species and their particulars unchanged, and except the conduit size is increased to 36 in. (from 24 in.), the capsule size increased to 850 cu.ft. (from 510 cu.ft.), and the dwell time increased to 90 sec. (from 60 sec.). Fish now arrive at a rate 63.6 lbs/sec and fill the arrivals capsule to the 90% limit of 2,295 lbs. with a school of 115 fish (up from 68.8 fish) in 36.0 sec. after first arrival (which took 48 sec.). Total transit time for a levitation step increases to 84.0 sec. plus dwell time of 90 sec. for a total of 174 sec. The increase of the school to 115 fish gives a result that a 20 lb fish exits the 200 ft. elevation every 1.5 seconds for a total of 57,103 fish per day. Individual fish experience a total transit time of 6 minutes (350 sec.) as they migrate from the afterbay 302 to the forebay 304 of the 200 foot high dam. The fish transfer efficiency of the invention using 36 inch conduit with water flow of 10.6 cfs compares with the fish ladders of a large 200 foot high hydroelectric dam that is reported to transfer about 60,000 fish per day and uses 300 cfs, which computes to about 5,000 kW which would otherwise be generated and sold to displace higher cost generation in the integrated electric system.

This is now increased in a fourth scenario with the conduit size increased to 48 in. and the capsule size increased proportionally. Fish now arrive at a rate 113 lbs/sec. The invention scaled to such capacity may be suited to the largest hydroelectric dam in the world where a school of 75 lb sturgeon could navigate upstream over the 600 foot high gravity dam at a rate of one fish every 0.7 seconds.

FIG. 10 shows the underside of the tertiary conduit system of the first embodiment of FIG. 9 rotated 90 degrees. FIG. 11 shows a further 90 degree rotation. It is worthwhile to scroll FIGS. 9 to 11 forward and back to speed comprehension of the first levitation step of the first embodiment, and similarly scroll FIGS. 13 to 15 to speed comprehension of the second embodiment.

On a continuation in upstream migration from above, FIG. 12 shows the typical station module of FIG. 9 in the second levitation step. The station is changed over from the first levitation step with the A side of the station now becoming the departing side and the B side becoming the arriving side. The station elements are renumbered to show consistency with the levitation module of FIG. 1. The fish school 138A is shown departing capsule 101A and school 139B is shown arriving at capsule 103B. (School 137B departed this station in the previous levitation step.) A relatively small volume of water moves in a controlled cascade from phase A as shown by the arrow 113B to phase B as shown by the arrow 113A, coming from the A side of the station above through conduit 105A entering capsule 101A through an open departures-gate valve 106A, from thence through tertiary openings 111A through tertiary conduit network 121A, from thence through a first turbine 131 coupled to an electric generator 132, from thence through tertiary conduit network 121B, from thence through tertiary openings 110B into capsule 103B, and from thence through the open arrivals-gate valve 107B through conduit 105B to the departure capsule 101B on the B side of the station at a lower elevation (not shown).

Figure 13:
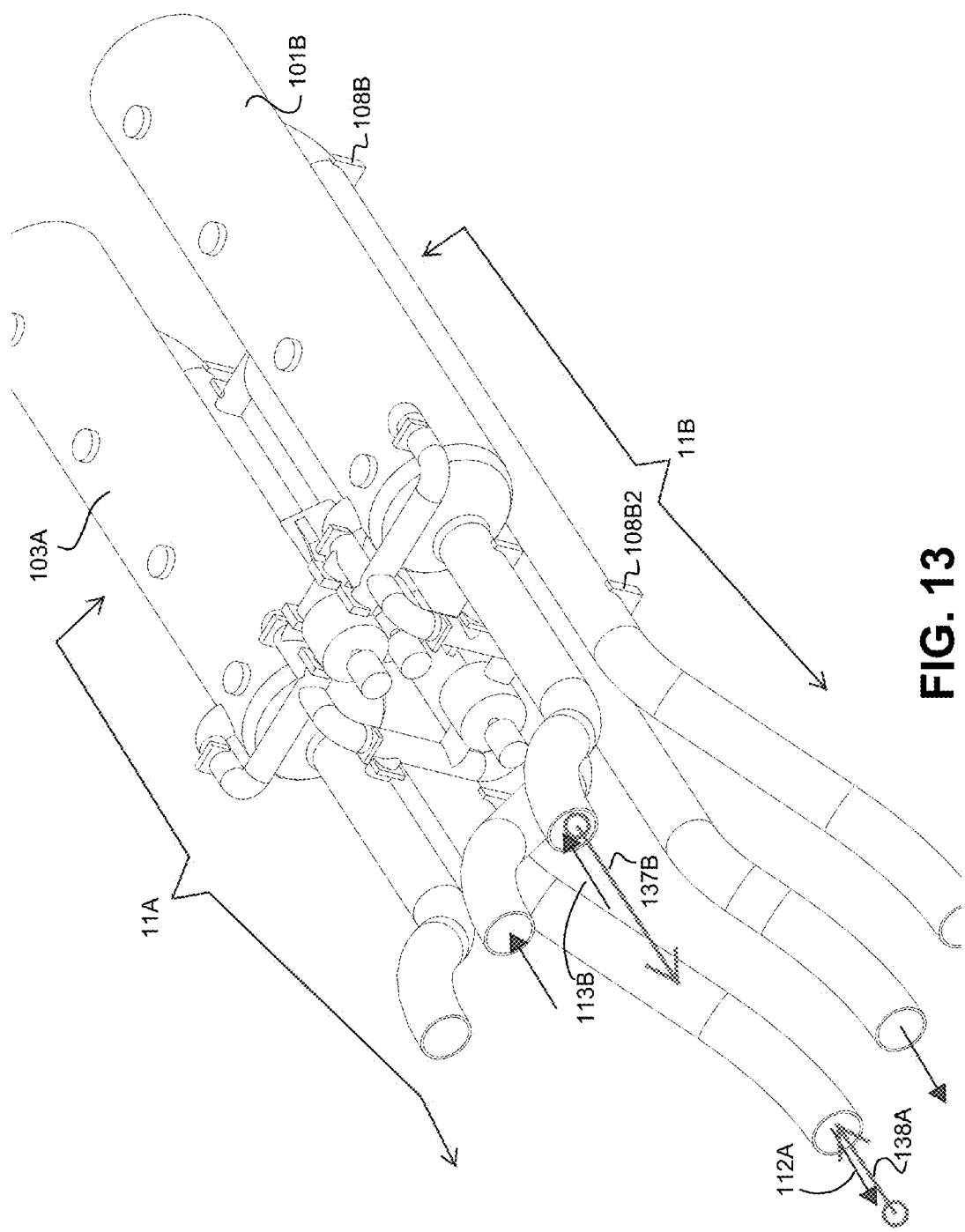
FIG. 13 is an isometric view of a typical three phase station of a second embodiment.
Figure 14:
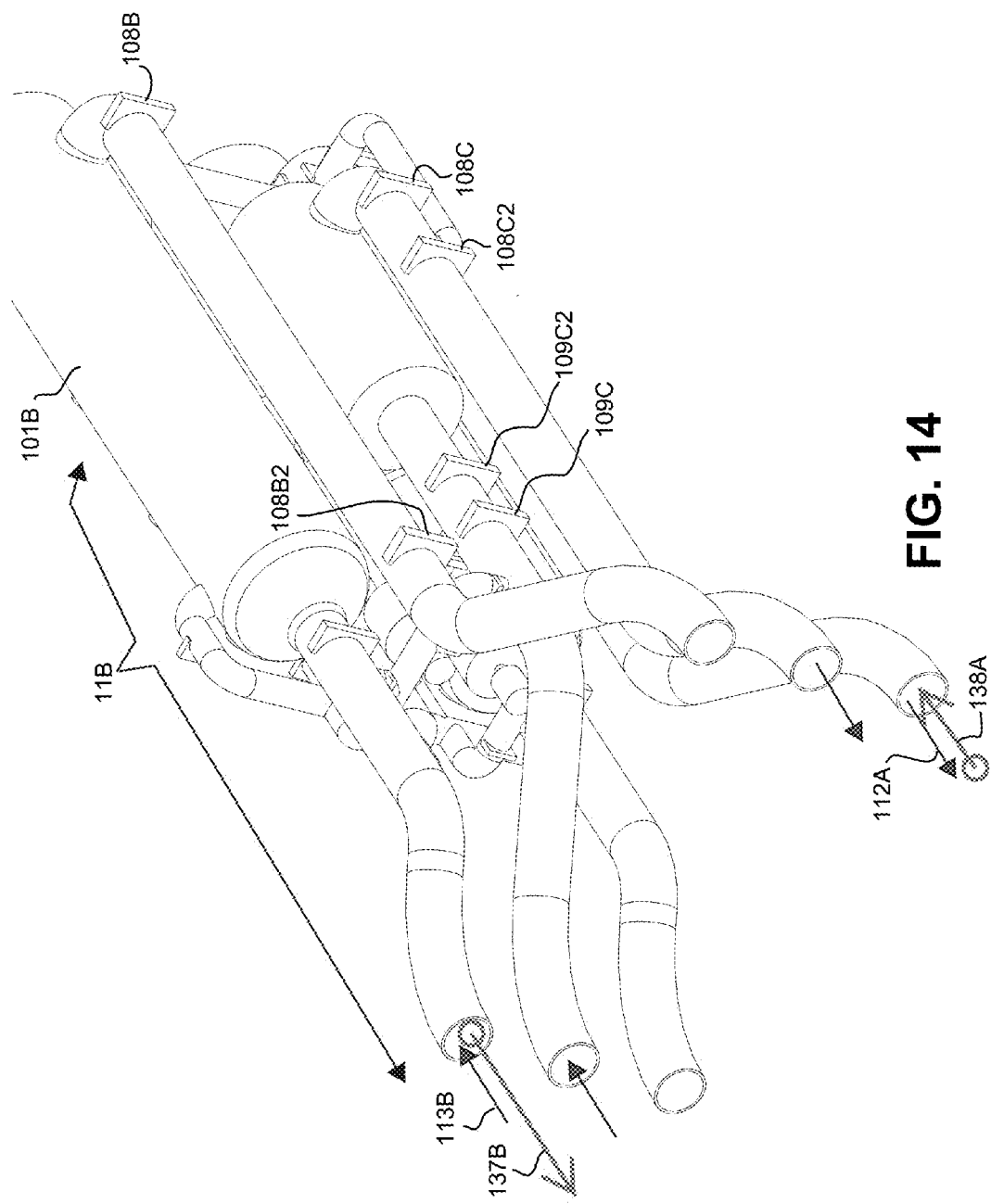
FIG. 14 is a view of the station of FIG. 13 rotated 90 degrees about a longitudinal axis.

A typical station module of the second embodiment is shown at FIG. 13. The levitation step 11, shown in FIG. 2, is identical in fluid flow to levitation step 10 for the first embodiment shown in FIG. 1. It is worthwhile to view the second embodiment station module in animation by scrolling the cursor through FIGS. 13, 14 and 15 thereby rotating the station about a longitudinal axis in steps of 90 degrees. FIG. 15 of embodiment 2 compares with FIG. 11 of embodiment 1. It is also worthwhile to compare FIGS. 15 and 11 for added comprehension. The drawings of the second embodiment rotate about the axis of the generator 132 and turbine 131 set as apparent by scrolling FIG. 13 to FIG. 15. It is apparent the typical stations of the first and second embodiments are identical above the horizontal axis.

Features below the horizontal axis of FIG. 15 are similar to those below the horizontal axis of FIG. 11, except additional gate-valves 107A2, 108B2, and 108C2 are included in FIG. 15 to facilitate switching fluid flow on a second tertiary conduit system 140 on exit from the station module to the station below. The exit tertiary conduit system 140 facilitates water flow between the system's main conduits 105A, 105B, and 105C at the exit end of the station module.

Going now to explain how station modules are arranged for migration of fish along a first passageway. The isometric view in FIG. 16 and the elevation view in FIG. 17 of the first embodiment of the invention for a first fish passageway over a gravity dam of about 200 feet high shows four station modules similar to FIG. 9. The fish inlet 301 and outlet 303 are normally submerged. The afterbay 302 and forebay 304 pools are shown as if drawn down to expose them. Fish migrating upstream enter the passageway inlet 301 at the afterbay pool 302 and exit at the outlet 303 at the forebay pool 304. Detailed views of the four stations 305 to 308 through which fish migrate upstream are shown in FIGS. 18 to 21, respectively.

Figure 16:
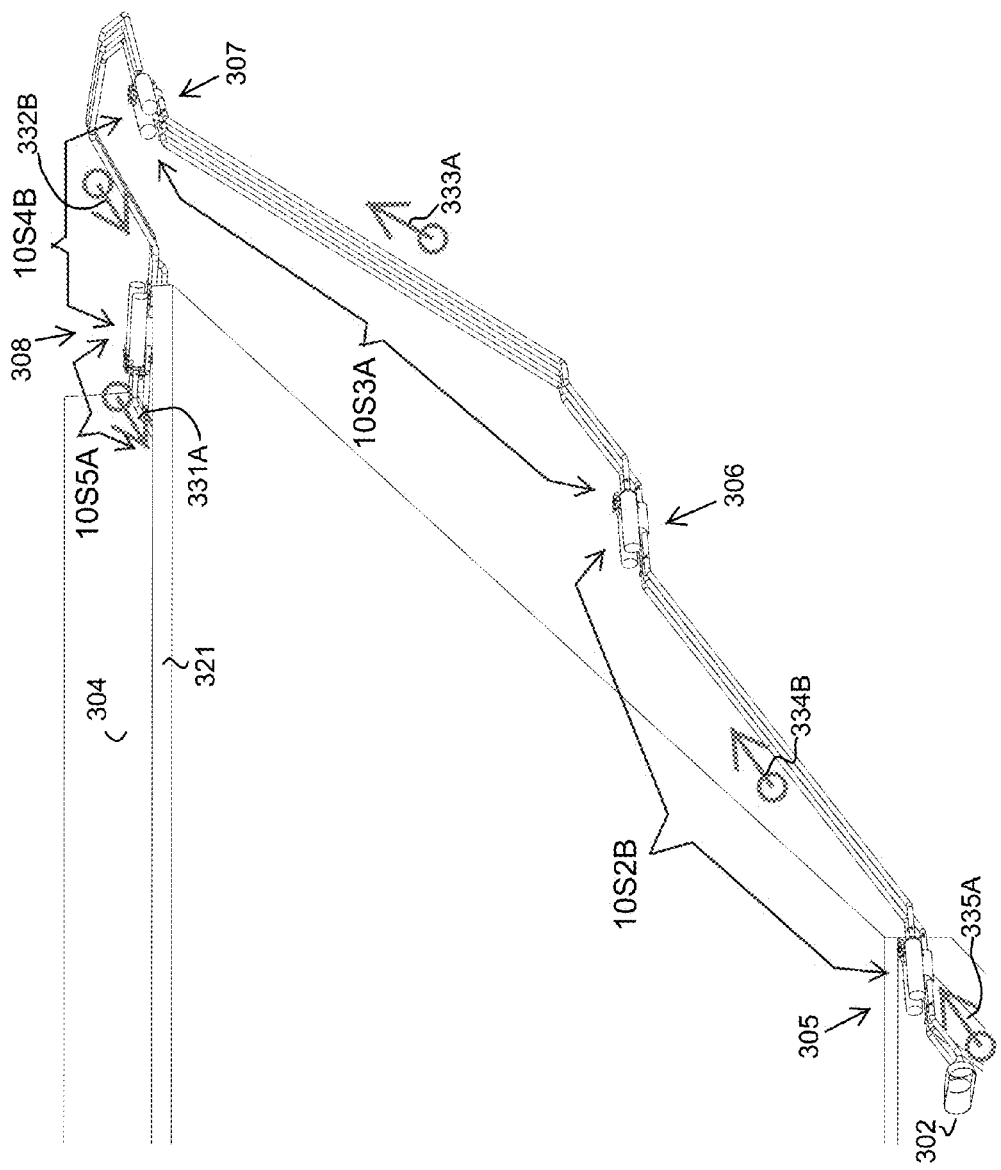
FIG. 16 is a isometric view of a first passageway looking upstream with a first embodiment of the invention applied for fish passage around the right side of a gravity dam about 200 foot high.
Figure 17:
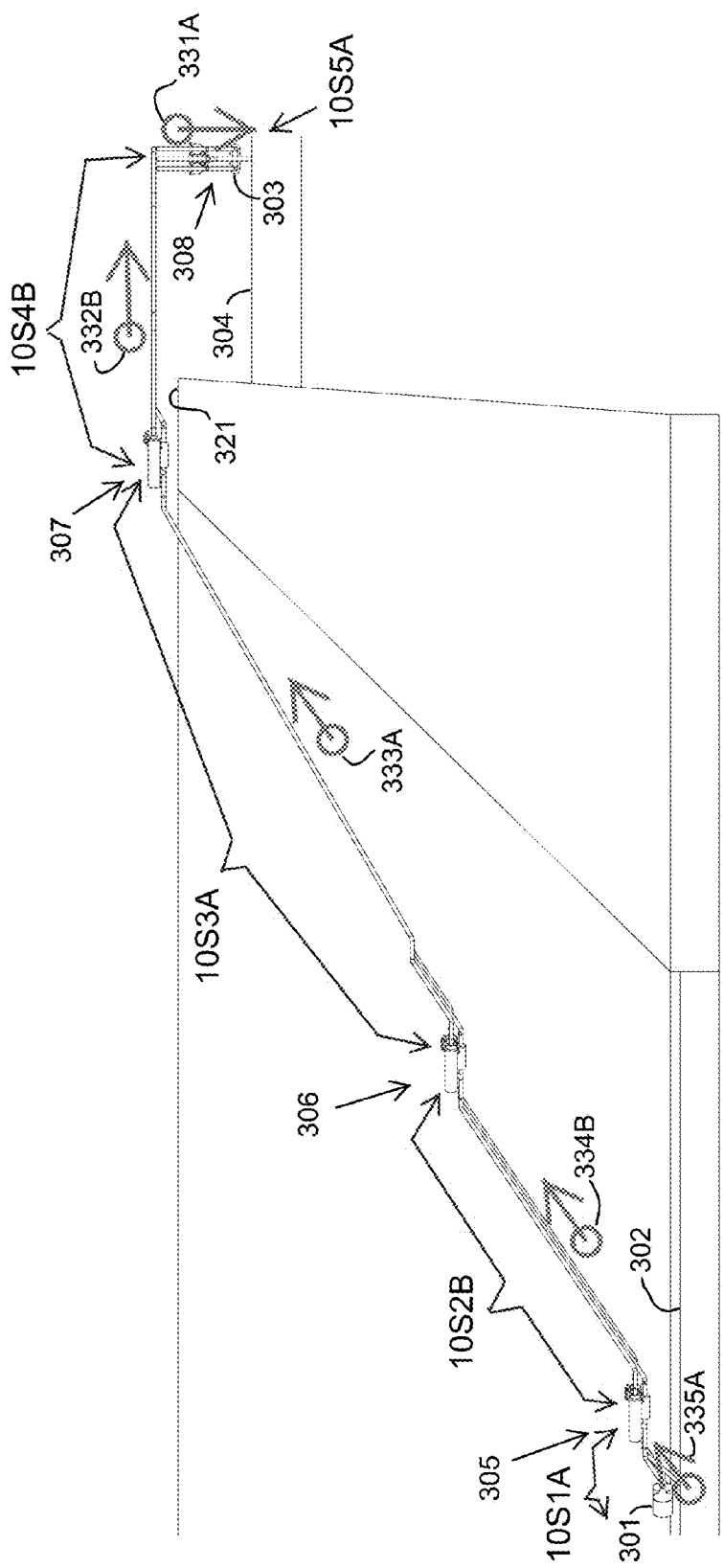
FIG. 17 is an elevation view of the first passageway looking left of FIG. 16.
Figure 18:
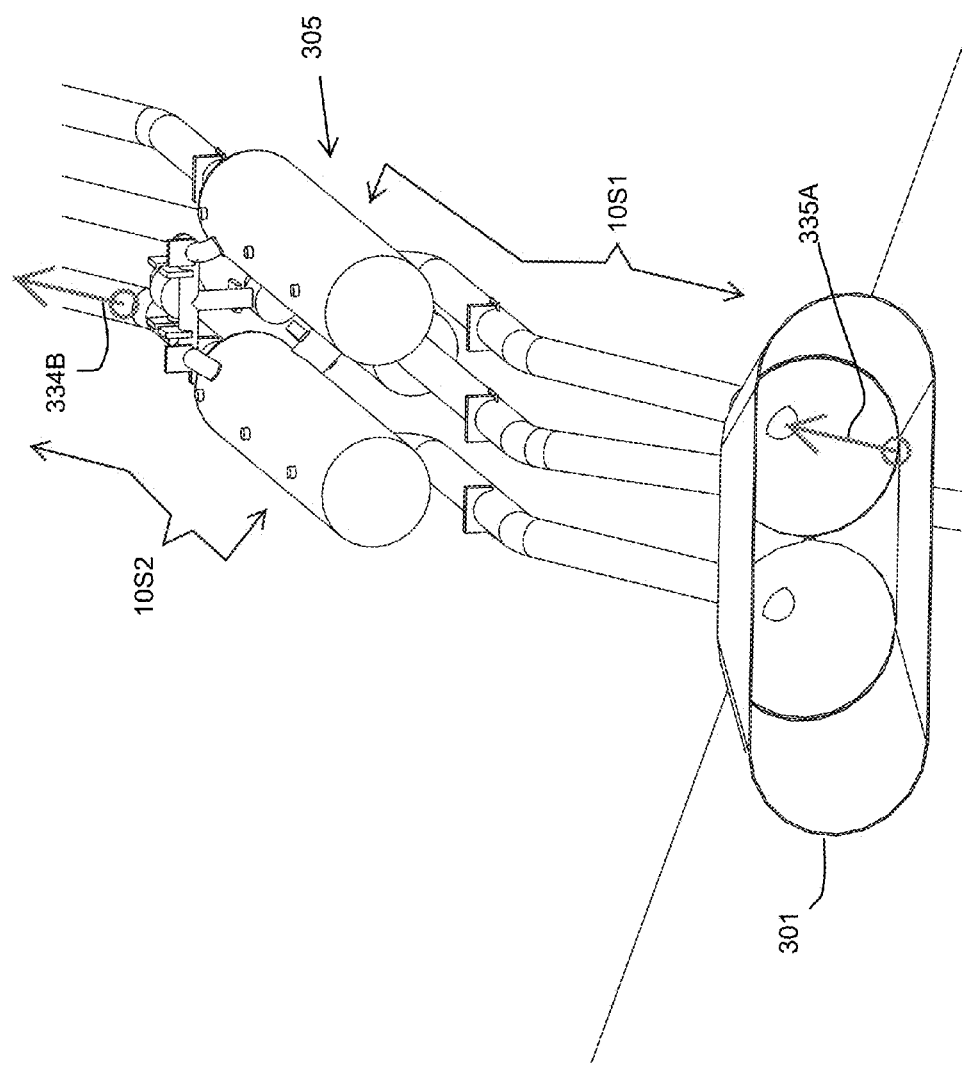
FIG. 18 is an isometric view of the first station situated at the afterbay of FIG. 16 and FIG. 17.
Figure 19:
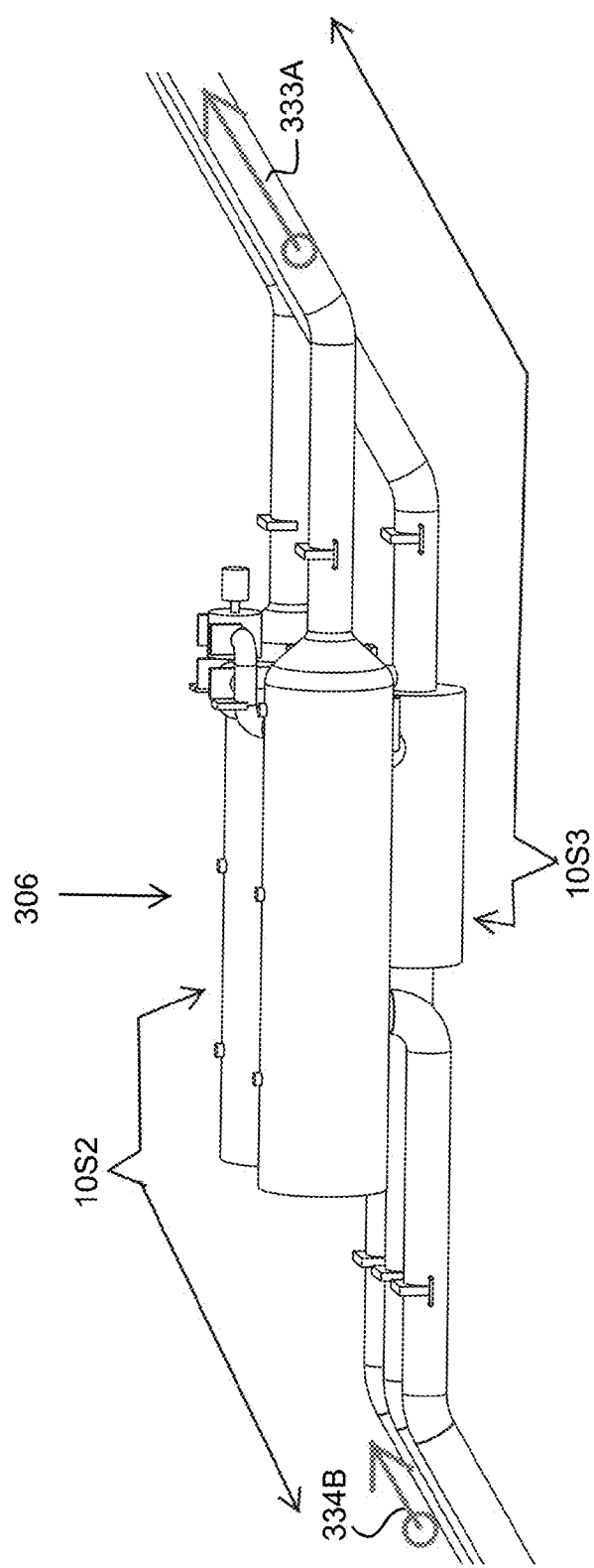
FIG. 19 is a front view of the station at an elevation of about 100 feet above the afterbay of FIGS. 16 and 17.
Figure 20:
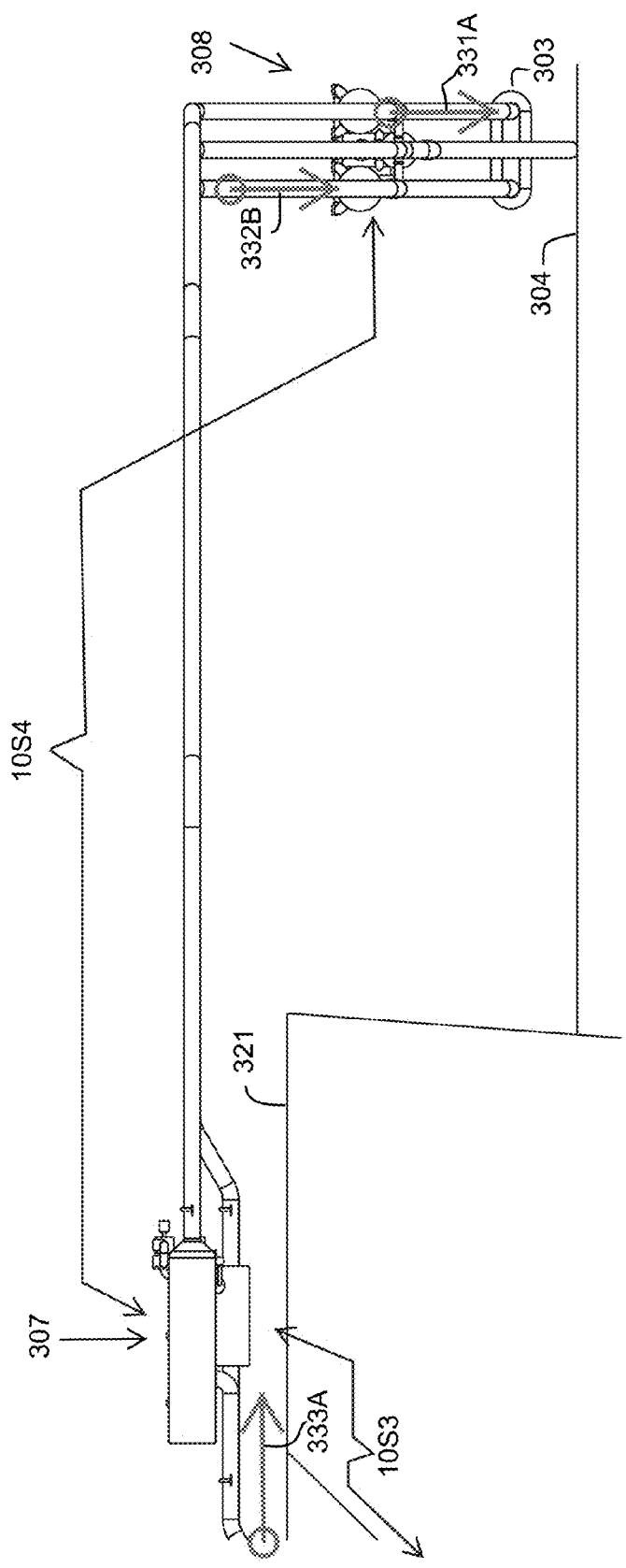
FIG. 20 is a front view of the station at the crest of the dam about 200 feet above the afterbay of FIG. 16 and FIG. 17 and includes an end view of the forebay station shown in FIG. 21.
Figure 21:
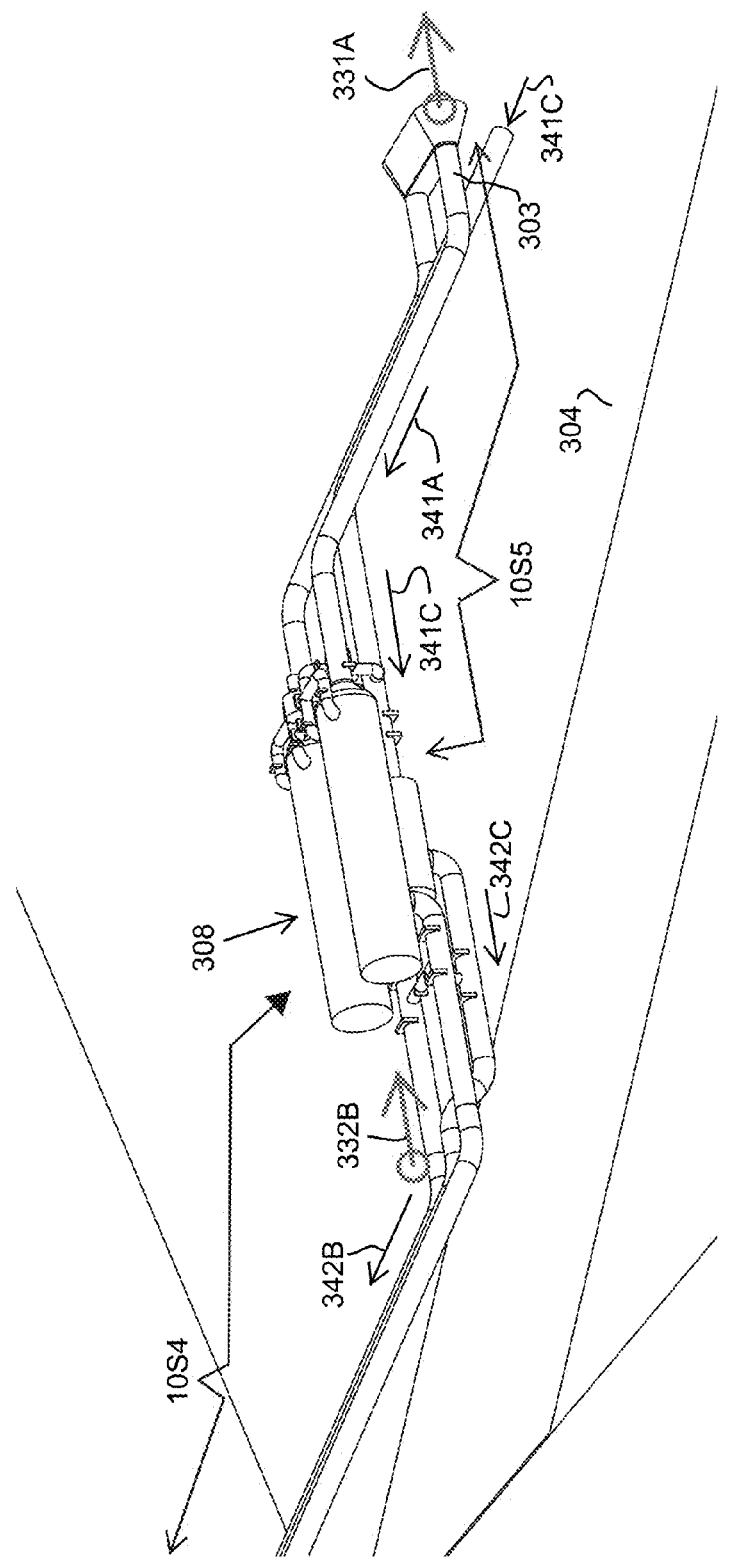
FIG. 21 is an isometric view of the station at the forebay of FIG. 16 and FIG. 17.
Figure 22:
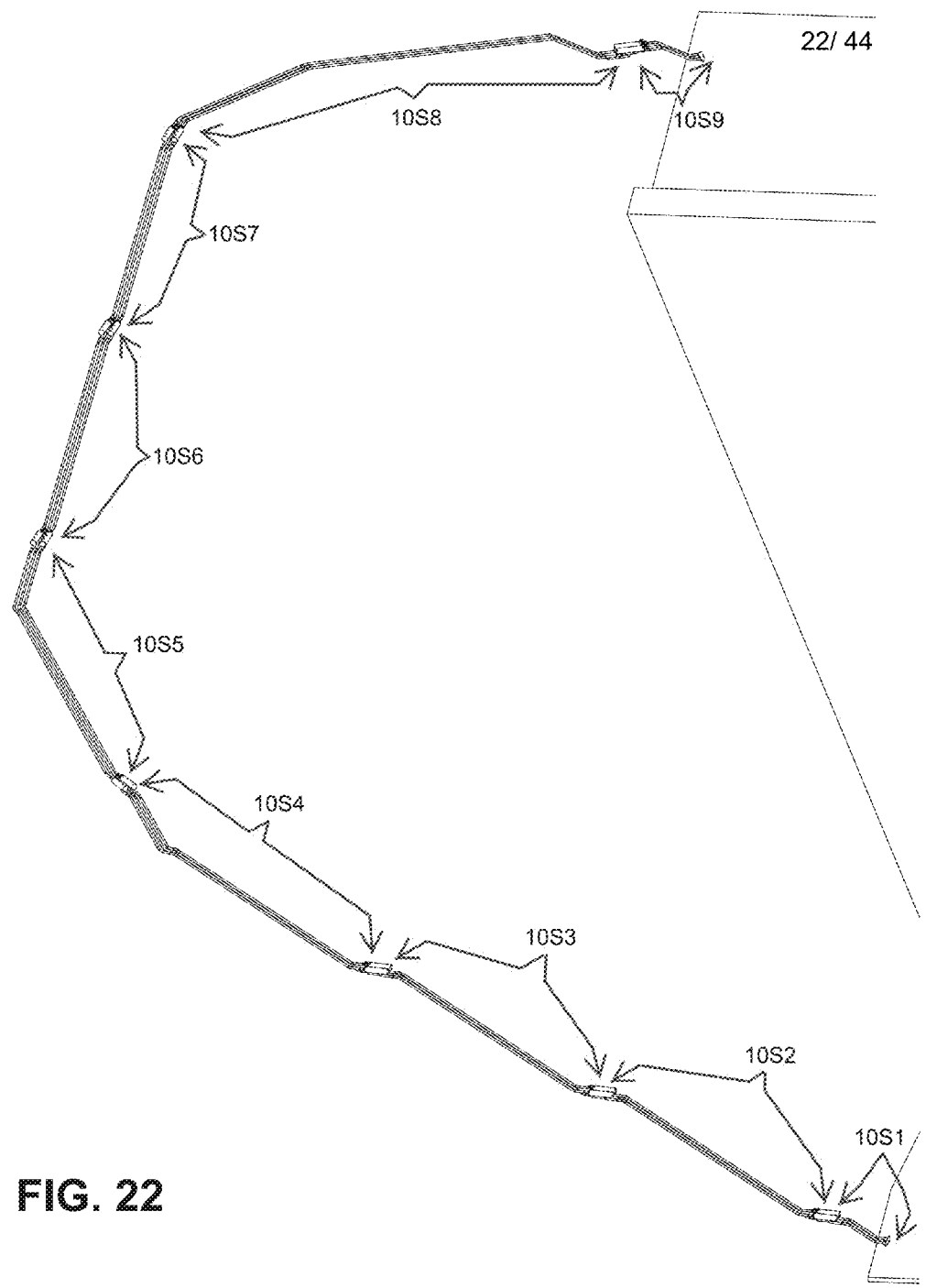
FIG. 22 is an isometric view looking upstream of a second passageway also using the first embodiment of the invention, around the left side of a gravity dam about 600 foot high.
Figure 23:
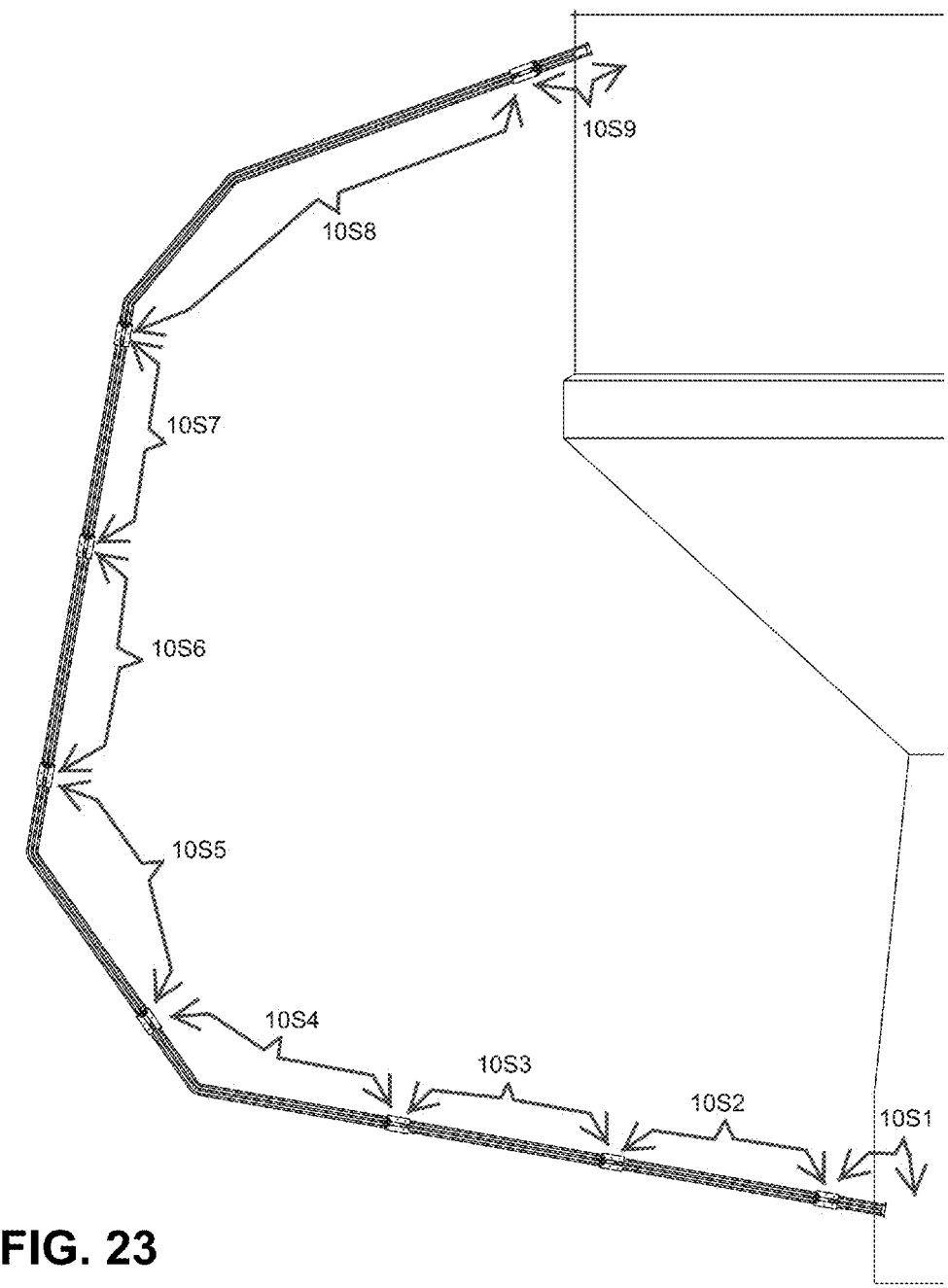
FIG. 23 is a plan view of the second passageway showing the gravity dam of FIG. 22.
Figure 24:
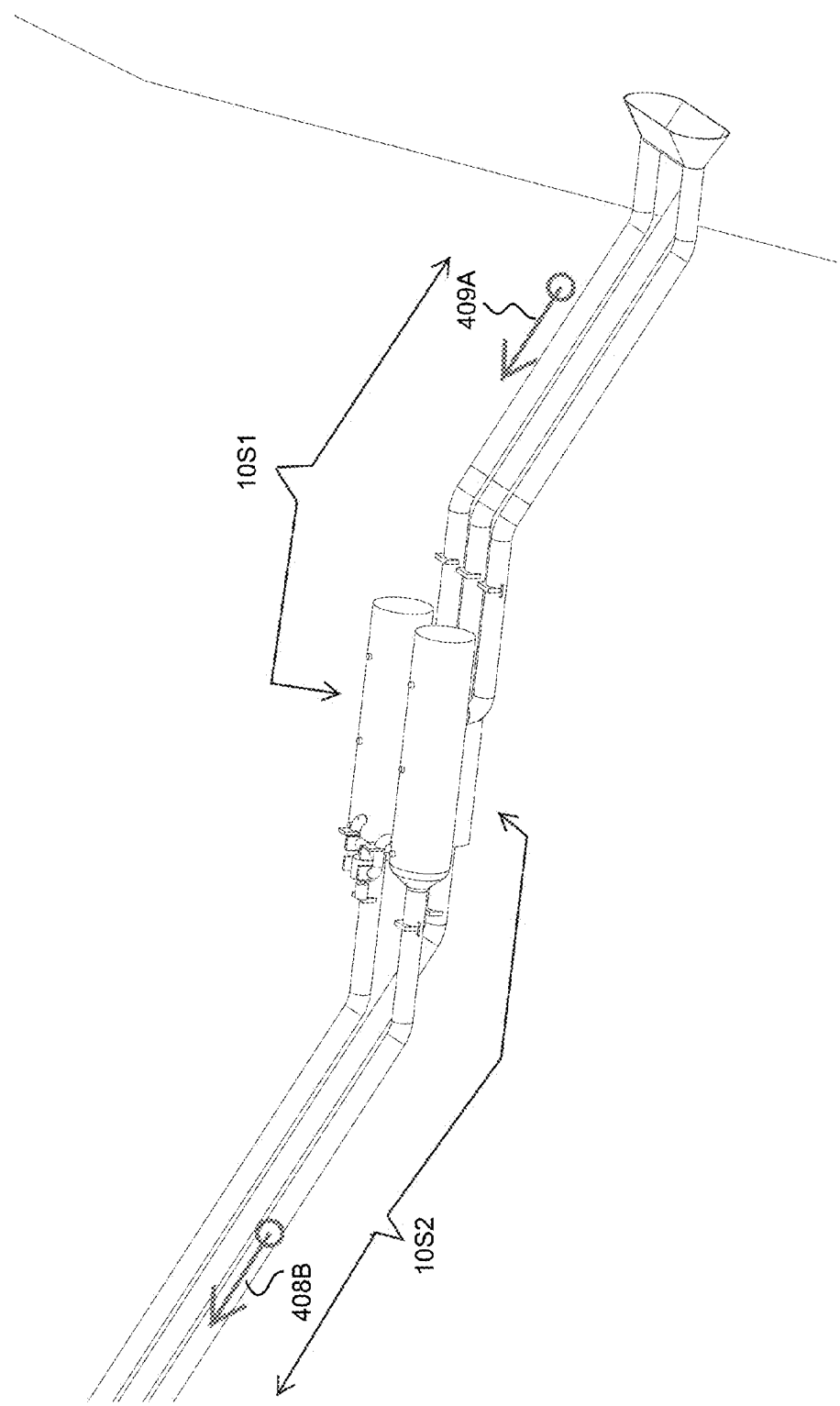
FIG. 24 is an isometric view of a first station at an elevation of about 20 feet above the afterbay of FIG. 22.
Figure 25:
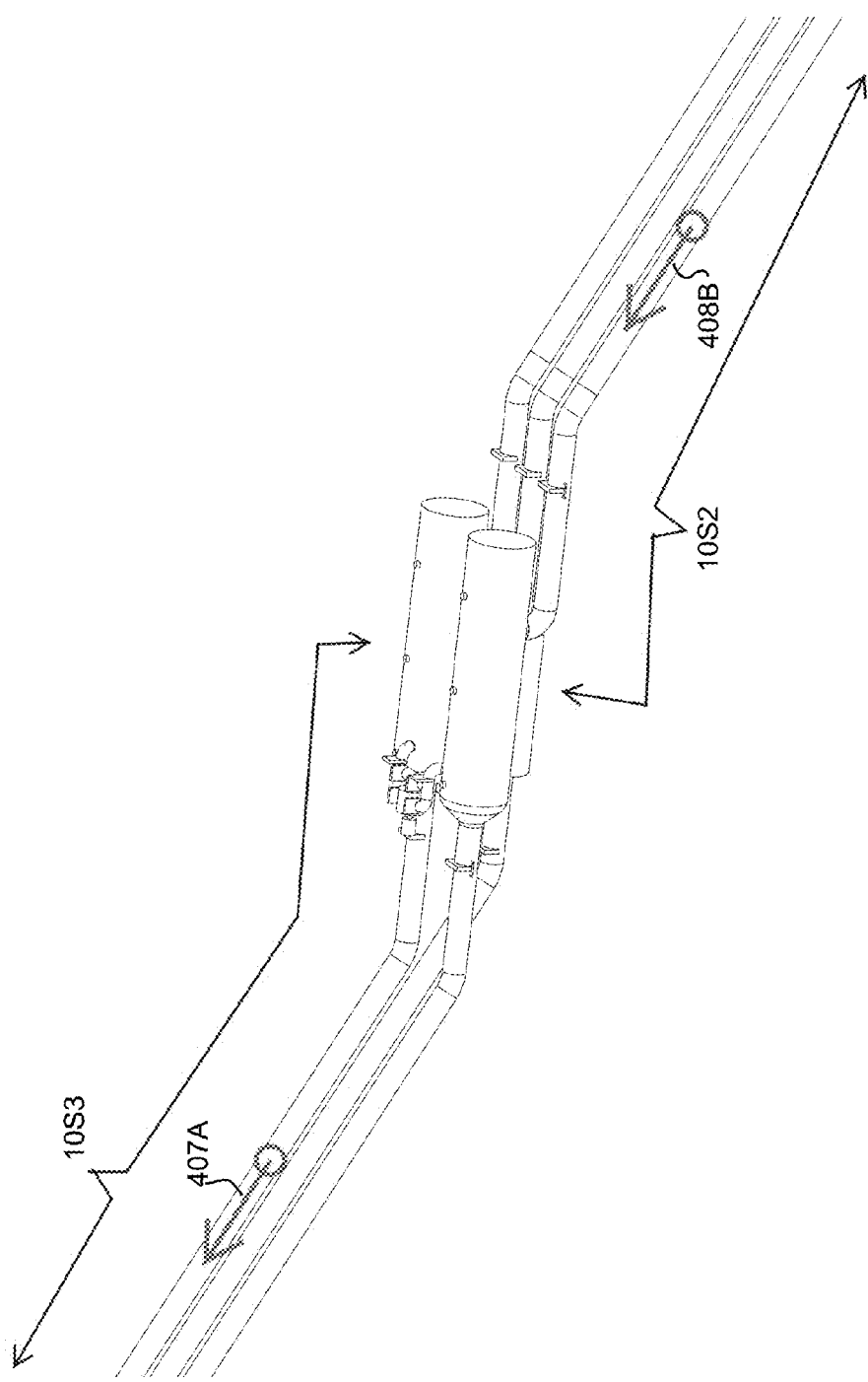
FIG. 25 is the station at an elevation of about 100 feet above the afterbay of FIG. 22.
Figure 26:
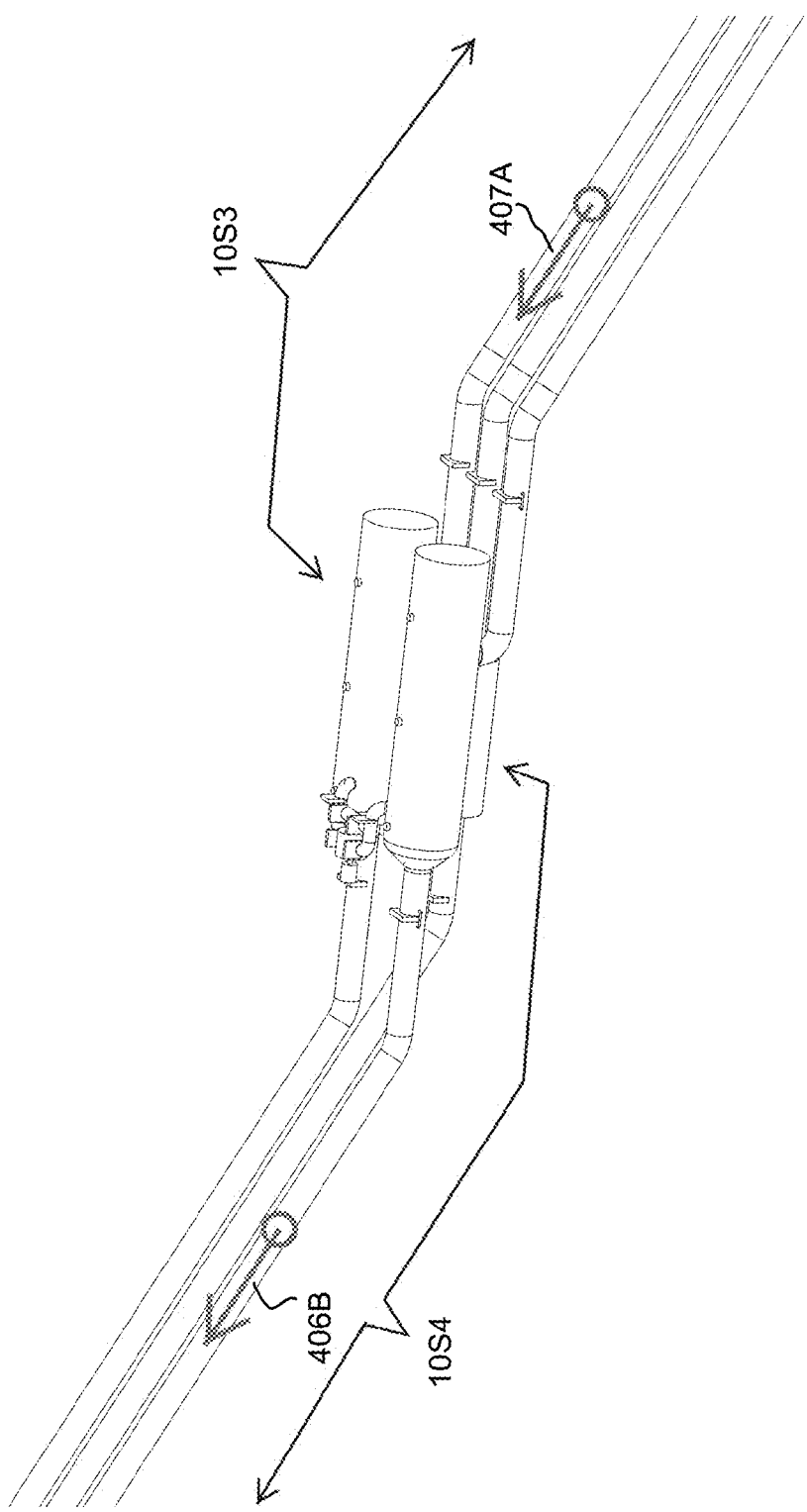
FIG. 26 is the station at an elevation of about 200 feet above the afterbay of FIG. 22.
Figure 27:
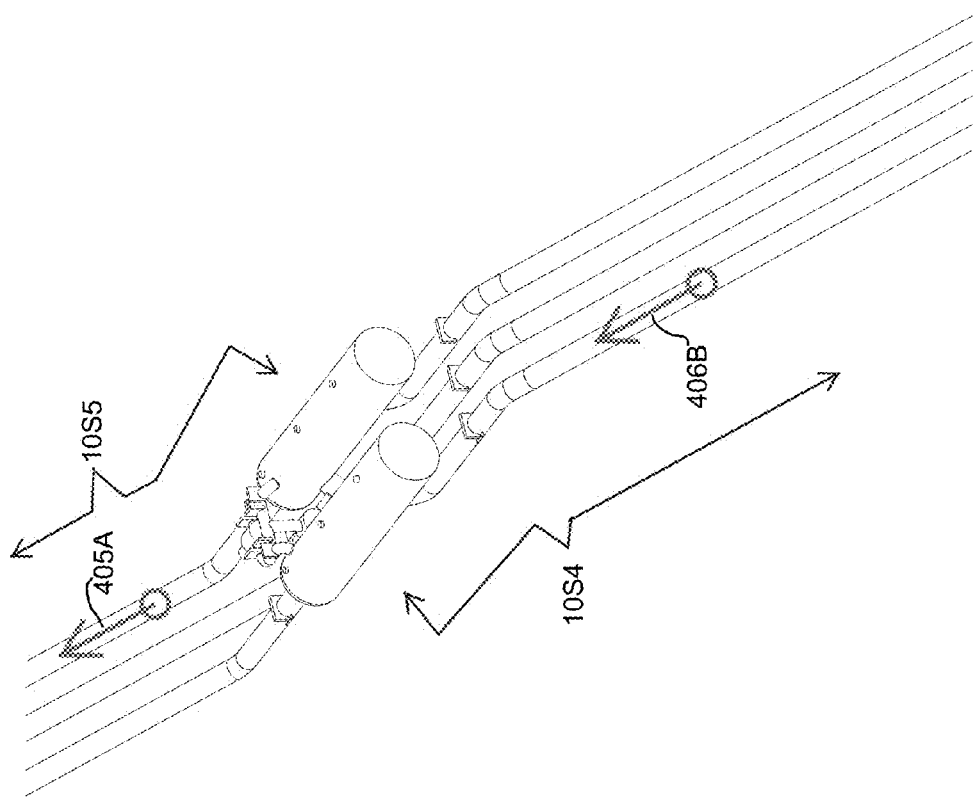
FIG. 27 is the station at an elevation of about 300 feet above the afterbay of FIG. 22.
Figure 28:
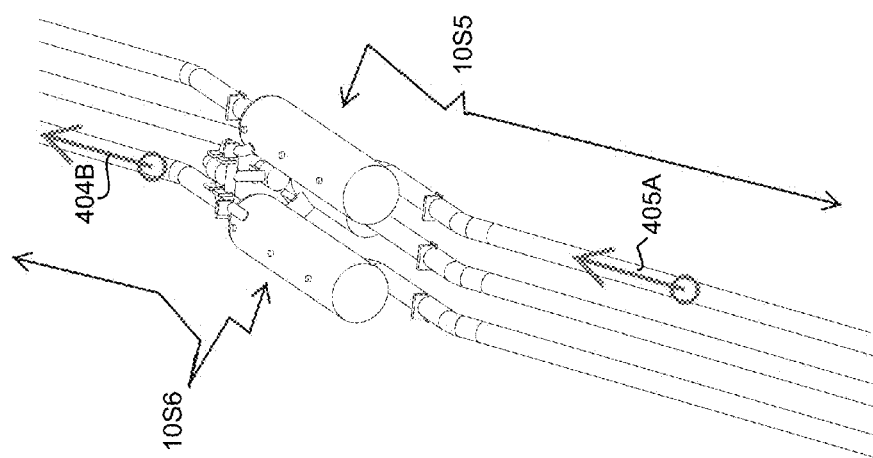
FIG. 28 is the station at an elevation of about 400 feet above the afterbay of FIG. 22.
Figure 29:
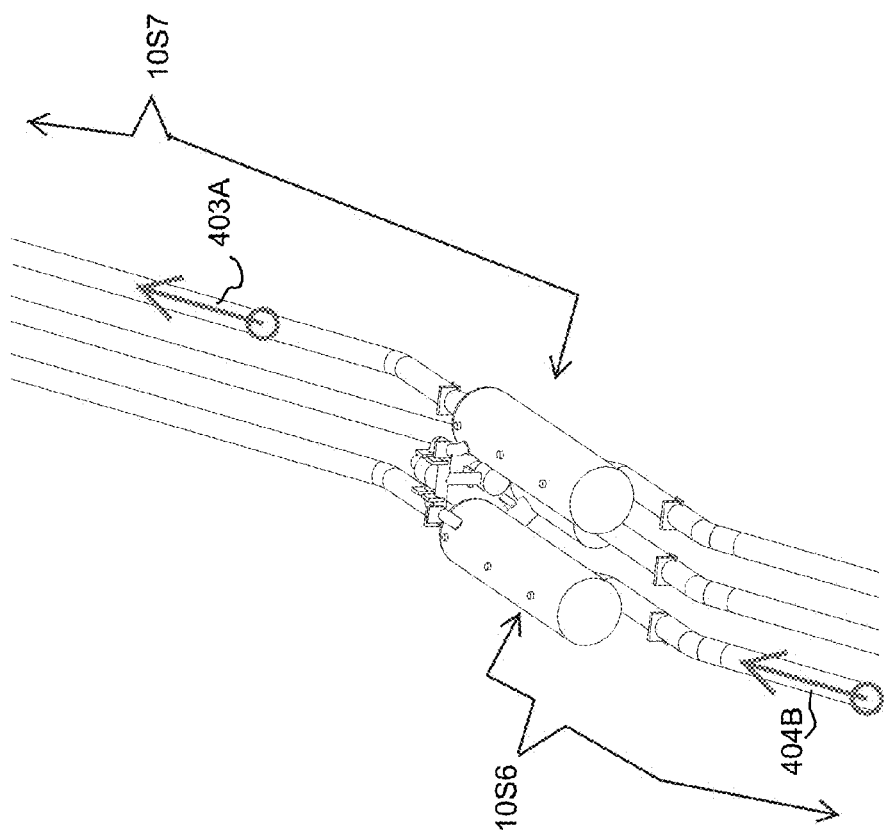
FIG. 29 is the station at an elevation of about 500 feet above the afterbay of FIG. 22.
Figure 30:
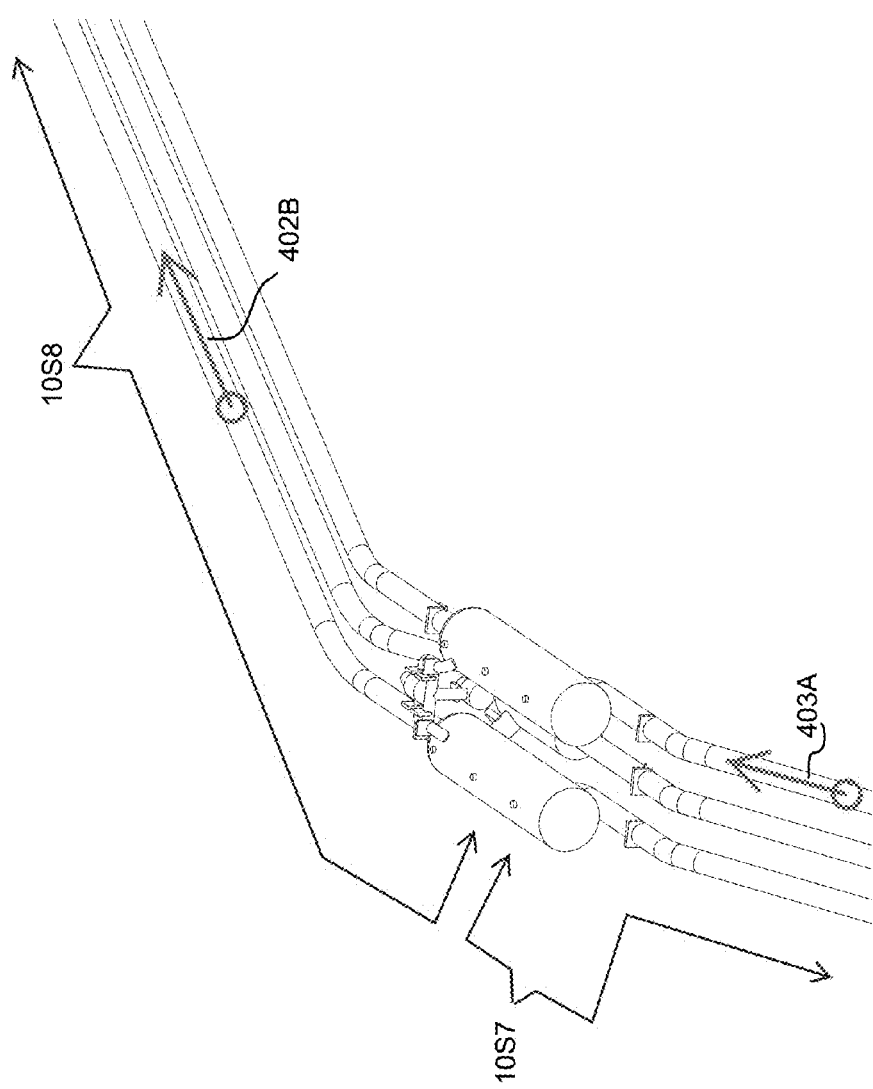
FIG. 30 is the station at an elevation of about 600 feet above the afterbay of FIG. 22.
Figure 31:
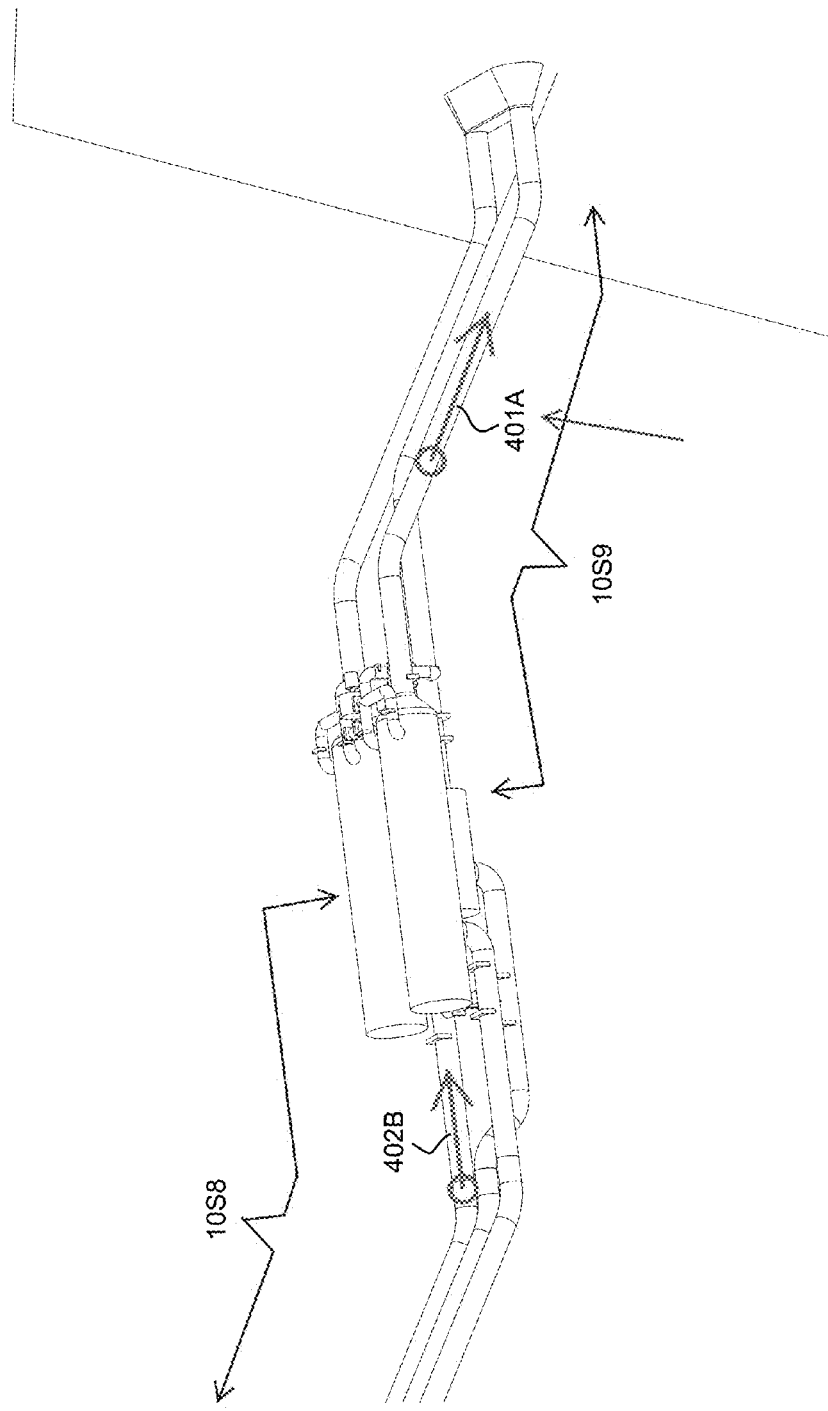
FIG. 31 is the station at the forebay at an elevation of about 550 feet above the afterbay and about 50 feet below the crest of FIG. 22.
Figure 32:
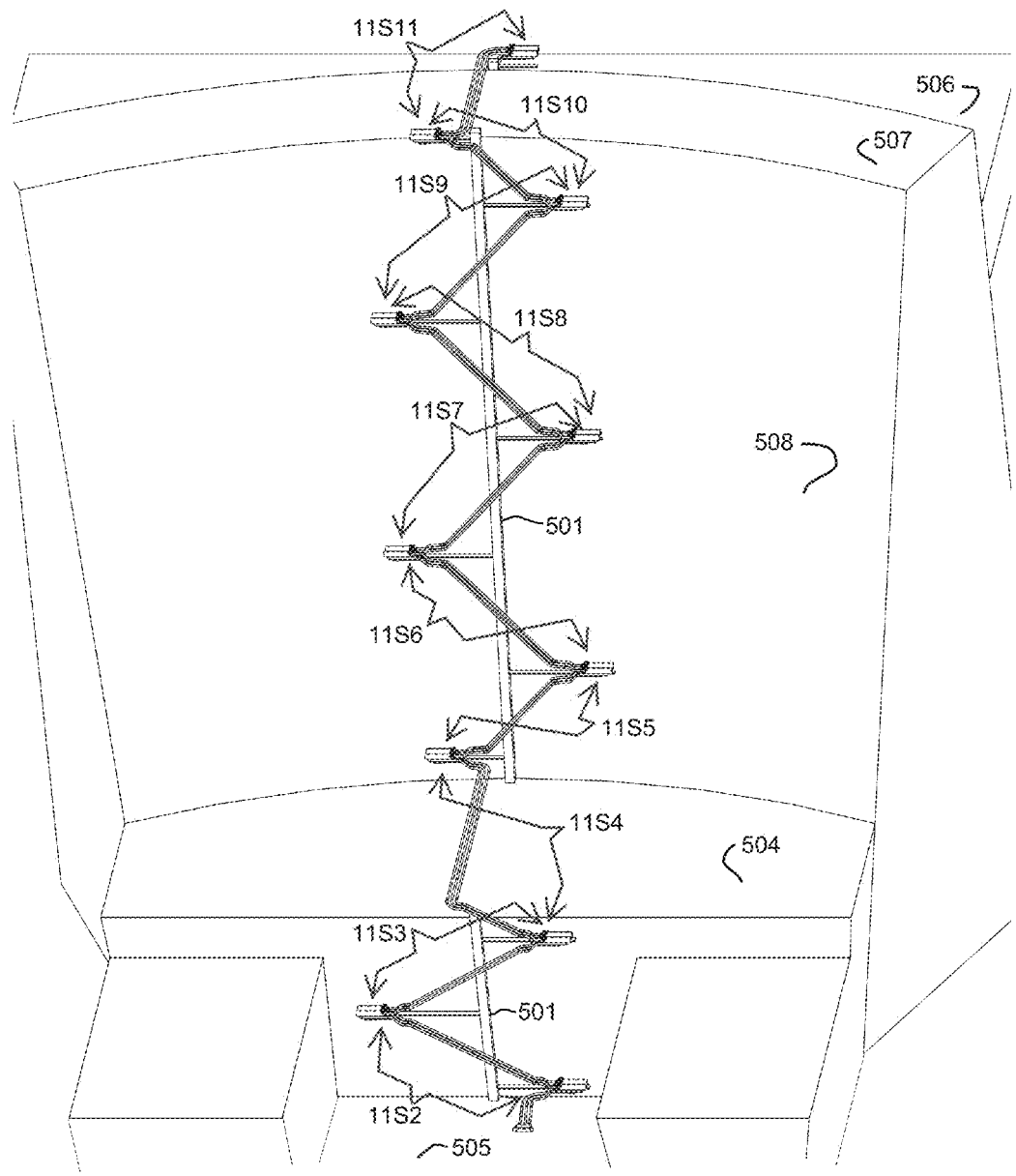
FIG. 32 is an isometric view looking upstream of the third passageway using a second embodiment of the invention for fish passage up the face of a 750 foot high arch dam.
Figure 33:
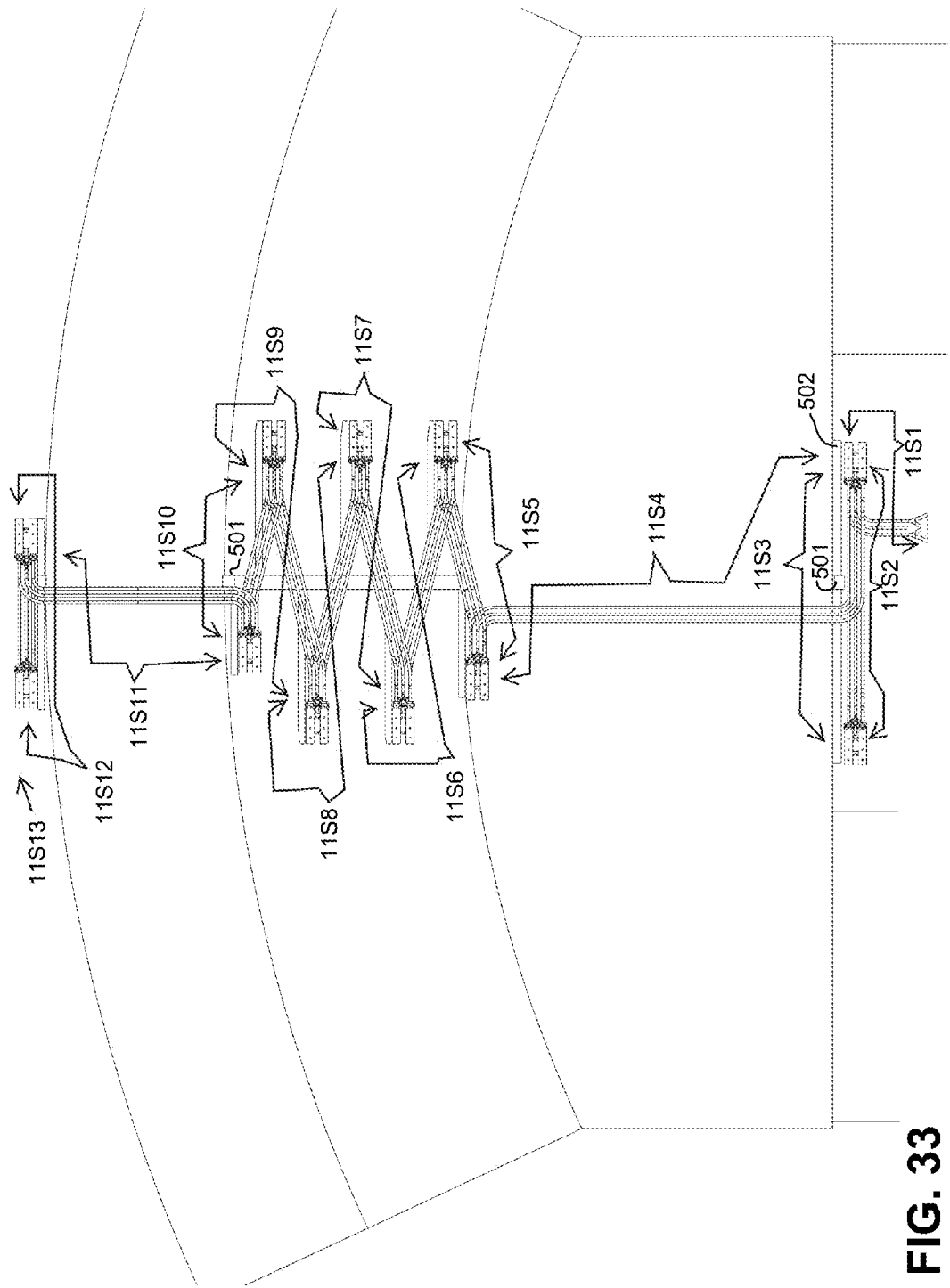
FIG. 33 is a plan view of the passageway of FIG. 32.
Figure 34:
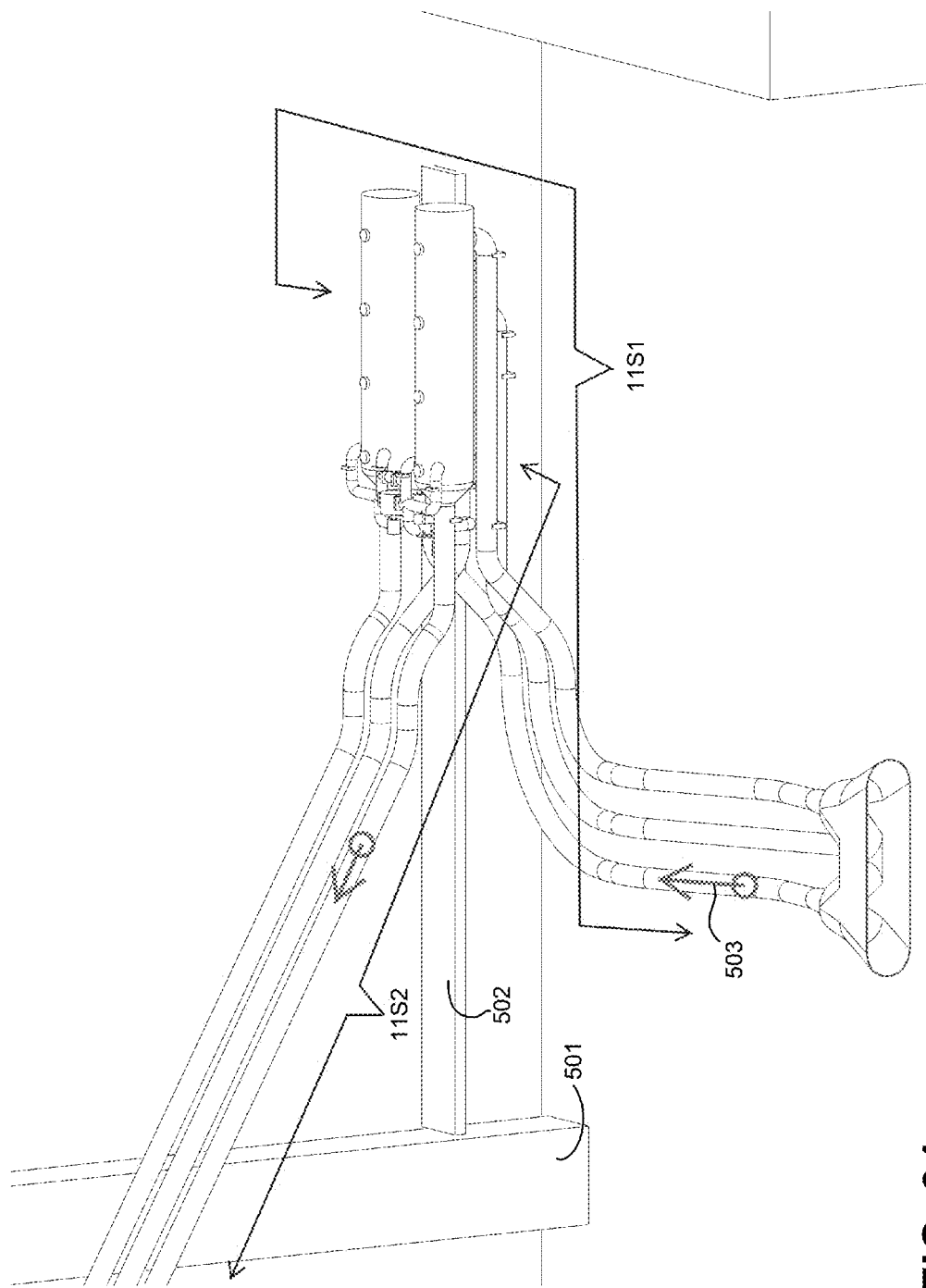
FIG. 34 an isometric view of the first station at an elevation of about 20 feet above the afterbay 505 of FIG. 32.
Figure 35:
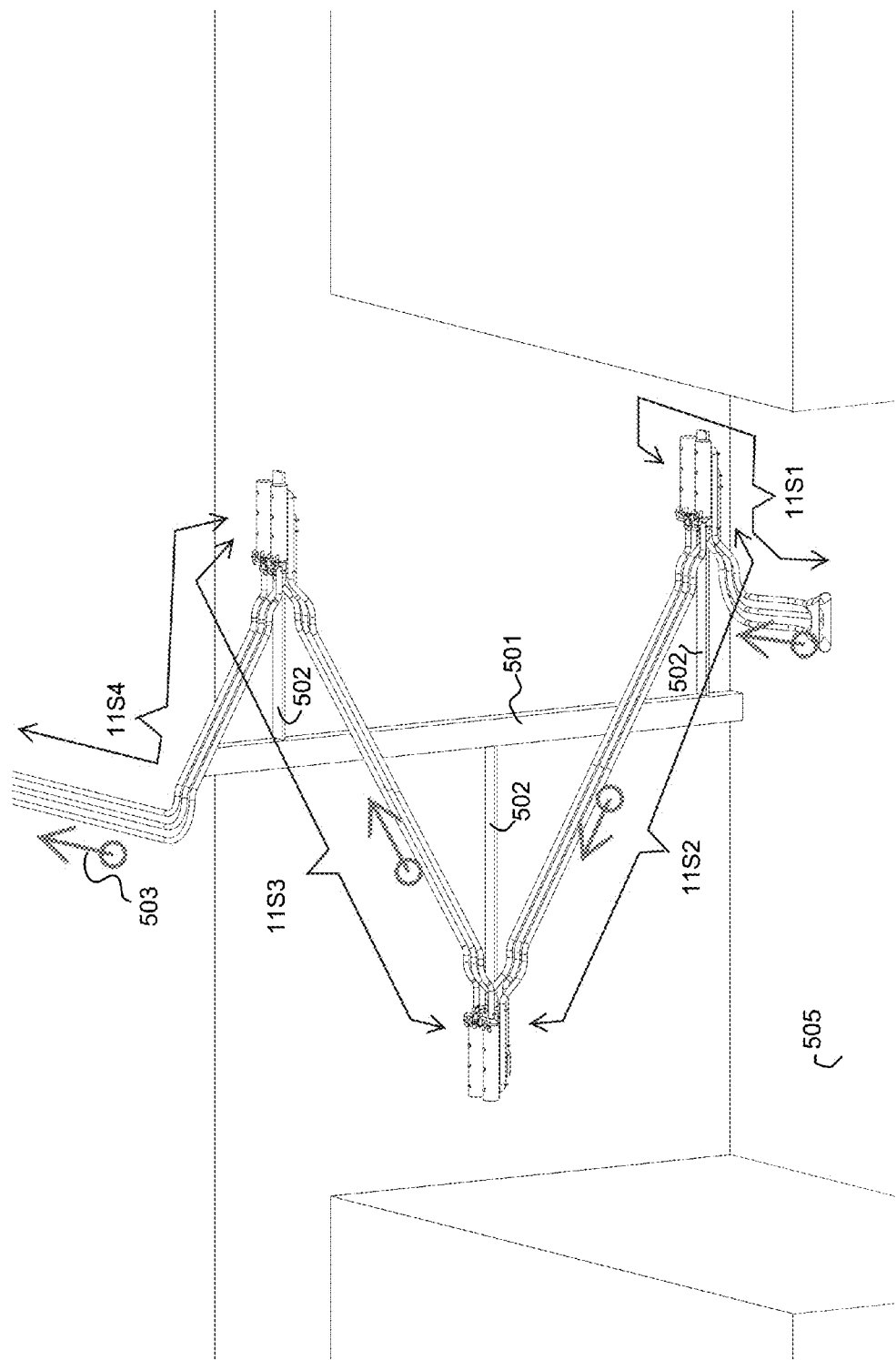
FIG. 35 is an isometric view of the three stations rising to an elevation of about 200 feet above the afterbay 505 of the dam of FIG. 32.
Figure 36:
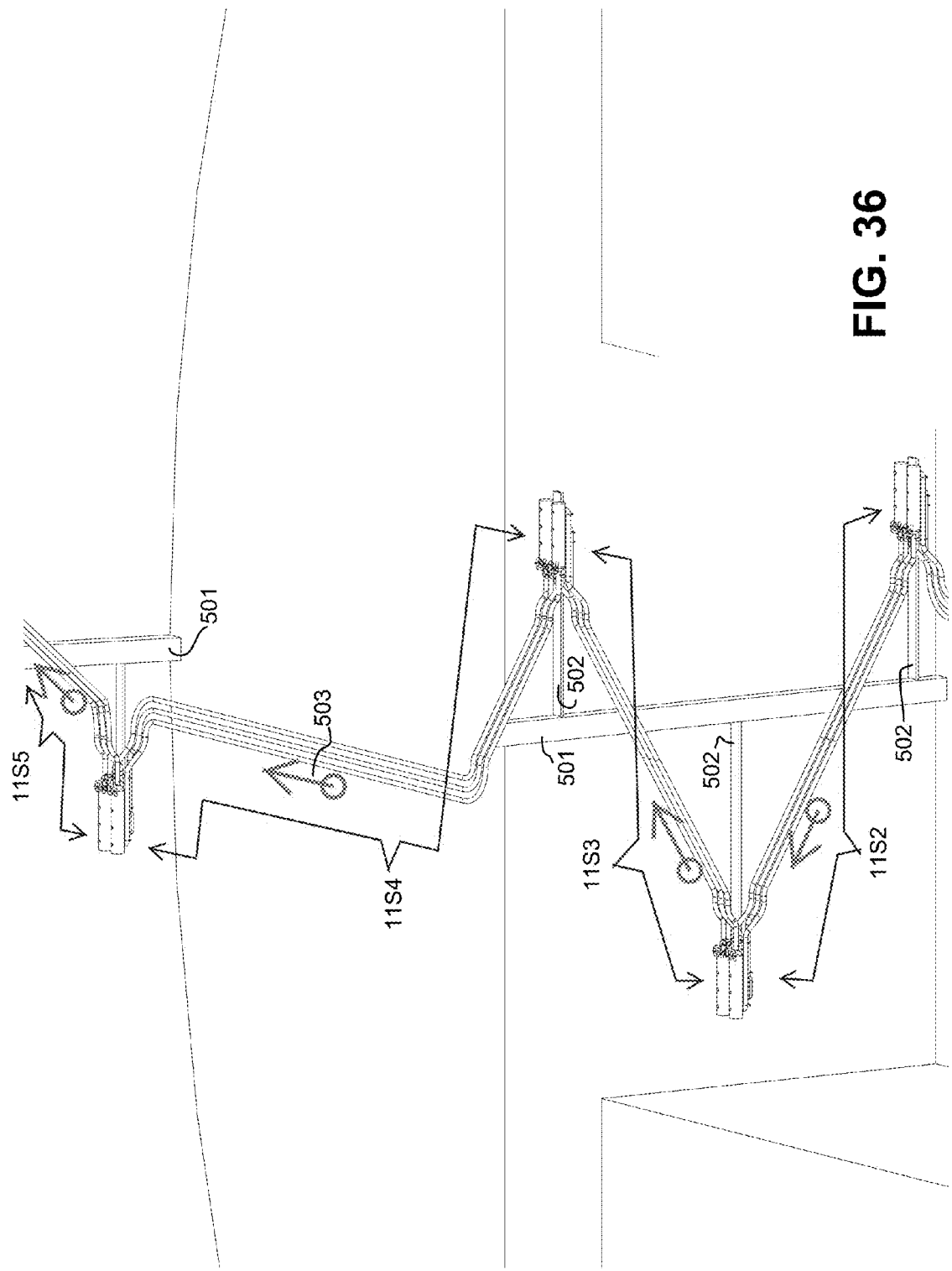
FIG. 36 is an isometric view of the stations at elevations 020 through to 250 feet showing the conduits over the machine room of the dam of FIG. 32.
Figure 37:
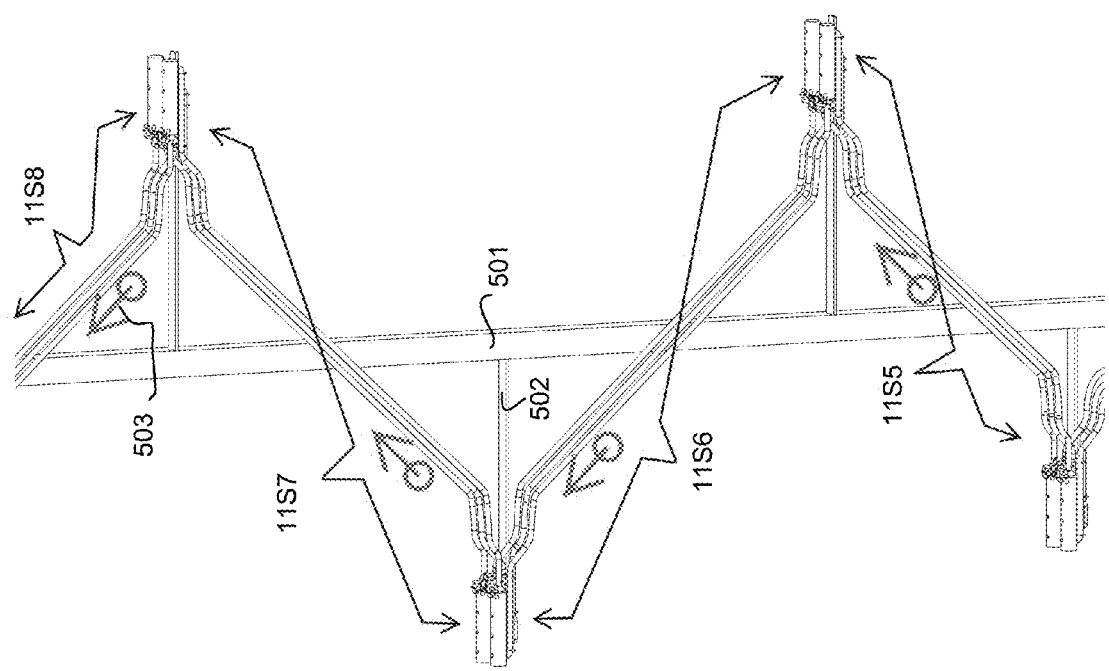
FIG. 37 is an isometric view of the stations at elevations 250 through to 500 feet of the dam of FIG. 32.
Figure 38:
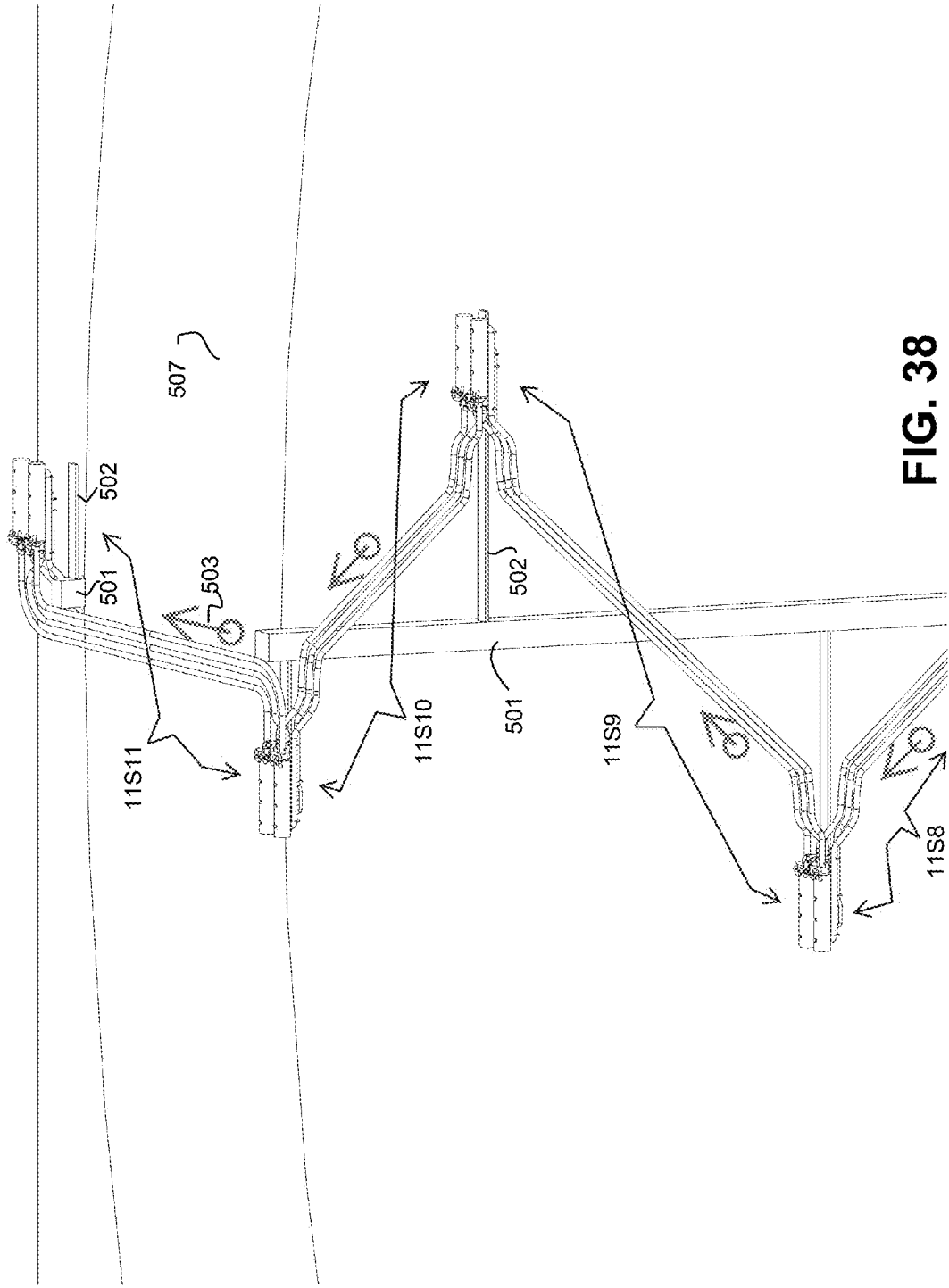
FIG. 38 is an isometric view of the stations at elevations 600 through to 750 of the dam of FIG. 32.
Figure 40:
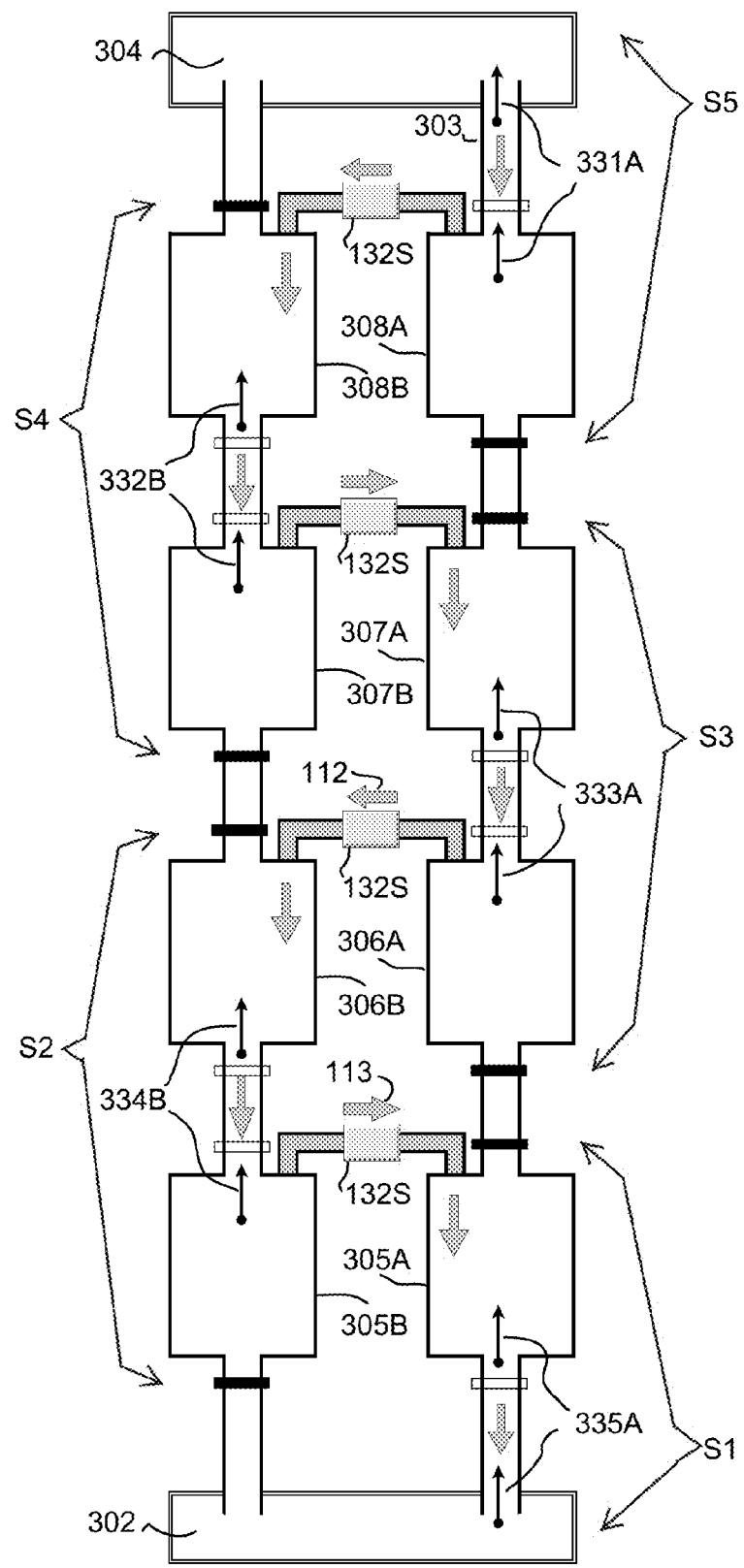
FIG. 40 is a schematic of a first macro step in a passageway levitation.
Figure 41:
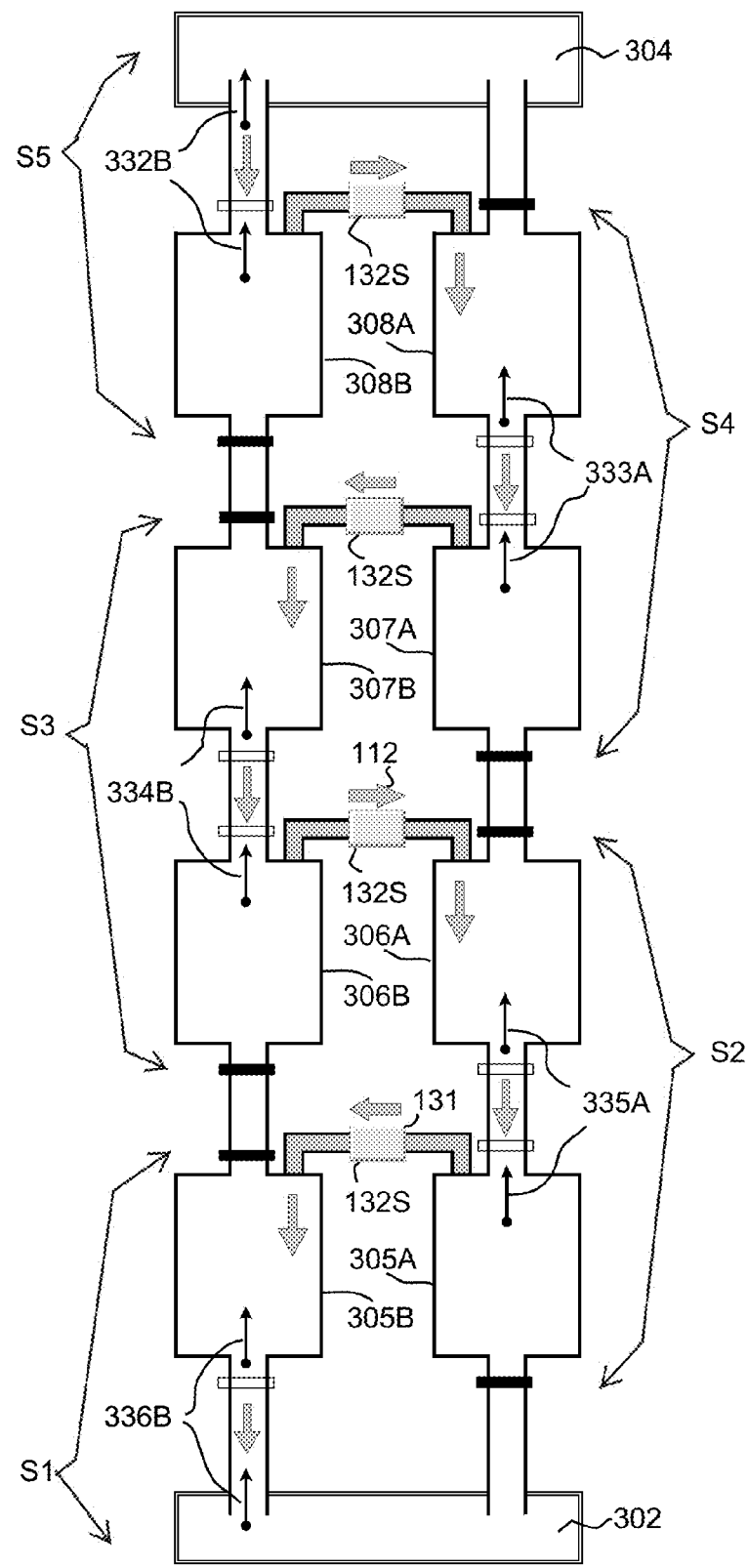
FIG. 41 is a schematic of a second macro step in a passageway levitation.

A snapshot-like view of five schools 331 to 335 migrating in synchronism through the first passageway of four stations is shown in FIGS. 16 and 17. These five micro steps are shown schematically in a macro step 1 on FIG. 40 and a macro step 2 on FIG. 41. Levitation step 10 of the first embodiment shown in FIG. 1 is applied in five levitation steps 10S1 to 10S5 that are in effect micro steps operated in synchronism in a first synchronous step as shown in FIGS. 16 and 17. The snapshot view shows the first school of adult fish 331A in their fifth levitation step (10S5A) up from the afterbay, exiting from station 308 through the A side of the passageway outlet 303 at the forebay pool 304 as shown in FIGS. 20 and 21. In FIG. 40 and FIG. 41 these same schools are shown migrating in steps S1, S2, S3, S4 and S5, where the prefix and suffix of steps 10S1 to 10S5, shown in FIG. 16 and FIG. 17, also with suffix A and B, have been deleted for clarity. Following behind school 331A are four more schools in upstream migration from the afterbay 302, namely 332B, 333A, 334B and 335A. The micro steps are triggered to operate in synchronism in a macro step: simultaneously, as shown in FIG. 40, the second school of fish 332B is entering the B side of the last station 308 of the passageway; the third school of fish 333A is entering the A side of station 307 and departing station 306; the fourth school 334B is entering the B side of station 306 and departing the B side of station 305; and the fifth school 335A is entering the A side of station 305 from the afterbay 302. These five micro steps of macro step 1 and step 2 are shown in schematic form in FIG. 40 and FIG. 41.

Water is pumped by motor/pump set 132S from the forebay 304 to the top of the dam 321 and energy is recovered by generator/turbine set 132S as water flows by gravity from the top of the dam to the afterbay 302. Phase C provides an alternate source of water for the passageway (as shown schematically in FIG. 42). Phase C is able to draw water 341C from the forebay 304 near the surface or from deep within the reservoir, as shown in FIG. 21, and provide temperature controlled water to the fish passage sides to enhance the normal fish passage water flow from the forebay 304 to the afterbay 302. This is discussed further with reference to the schematic drawing shown in FIGS. 41 and 42.

The entire passageway system (phases A, B and C) is primed with water and tested. It is preferable to have the computer run the passageway through several synchronous steps (macro steps) prior to any fish entering the system. Water and air pressure is progressively adjusted at each station down to the afterbay. (The trend in the current state of art in commercial and industrial applications is to use exclusively wireless control and communication, therefore diagrams for wiring and communication routers are not shown.) The three generators 132, 134, 136 (shown in FIG. 10) are run as motors and rotate the turbines 131, 133, 135 to draw water from the forebay 304 to fill the capsules at station 308 and then continue to pump water through the conduits 303 to the top of the dam 321 and fill capsules of phases A, B, and C of station 307 as shown in FIG. 20. Turbine-generator sets are distinguished as 132S, 134S, and 136S, and include their respective turbines 131, 133, and 135, such as for example in FIG. 40, FIG. 41, and FIG. 42. Water will flow by gravity from the point of highest elevation, the crest of the dam 321, through the conduits linking stations 307, 306, and 305 and discharge in the pool of the afterbay 302 as shown in FIG. 17. FIG. 1 shows a typical fish school 334B swimming upstream through a conduit connecting a lower capsule 101 to an upper capsule 103 with water flow in 112 and water flow out 113 also shown on FIG. 40.

The particulars of the proceeding paragraph in relation to water flow through phases A and B in macro step 1 are shown schematically in drawing FIG. 40. Water flow through phase C is not shown. Phases A and B are operating with phase C shutdown. Phases A or B can operate in single phase mode with the other two phases shutdown as shown in FIGS. 3 and 4. Water movement from the forebay to the afterbay is shown by shaded arrows. The ordinary progression to macro step 2 is shown in FIG. 41. Note that fish school 334B is migrating upstream from station 306 to 307 in micro step S3.

Figure 42:
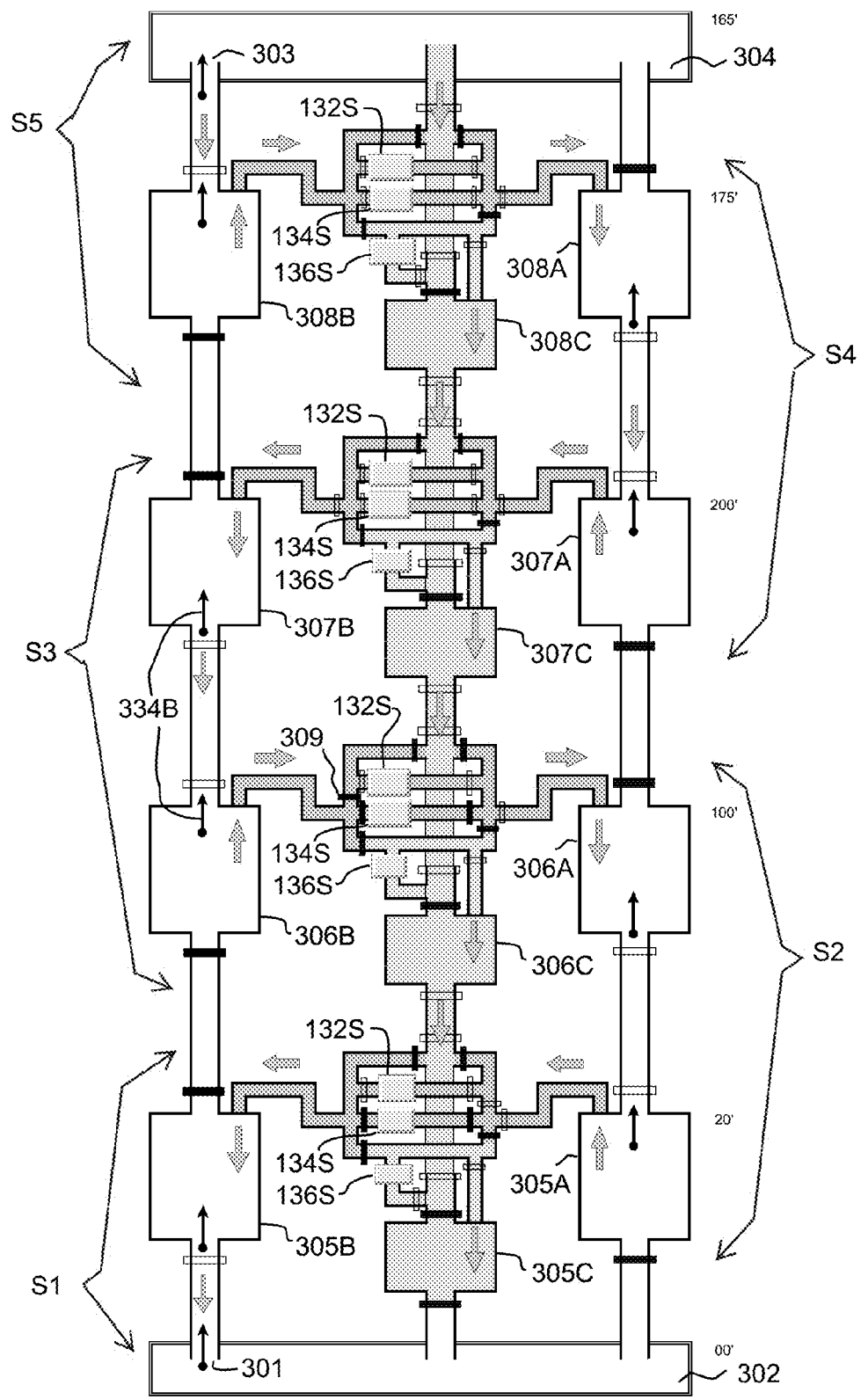
FIG. 42 is a schematic showing the blending of cooling water at stations along a passageway.

Water flow in phase C moves in harmony through the sequence of capsules of phase C, as shown in FIG. 42. At station 308, the three generator and associated turbine sets, 132-131, 134-133, 136-135, of sets 132S, 134S, and 136S, respectively, of the tertiary conduit system, are shown operating in motor and pump mode, drawing power from the electric utility, filling the three phases of station 308 and the A capsule at station 307 of micro step S4. To avoid system instability, it is preferable that the pumps at station 308 maintain a positive pressure of about 10 feet of head above atmospheric pressure at station 307, the dam crest 321, such that power can be generated by sets 132S and 134S as water transfers through station 307 from micro step S4 to micro step S3. The darkly shaded valves shown in FIGS. 40 to 43, show micro step S3 is secured by the closed valve downstream of station 306. Going now to explain control of fish passage water flow as water cascades from the crest of the dam to the afterbay. At station 306, the tertiary conduit valve 309 is shown in the closed position for purposes of this explanation. The lower capsule at station 306 is under pressure of the difference in elevation between station 307 and 306, which computes to 100 feet of head for the first passageway shown in FIG. 16. While juveniles and adults could migrate between the capsules of stations 307 and 306, fish would become confused if no water was circulating through micro step S3. The amount of water flow for stimulus is controllable to whatever is deemed appropriate for a fish species, easily to 1.5 fps or more, possibly 10 fps is preferable for very large sturgeon. Consider also that the generators 132 and 134 at stations 306 and 305 are not yet connected to the electric utility and the flow control valves of turbines 131 and 132 are fully open. With valve 309 slightly opened, an increment of water flows freely through the turbines 131 and 133 of stations 306 and 305 and discharges into the afterbay 302.

The small increment of water flow is defined here as Fi. Generators 132, 134 at station 307 deliver power to the utility proportional to their sharing of flow Fi times pressure head at the capsule at station 307, which is about 10 feet above atmospheric pressure as suggested above (Fi×10). (The suggested 10 feet also serves to assist fish to mitigate against any GBT they were experiencing prior to entering the fish passageway.) Going now to stations 306 and 305, the small increment of flow Fi at max turbine-gate opening is increased by further opening valve 309 to where it is sufficient for rotating the generator. By reducing turbine displacement, slowly bringing generator 132 of stations 306 and 305 up to synchronous speed, and automatically closing the generator breakers (not shown) connects these stations to the electric utility to control cascading water flow. The amount of power generated at station 306 by generator 132 computes to Fi times the difference in elevation between stations 306 and 307 which computes to 100 feet. At the same time the amount of power generated at station 305 by generator 132 computes to Fi times the difference in elevation between stations 305 and 306 which computes to 100 minus 20, or 80 feet of pressure head (Fi×80). The pressure head on the inlet of the turbine 131 at station 305 is 80 feet above atmospheric. The pressure on the outlet side of turbine 131 can be reduced from 20 feet of head by pulling a vacuum on capsule 305 thereby controlling the rate of water discharging into the afterbay 302 to Fi. A vacuum of 20 feet would have the effect of lowering the pressure in capsule 305 to afterbay level. Reducing this vacuum to 15 feet would have the effect of fish moving through a conduit with water flow through a 5 feet difference in elevation. Power generation at station 305 would increase to 95 feet of pressure head (Fi×95). The small incremental flow Fi is simultaneously ramped up to the preferred passage flow ("Fp") by computer control at all the stations along the passageway.

FIG. 42 shows the additional benefit of cold water flow through phase C and the sequence of phase C capsules in stations between the forebay and the afterbay which is operable to enhance the quality of water for fish passage. At station 308, motor and pump set 136-135 draws water 341C through phase C conduit from below the forebay 304 and pumps it into the phase C capsule of station 308, as shown in FIG. 21, putting this cool water in reach of the inlet to the pump set 136-135 of station 307. At station 307, the cool water shown in shaded view, can be pressured further by pump set 136-135 or it can be pressure reduced by these same units operating in generator and turbine mode while they fill capsule C at station 307 and the conduit of phase C to station 306. This can be repeated as shown at stations 306 and 305, and power generated therefrom supplied to the electric utility system. It is apparent that the fish passageway according to the invention could operate in harmony with all phases and with any one of phases A, B, or C shut down.

The levitation steps (micro steps) in the second passageway operate similar to those in the first passageway. Schools of fish migrate through the second passageway as shown in FIGS. 22 to 31, in eight micro steps operated in synchronism in a macro step, similar to migration through the first passageway as shown in FIGS. 16 to 21. To avoid confusion the schools of fish are distinguished as 401 to 408 and identified with suffix A or B depending if they are migrating on the A side or B side, and the steps 10 are distinguished with a suffix S1, to S9. For maximum fish transfer efficiency (weight of fish per unit time) it is preferable that the transit time between stations be about the same and levitation steps operate in smooth synchronism. Otherwise schools with short transit times are delayed while waiting for schools with longer transit times to complete. It is preferable therefore that the rise in elevation between stations be about the same. While this is not always possible as in the case of the third passageway, shown in FIG. 32, where a lengthy offset is necessary across the roof of the turbine and generator room of the powerhouse 504, about 225 feet above the afterbay 505. Also the forebay 506 is 50 feet or more below the top of the dam 507. In addition to attention to give even spacing of elevations between stations on the face of the arch dam 508, the dwell time in stations can be individually adjusted so the levitation steps all move smoothly in synchronism.

The levitation steps (micro steps) in the passageways operate in synchronism (macro steps) with alternate synchronous positions as seen by comparing FIGS. 9 and 12. Schools of adults or juveniles fishes move in synchronism when migrating through the passageway. The alternating macro step positions, defined here as macro step 1 and macro step 2, are shown in a generalized schematic form in FIGS. 40 and 41. The A side of the stations is on the right when looking upstream with reference to the first passageway shown in FIGS. 16 to 21. Macro step 1 in FIG. 40 corresponds with FIGS. 16 to 21 of the first passageway. In macro step 1, school 331A exits to the forebay 304 and school 335A enters the passageway from the afterbay 302. The next synchronous macro step, macro step 2, is shown in FIG. 41. (Step 2 is apparent from step 1 and is not shown on physical passageways drawings). All the schools move up one levitation step. School 331A has exited to the forebay 304, a new school 336B enters the B side of the passageway from the afterbay 302, and school 332B exits to the forebay 304.

Water flows through the passageway from the forebay to the afterbay and where necessary is pumped over the dam crest. Adult fish in migration swim against the stream while juveniles choose to swim with the stream. Migration through the passageway of adults and juveniles is mutually exclusive, because the specifics of the levitation steps are different. In general, juveniles depart from the capsule of the higher elevation, and adults depart from the capsule of the lower elevation, except the reverse is true when migrating between the forebay and the dam crest.

Schools of fish 503 (shown by a symbol with an arrow with a point and circle butt) migrate upstream through the third passageway as shown in FIGS. 34 to 39, similar to fish 331A, et al in migration through the first passageway as shown in FIGS. 16 to 21, and fish 401A et al through the second passageway as shown in FIGS. 24 to 31. The thirteen micro steps of the third passageway are also operated in synchronism and move in alternating macro steps in a manner similar to that shown in FIGS. 40 and 41.

Figure 39:
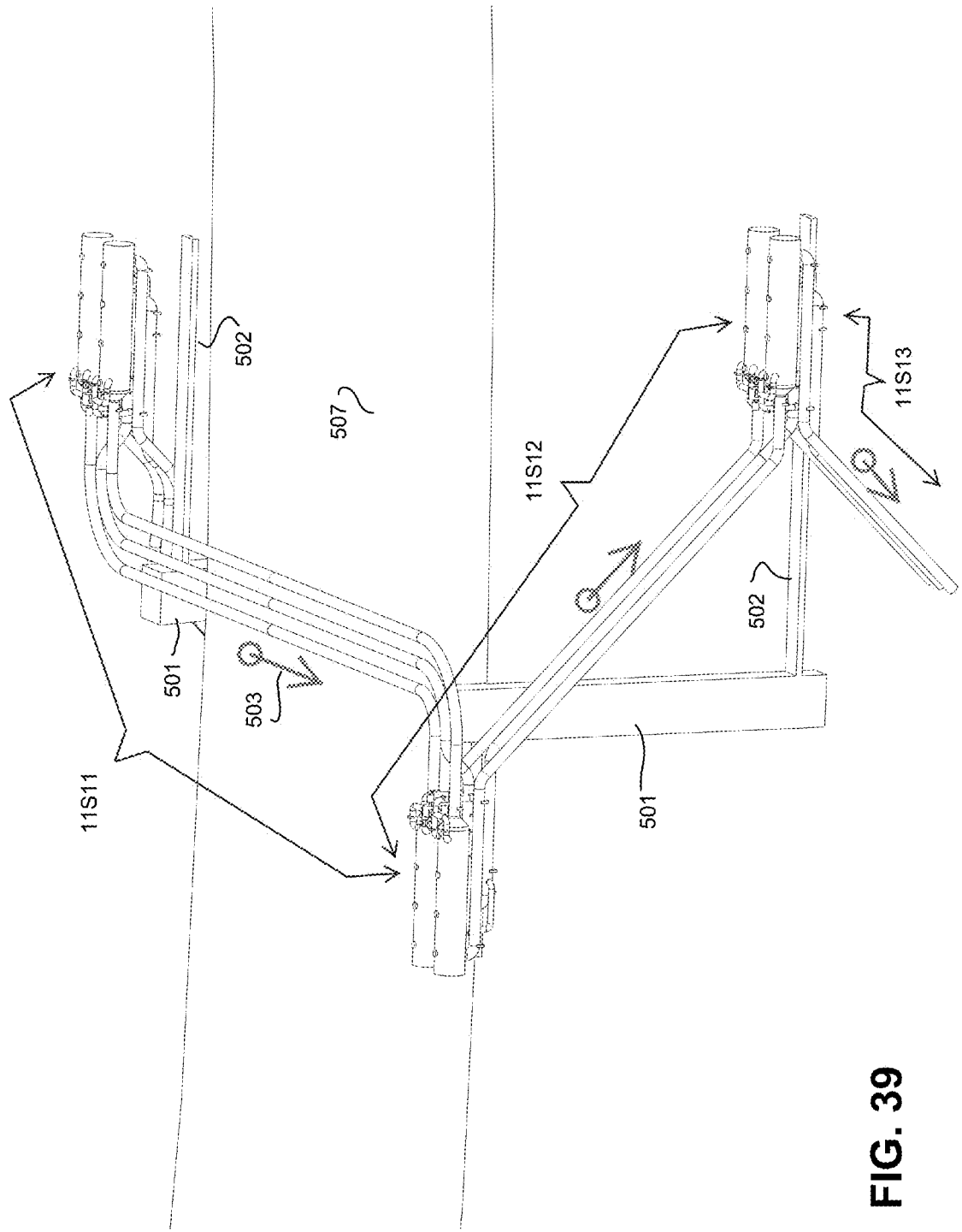
FIG. 39 is an isometric view of three stations at the crest 507 from the forebay 506 side of the dam of FIG. 32.

The process of levitation in micro steps that aggregate into two macro steps is shown schematically in FIGS. 40, 41, and 42. FIG. 40 applies specifically to the first passageway of FIGS. 16 to 21. The levitation designator prefixes 10 and 11 (FIG. 1 and FIG. 2, respectively) that distinguish the first and second embodiments on the physical drawings of the three passageways, have been omitted on the schematic diagrams, FIG. 40, 41, 42. Macro step 2, shown in FIG. 41 is an image of macro step 1 fluid flow shown in FIG. 40, rotated about a vertical axis midway between capsules A and B, on the right and left, respectively. These schematics are applicable with minor modification to the second and third passageways, by increasing the number of stations steps from S5 to S9, and from S5 to S13 respectively, and with consideration to where a passageway crosses over the crest of the dam. The third passageway has a second station at the crest 507 of the dam 508, as shown in FIG. 39, preferably for extra height to cross over vehicular traffic.

The first and second passageways are preferably supported on "H" structures spaced about 30-40 feet apart along the passageway (not shown), similar to how petroleum pipelines are supported above frozen ground. The third passageway shown in FIGS. 32 to 39 would preferably have a vertical passenger elevator 501 attached to the face 508 of the arch dam, with horizontal walkways 502 to each station, supported by structural brackets (not shown) also fastened to the dam face 508, including supports for the fish passage conduits and the stations (with a surrounding platform and a shade canopy also not shown).

Each micro step in the process of levitation is sequentially initialized, then aggregated in macro steps and actuated in synchronism. FIG. 40 shows a first synchronous macro step and FIG. 41 shows a second synchronous macro step. FIG. 42 shows the addition of cool water drawn from below the surface of the forebay 304 and supplied to stations along the passageway. It is apparent from the drawings, cool water from the center conduit system, phase C, can be blended with fish passage water in phases A or B at any or all stations as preferred. FIG. 42 compares with macro step 2 shown in FIG. 41.

Figure 43:
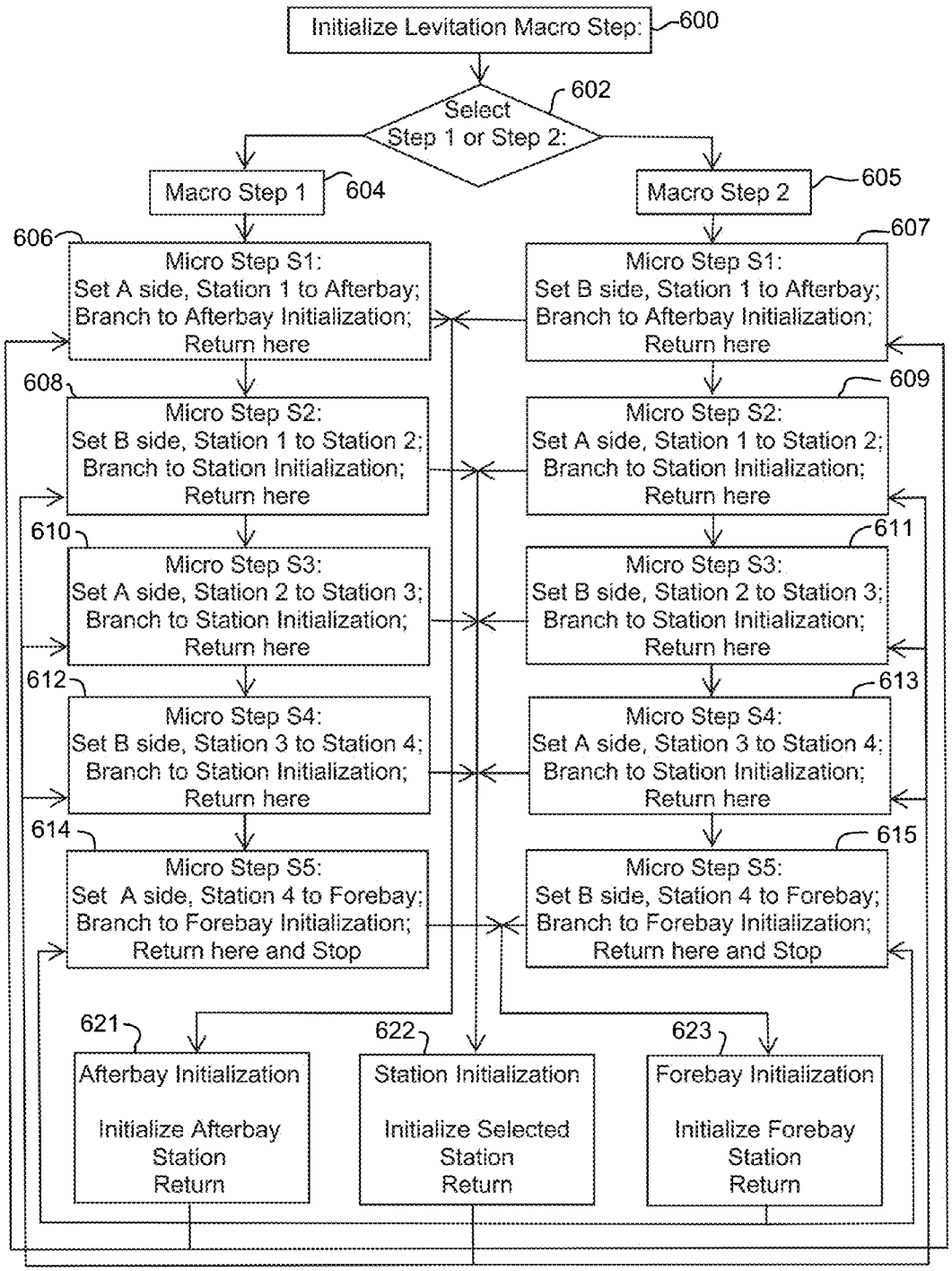
FIG. 43 is a flow diagram of initialization of a macro step of levitation in accordance with the present invention.

The flow diagram for initializing of a levitation macro step of a typical five station passageway is shown in FIG. 43. The process starts at Box 600 and continues to 602, where if called from the main computer to execute step 1, control branches to Box 604 and continues to execute macro step 1, or if called to execute step 2, it branches to box 605 and begins execution of macro step 2. The micro steps are initialized sequentially beginning from S1 to the last micro step which in this case is S5. On completion of the final micro step S5 of the selected macro step, control returns to the control computer. It returns again when the control computer issues a new command, usually to begin the alternate macro step.

Figure 44:
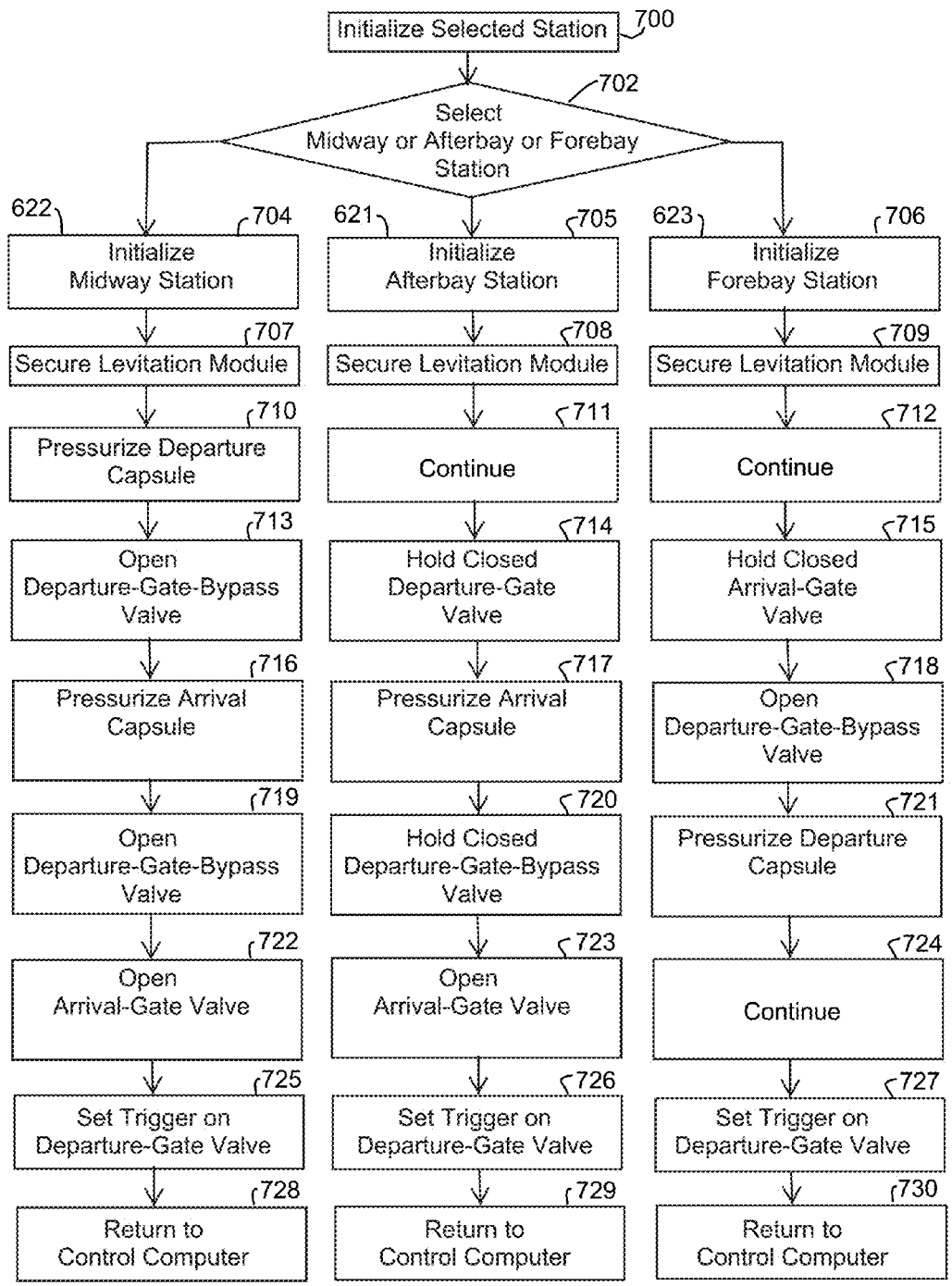
FIG. 44 is a flow diagram of the initialization of a micro step of levitation in accordance with the present invention.

The flow diagram shown in FIG. 44 is for initialization of the station micro step identified by boxes 621, 622, and 623 of FIG. 43. (A micro step is embedded in a macro step for operation of a fish passageway. Conceptually FIG. 44 is like a subroutine that is called from and returnable to FIG. 43, which on having been given information by the calling program, returns information to the calling program after having performed the assigned task. For example box 622 in FIG. 43 exchanges information with box 704 in FIG. 44, and box 728 returns to box 622.) Water flows are always downstream and the terminology for fish migration is transposed to be consistent with upstream or downstream. Micro step S2, as shown in FIG. 40, corresponds to the typical levitation step (10) shown in FIG. 1. The process of initialization of a station begins at box 700 and proceeds to box 702 for station selection—for Midway, Afterbay or Forebay stations—and branches to box 704, 705 or 706 respectively according to the direction given by calling the boxes 622, 621, or 623 of FIG. 43. If a station other than afterbay or forebay is selected, the process continues from box 704 to box 707 therein securing the designated side of the designated station module. For example, if called from micro step S2 of FIG. 43 the command would be to "Set B side, Station 1 to Station 2". (This would close gate valves 106 to 109 as shown generally in FIG. 1, and applies specifically to B side in FIG. 9 and FIG. 12, the "to" and 'from' stations respectively.) The process continues at box 710 with gradually increasing air pressure within the departure capsule (101), (see FIG. 1) from atmospheric pressure (which was the arrival pressure of the previous step) to the pressure head from the capsule (103) of the station above, which is the difference between the lower elevation (102) and the higher (104) station. Then at box 713, electrically opening the departures-gate-bypass valve (106), allowing water from the interconnecting conduit (105) to the capsule (103) above to slowly flow around the departures-gate valve (106) to settle the departure(s) capsule (101) near the head from the capsule (103) above. (The upper capsule (103) of the levitation module (10) (station above) would have been deemed to be the arrivals capsule after confirming the following: that the previous levitation step of departure from the station above had completed; that all the fish had departed from the upper capsule (103); that the associated departures-gate valve (109) is closed; and that the arrivals-gate (107) and associated bypass-gate valve downstream of the arrival capsule (103) is also closed.) In box 716, the air pressure in the arrival capsule (103) (see FIG. 1) is adjusted by the station compressor to atmospheric pressure and volume adjusted to about 10% by small adjustments to one or more of the four by-pass valves of the module (10). At box 719 the arrival-gate-bypass valve is opened to further settle the pressure within the levitation module (10). At box 722, the arrival-gate valve is opened and pressure in the arrival capsule (103) is increased by the swim depth minimum head to mitigate against high levels of total dissolve gas. At box 725 the departure-gate valve of the appropriate station is set in a locked-out position in readiness to be opened on the control computer moving to execute the macro step, in this case macro step 1. At box 728 the process of station initialization is complete and control returns to the control computer, exiting by way of box 704 of FIG. 44 which is box 622 of FIG. 43.

The process for the initialization of the afterbay and forebay stations is different than that given in the previous paragraph for initialization of a station midway along the passageway because there is only one capsule in a levitation step (10) and the stations are less than 25 feet above the forebay or afterbay water level. The module of the afterbay station is similarly secured as shown at box 708 except as apparent from FIG. 1 and FIG. 40, there is no lower capsule (101), the conduit (105) discharges directly into the afterbay (302), being severed just below the departure-gate valve (106) as shown in FIG. 1, but not shown in FIGS. 9 and 40. The departure-gate valve (106) (not shown) for fish swimming from afterbay (302) would be closed to avoid water flowing freely into the afterbay (302). At box 711 adjacent to box 710, there is no departure capsule so the process continues on through. At box 714 the departure-gate valve (adjacent to the afterbay) is held closed. At box 717 the arrival capsule (103) is pressurized in a process similar to that at box 716. At box 720 it is important to note that the departure-gate-bypass valve be held closed to avoid leakage into the afterbay. At box 723, the arrival-gate valve can be opened similar to box 722. At box 726, the trigger is set for the synchronous step, the macro step on the departure-gate valve. At box 729 control is returned to the control computer on return to box 705 at the top of the column and from there returning to calling box 621 of FIG. 43.

The process of initialization of the forebay station as shown on FIG. 44 begins at box 706, on call from box 623 of FIG. 43. The special requirement of the forebay station as shown at FIG. 40 is to pump water 341C from the forebay (304) to the crest (321) of the dam as shown in FIG. 21 and FIG. 20 of the first passageway. The motor 132 and pump 131 to execute this task are shown in FIG. 9, and will draw water (341C) from lower level (102) shown in FIG. 1 or water (112A) as shown in FIG. 9. FIG. 40 shows the forebay station in the process of micro step S5. Water is in effect being siphoned into the departure capsule and fish (331A) would swim to the lower elevation of the forebay (304). The process of initialization of the forebay station begins at box 706. The levitation module is secured at box 709. The process continues through box 712 without any action to box 715 where the arrival-gate valve is held closed, the arrival-gate valve being at the end of the conduit (105) at the forebay (304). With that the departure-gate-by-pass valve is opened at box 718 and the departure capsule pressurized at box 721. The process continues with no action at box 724 through to box 727 where the trigger is set on the departure-gate valve. The process then returns to the control computer at box 730, returning to the top of the column to box 706 and returning to the calling box 623 as shown on FIG. 43.

In accordance with the invention fish move along a passageway in a series of macro steps. It is possible to preplan a sequence of macro steps, and tailor the micro steps: to a fish species, to mitigate gas supersaturation, etc.

The levitation process of a fish passageway according to the invention could operate in macro steps at a constant frequency according to a predetermined schedule, or on an as required basis similar to a charter airline schedule.

The invention according to this application is scalable over a wide range—from micro-size (8 inch diameter conduit) to world-scale size (72 inch diameter conduit)—suitable for a small research facility for downstream fish passage study, or, for actual application for large scale upstream migration of the largest fish over the world's largest hydro-electric dam. Each fish passage with two 72 inch diameter conduits over a 600 foot dam, would generate from 2,500 to 3,500 kW—with a water flow rate at 1.5 to 2.25 fps, and volumes at 42.4 to 63.6 cfs, respectively. The micro step increments of levitation according to the invention are preferably about 100 feet, with 24 to 36 inch diameter conduit. It may be preferable for passage upstream of the largest fish that the micro steps be reduced to 50 feet with 5 to 6 foot diameter conduit. The capsules would be smaller, and the stepping frequency would be faster.

The invention will preferably included prior art devices such as passageway skylights, artificial lighting, sound, provision for feeding, fresh air enhancement, fish counters, temperature control, remote monitoring, etc. Computer control of fish passage will preferably include step by step dynamic simulation, optimal control, state estimation, adaptive control, etc.

This application is prepared consistent with the ordinary rules of international patent applications. The applicant reluctantly acquiesces to perceived pressure not to be verbose or pedantic or to run on with minor details. In response to concern that an application be readily understandable, this application is in high dpi resolution, for ease and speed of comprehension for the purpose of examination expediency, and to aid in the process of change in fish passage technology in the interests of conservation and for restoration of threatened fish species.

What is claimed is:

1. A fish passageway system for fish migrating mutually exclusively upstream and downstream through a conduit between capsules comprising a first levitation module comprising:
   (a.) a first capsule at a first elevation with two ends each with a gate-valve, the gate-valve of the first end operable to a closed position and the gate-valve of the second end operable to an open position for control of movement of fish;
   (b.) a second capsule at a second elevation lower than the first elevation with two ends each with a gate-valve, the gate-valve of the first end operable to an open position for control of movement of fish, and the gate-valve of the second end operable to a closed position;
   (c.) a first fish passage conduit with a first end connected to the first gate-valve of the first capsule, and a second end connected to a water supply inlet for a fish passageway;
   (d.) a second fish passage conduit with a first end connected to the second gate-valve of the first capsule and with a second end connected to the first gate-valve of the second capsule;
   (e.) a third fish passage conduit with a first end connected to the second gate-valve of the second capsule and a second end connected to a water discharge outlet from the fish passageway;
   (f.) a first tertiary conduit system fluidly connected to the first capsule, to the first fish passage conduit, and to the second fish passage conduit;
   (g.) a second tertiary conduit system fluidly connected to the second capsule, to the second fish passage conduit, and to the third fish passage conduit;
   (h.) a screen barrier to block movement of fish into the tertiary conduit systems;
   (i.) a first turbine-generator set comprising a first turbine fluidly connected in the first tertiary conduit system, and a first generator connected to an electric utility, controllable to modulate water flow into the first capsule;
   (j.) a second turbine-generator set comprising a second turbine fluidly connected in the second tertiary conduit system, and a second generator connected to the electric utility, controllable to modulate water flow out of the second capsule; and
   (k.) a computer means for controlling flow of passageway water communicating from the inlet into the first conduit, into the first tertiary conduit system, into the first capsule, then through the second fish passage conduit, out the second capsule into the second tertiary conduit system, and out the third fish passage conduit outlet, wherein the fish migrate between the capsules.

2. The fish passageway system according to claim 1, including a second levitation module substantially in accordance with the first levitation module, except with the inlet for the second levitation module connected to the outlet of first levitation module, thereby providing:
   (a.) the first and second levitation modules operable for communicating water flow, wherein a first fish school migrates between the first and the second capsule of the first levitation module, and wherein a second fish school migrates between a third and a fourth capsule of the second levitation module, thereby affecting a fish passageway through the first capsule through to the fourth capsule.

3. The fish passageway system according to claim 1, wherein the flow of fish passage water being from the lower elevation to the higher elevation, wherein the first turbine-generator-set becomes a first pump-motor-set, wherein the second turbine-generator-set becomes a second pump-motor-set and wherein the passageway system water inlet becomes the water outlet, and the passageway system water outlet becomes the water inlet.

4. A method of levitating fish through a fish passageway system according to claim 1, comprising:
   (a.) initializing the levitation module by adjusting water pressures for a steady state no flow condition;
   (b.) adjusting means for control of water flow between two capsules;
   (c.) creating a transient condition with a small perturbation of water flow;
   (d.) adjusting water flow to a perturbation set point to flow from an upper capsule to a lower capsule;
   (e.) maintaining water flow until all, or almost all, the fish have migrated from a departure capsule to an arrival capsule, wherein the departure capsule is the upper capsule and the lower capsule is the arrival capsule for fish migrating downstream, and wherein the departure capsule is the lower capsule and the upper capsule is the arrival capsule for fish migrating upstream; and
   (f.) closing the gate-valves of the first end and the second end of the second fish passage conduit and initializing the module for a next levitation step.

5. A fish passageway system for fish migrating mutually exclusively upstream and downstream between stations with capsules through at least one conduit, the system comprising:
   (a.) a first station at a first elevation, comprising;
      a first capsule and a second capsule adjacent to the first capsule, each with two ends,
      the first capsule comprising, a first gate-valve at the first end thereof and a second gate-valve at the second end thereof;
      the second capsule comprising, a third gate-valve at the first end thereof and a fourth gate-valve at the second end thereof;
   (b.) a second station at a second elevation substantially lower than the first elevation, comprising:
      a third capsule and a fourth capsule, adjacent to the third capsule, each with two ends,
      the third capsule comprising, a fifth gate-valve at the first end thereof and a sixth gate-valve at the second end thereof;
      the fourth capsule comprising, a seventh gate-valve at the first end thereof and a eighth gate-valve at the second end thereof;
   (c.) the first, fourth, sixth and seventh gate-valves operable to the closed position, and the second, third, fifth and eighth gate-valves operable to the open position for control of the movement of fish;
   (d.) a first fish passage conduit with a first end connected to the first gate-valve of the first capsule, and the second end connected to a closed gate-valve of a higher station;

(e.) a second fish passage conduit with a first end connected to the third gate-valve, and a second end connected to a water supply inlet for a fish passageway, wherein the passage water flows from the higher station;
(f.) a third fish passage conduit with a first end connected to the second gate-valve and a second end connected to the fifth gate-valve;
(g.) a fourth fish passage conduit with a first end connected to fourth gate-valve and a second end to the seventh gate-valve;
(h.) a fifth fish passage conduit with a first end connected to the sixth gate-valve, and the second end connected to the gate-valve of a first capsule at a lower station;
(i.) a sixth fish passage conduit with a first end connected to the eighth gate-valve, and the second end connected to the gate-valve of a second capsule at a lower station, wherein water from the passageway discharges to the lower station;
(j.) a first tertiary conduit system fluidly connected to the first capsule and to the second capsule;
(k.) a second tertiary conduit system fluidly connected to the third capsule and to the fourth capsule;
(l.) a screen barrier to block movement of fish into the tertiary conduit systems;
(m.) a first turbine-generator set comprising a first turbine fluidly connected in the first tertiary conduit system, and a first generator connected to an electric utility, controllable to modulate water flow out of the second capsule into the first capsule;
(n.) a second turbine-generator set comprising a second turbine fluidly connected in the second tertiary conduit system, and a second generator connected to the electric utility, controllable to modulate water flow out of the third capsule into the fourth capsule; and
(o.) a computer for controlling flow of passageway water communicating from the inlet at a higher station into the second capsule, then through the first turbine through the first capsule into the third capsule through the second turbine into the fourth capsule and out the passageway outlet at a lower station.

6. The fish passageway system according to claim 5, including where fish migrate between the first capsule and the third capsule, and between the second capsule and the second capsule of the higher station, and between the fourth capsule and the second capsule of the lower station.

7. A fish passageway system for fish migrating mutually exclusively upstream and downstream through at least one conduit between capsules comprising a first levitation module comprising:
(a.) a first capsule at a first elevation with two ends each with a gate-valve, the gate-valve of the first end operable to a closed position and the gate-valve of the second end operable to an open position for control of movement of fish;
(b.) a second capsule at a second elevation lower than the first elevation with two ends each with a gate-valve, the gate-valve of the first end operable to an open position for control of movement of fish, and the gate-valve of the second end operable to a closed position;
(c.) a first fish passage conduit with a first end connected to the first gate-valve of the first capsule, and a second end connected to a water supply outlet from a fish passageway;
(d.) a second fish passage conduit with a first end connected to the second gate-valve of the first capsule and with a second end connected to the first gate-valve of the second capsule;
(e.) a third fish passage conduit with a first end connected to the second gate-valve of the second capsule and a second end to a water inlet for the fish passageway;
(f.) a first tertiary conduit system fluidly connected to the first capsule, to the first fish passage conduit, and to the second fish passage conduit;
(g.) a second tertiary conduit system fluidly connected to the second capsule, to the second fish passage conduit, and to the third fish passage conduit;
(h.) a screen barrier to block movement of fish into the tertiary conduit systems;
(i.) a first pump-motor-set, comprising a first pump fluidly connected in the first tertiary conduit system, and a first motor connected to an electric utility, controllable to modulate water flow out of the first capsule, into the first conduit and out the passageway outlet;
(j.) a second pump-motor-set, comprising a second pump fluidly connected in the second tertiary conduit system, and a second motor connected to the electric utility, controllable to modulate water flow into the second capsule from the third conduit and passageway inlet; and
(k.) a computer means for controlling flow of passageway water communicating from the inlet into the third conduit, into the second tertiary conduit system, into the second capsule, then through the second fish passage conduit, out the first capsule into the first tertiary conduit system, and out the first fish passage conduit outlet, wherein the fish migrate between the capsules.

8. A fish passageway system for fish migrating mutually exclusively upstream and downstream through a conduit between capsules comprising a first levitation module comprising:
(a.) a first capsule at a first elevation with two ends each with a gate-valve, the gate-valve of the first end operable to a closed position and the gate-valve of the second end operable to an open position for control of movement of fish;
(b.) a second capsule at a second elevation lower than the first elevation with two ends each with a gate-valve, the gate-valve of the first end operable to an open position for control of movement of fish, and the gate-valve of the second end operable to a closed position;
(c.) a first fish passage conduit with a first end connected to the first gate-valve of the first capsule, and a second end connected to a water supply inlet for a fish passageway;
(d.) a second fish passage conduit with a first end connected to the second gate-valve of the first capsule and with a second end connected to the first gate-valve of the second capsule;
(e.) a third fish passage conduit with a first end connected to the second gate-valve of the second capsule and a second end connected to a water discharge outlet from the fish passageway;
(f.) a first tertiary conduit system fluidly connected to the first capsule, to the first fish passage conduit, and to the second fish passage conduit;
(g.) a second tertiary conduit system fluidly connected to the second capsule, to the second fish passage conduit, and to the third fish passage conduit;
(h.) a screen barrier to block movement of fish into the tertiary conduit systems;
(i.) a first throttle valve fluidly connected in the first tertiary conduit system controllable to modulate water flow from the first conduit and the water supply inlet into the first capsule; and
(j.) a second throttle valve fluidly connected in the second tertiary conduit system controllable to modulate water flow out of the second capsule, into the third conduit and out the water discharge outlet, wherein fish migrate between the capsules.

* * * * *